(12) United States Patent
Mamo

(10) Patent No.: US 8,663,525 B2
(45) Date of Patent: Mar. 4, 2014

(54) INTERNALLY PRESSURE COMPENSATED NON-CLOGGING DRIP EMITTER

(75) Inventor: Shay Mamo, San Diego, CA (US)

(73) Assignee: Shay Mamo, San Diego, CA (US)

( * ) Notice: Subject to any disclaimer, the term of this patent is extended or adjusted under 35 U.S.C. 154(b) by 735 days.

(21) Appl. No.: 12/772,733

(22) Filed: May 3, 2010

(65) Prior Publication Data

US 2010/0244315 A1   Sep. 30, 2010

Related U.S. Application Data

(63) Continuation-in-part of application No. 12/434,565, filed on May 1, 2009, now Pat. No. 8,372,326, which is a continuation-in-part of application No. 12/254,761, filed on Oct. 20, 2008, now Pat. No. 7,988,076.

(51) Int. Cl.
  *B29C 45/14* (2006.01)
(52) U.S. Cl.
  USPC ........ 264/255; 264/259; 264/271.1; 264/274; 264/275; 264/277; 264/279
(58) Field of Classification Search
  USPC ............. 264/255, 259, 260, 271.1, 274, 275, 264/277, 279, DIG. 64
  See application file for complete search history.

(56) References Cited

U.S. PATENT DOCUMENTS

| | | | |
|---|---|---|---|
| 3,856,333 A | 12/1974 | Cox | |
| 3,981,452 A | 9/1976 | Eckstein | |
| 4,173,309 A * | 11/1979 | Drori | ............................ 239/592 |
| 4,210,287 A | 7/1980 | Mehoudar | |
| 4,687,143 A | 8/1987 | Gorney et al. | |
| 4,817,666 A * | 4/1989 | Sanville | .................... 137/596.17 |
| 4,824,025 A | 4/1989 | Miller | |
| 5,038,476 A * | 8/1991 | McCrea | ........................... 30/141 |
| 5,200,132 A | 4/1993 | Shfaram et al. | |
| 5,203,503 A | 4/1993 | Cohen | |
| 5,330,107 A | 7/1994 | Karathanos | |

(Continued)

FOREIGN PATENT DOCUMENTS

| | | |
|---|---|---|
| IT | 1255120 | 4/1992 |
| WO | WO 02/15670 | 2/2002 |
| WO | 2006/038246 | 4/2006 |

OTHER PUBLICATIONS

International Search Report and Written Opinion for PCT/US09/61090, dated Jan. 13, 2010, 8 pages.

(Continued)

*Primary Examiner* — Timothy Kennedy
(74) *Attorney, Agent, or Firm* — ARC IP Law, PC; Joseph J. Mayo

(57) ABSTRACT

Drip emitter having a pressure compensating element that does not contact the enclosing pipe. First known drip emitter formed from a two-shot injection mold process that includes a deformable element, membrane, compressible element or pressure compensating element that compensates pressure or flow of water against a stiff injection molded surface that is part of the drip emitter body. In addition, this is the first drip emitter (two-shot or otherwise) that includes a compensating surface that is not parallel to the membrane, i.e., at an angle to the plane of the pressure compensating element. May include fluid retainment valve, ventable/anti-siphon/non-drain or other, as part of second injection with second or third material. Allows for simple injection mold construction and eliminates need for ISO conditioning to properly seat the membrane before testing.

20 Claims, 48 Drawing Sheets

(56) References Cited

U.S. PATENT DOCUMENTS

| | | |
|---|---|---|
| 5,531,381 A | 7/1996 | Ruttenberg |
| 5,586,727 A | 12/1996 | Shekalim |
| 5,615,838 A | 4/1997 | Eckstein et al. |
| 5,636,797 A | 6/1997 | Cohen |
| 6,027,048 A | 2/2000 | Mehoudar |
| 6,206,305 B1 | 3/2001 | Mehoudar |
| 6,403,013 B1 | 6/2002 | Man |
| 6,464,152 B1 | 10/2002 | Bolinis et al. |
| 6,568,607 B2 | 5/2003 | Boswell et al. |
| 7,108,205 B1 | 9/2006 | Hashimshony et al. |
| 2006/0163388 A1 | 7/2006 | Mari |
| 2006/0255186 A1 | 11/2006 | Ruskin |

OTHER PUBLICATIONS

International Search Report for child application, dated Aug. 5, 2010.
International Preliminary Report on Patentability dated Nov. 10, 2011. (6 pages).

* cited by examiner

SECTION B-B

SECTION A-A

SECTION C-C

SECTION D-D

SECTION E-E

SECTION F-F

SECTION H-H

SECTION G-G

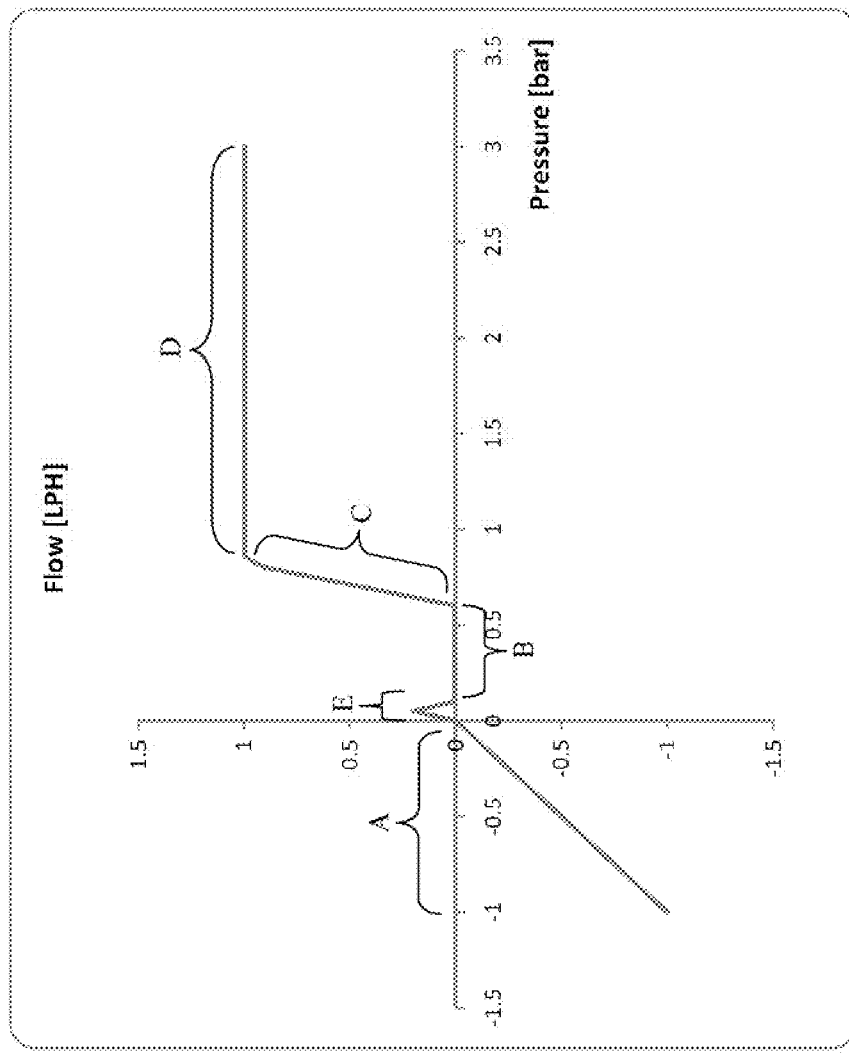

Figure 30

A. When pipe is under vacuum pressure, air can flow backwards through the emitter.
B. Once the closing threshold is reached the valve is closed until the opening threshold is reached.
C. The valve opens when the pressure in the pipe is high enough.
D. The water flow is pressure compensated so that flow is constant over a range of operating pressure.
E. Under very small pressure water flows until the non drain valve is shut.

A. When pipe is under very strong vacuum pressure, air can flow backwards through the emitter.
B. Under moderate or light vacuum pressure, the valve is closed until the opening threshold is reached.
C. The valve opens when the pressure in the pipe becomes positive.
D. The water flow is pressure compensated so that flow is constant over a range of operating pressure.

Figure 32

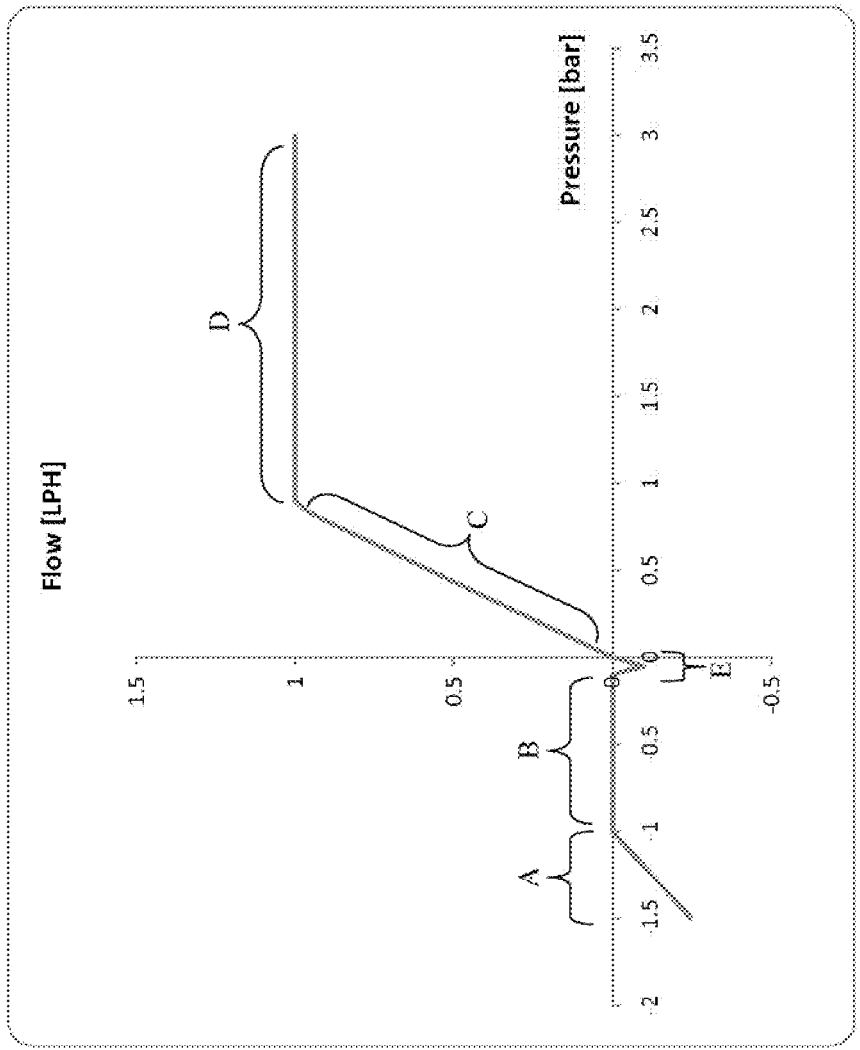

A. When pipe is under very strong vacuum pressure, air can flow backwards through the emitter.
B. Under moderate vacuum pressure, the valve is closed until the opening threshold is reached.
C. The valve is open when the pressure in the pipe is positive.
D. The water flow is pressure compensated so that flow is constant over a range of operating pressure.
E. Under very small vacuum pressure the valve is open and water flows.

Anti-Siphon Ventable

Non-Drain Ventable

SECTION H-H

7501

7402  7202

6501

8401

8801

8401

INTERNALLY PRESSURE COMPENSATED NON-CLOGGING DRIP EMITTER

This application is a continuation in part of U.S. patent application Ser. No. 12/434,565 filed 1 May 2009 now U.S. Pat. No. 8,372,326, which is a continuation in part of U.S. patent application Ser. No. 12/254,761 filed 20 Oct. 2008 now U.S. Pat. No. 7,988,076, the specifications of which are all hereby incorporated herein by reference.

BACKGROUND OF THE INVENTION

1. Field of the Invention

Embodiments of the invention described herein pertain to the field of irrigation apparatus. More particularly, but not by way of limitation, one or more embodiments of the invention enable an internally pressure compensated non-clogging drip emitter.

2. Description of the Related Art

There are multiple types of irrigation drippers. Simple drippers exist that are inserted serially along pipe, either by forcing a hole into the pipe and placing the dripper on the outside of the pipe, or by cutting the pipe and inserting the dripper in line with the pipe. These systems require great amounts of labor when providing a watering system for a large agricultural area for example.

Other types of drippers include drip emitters that are inserted into pipe, generally when the pipe is extruded. This type of dripper system enables rapid deployment of great lengths of pipe, i.e., dripper line, wherein the drippers may be ordered for certain distances along the pipe for example. There are many types of emitters that may be inserted into the pipe including non-pressure compensated drippers that may provide more flow in lower areas of an agricultural drip irrigated area.

Other types of emitters include pressure compensated drip emitters that provide compensated drip volumes regardless of the depth or height or pressure difference in an agricultural drip irrigated area. In addition, other features of drip emitters include "non-drain" capabilities that retain water in the pipe when the pressure in the pipe falls beneath a threshold. Non-drain drip emitters generally include a valve that does not allow for water to flow from the drip emitter until a certain pressure difference is reached with respect to internal pipe pressure versus atmospheric pressure. Such a valve may or may not include a check valve for instance. Check valves allow flow in only one direction, for example when the internal water pressure in the pipe exceeds a pressure difference with respect to atmospheric pressure. Non-drain drippers without check valves are failing after 1 year in the field and the industry is moving towards anti-siphon valve based drip emitters that inhibit backflow of air or water or mud into the pipe under negative pressure, thus inhibiting any outflow from lower elevation emitters as well as the higher elevation emitters inhibit backflow and hence prevent siphoning. Anti-siphon valves are implementations of check valves that have also generally been placed before the labyrinth section to keep water and air from entering the pipe.

Check valves heretofore have usually been placed before labyrinth sections within drip emitters. This leaves the labyrinth exposed to air and potential clogs. This pre-labyrinth check valve placement is problematic in that air can enter the labyrinth and cause a clog in the labyrinth section. When air enters the labyrinth, the water evaporates. When air mixes with water that has suspended iron, the suspended iron can solidify and cause a clog. In addition, mud can enter the labyrinth with no valve to prevent backflow into the drip emitter.

The filter on cylindrical drippers fitted with non-drain or anti-siphon mechanisms before the labyrinth have traditionally been small as they must be smaller than the size of the diaphragm used to create the valve mechanism. A small filter can easily clog. Hence, not only do current non-drain and anti-siphon drip emitters clog due to problems related to material other than water entering the labyrinth, but they also clog due to the small size of the filters that have been used before the labyrinth in the flow path of water for example.

Pipes fitted with non-drain elements are very difficult to evacuate as they do not allow air into the pipe through the dip emitters when under a vacuum or low pressure. When filled with water, an irrigation pipe is very heavy and is not able to be rolled up for example when certain types of crops have been harvested and the pipe is to be stored.

Currently known drip emitters may clog over time for a variety of other reasons as well. Many of the reasons for clogging in currently known drip emitters are related to or a result of non-turbulent pathways, i.e., laminar transfer zones or any path of water flow that is straight enough to allow sediment to settle. For example, between the inner portion of the emitter to the pool area of the emitter, if a transfer zone is formed as a straight line, for example across a mold joint, sediment accumulates in the non-turbulent zone over time and eventually forms a clog as sediment settles. In addition, drip emitters include a filter tend to clog when the emitter is rotated so as to locate the filter downward wherein sediment settles, which clogs the filter. In addition, emitters that utilize only one hole may clog if covered by soil for a rock for example. In these situations, a second hole is not utilized to provide a level of redundancy.

In addition, pressure compensated emitters that utilize a two shot injection mold exist which provide a pressure compensation element that compensates for pressure with a membrane that directly deforms against extruded pipe. The problem with this type of emitter is that the pipe quality, diameter, and internal surface finish can vary along with pipe from day to day and from pipe manufacturer to pipe manufacturer. Hence, the performance of the pressure compensation element depends greatly on a secondary apparatus, i.e., the pipe and process of manufacture thereof. For at least the limitations described above there is a need for an internally pressure compensated non-clogging drip emitter.

BRIEF SUMMARY OF THE INVENTION

One or more embodiments of the invention enable an internally pressure compensated non-clogging drip emitter. Embodiments include an emitter body having an inner portion that includes an inner surface, an outer portion that contacts an enclosing pipe and that includes an outer surface, a first end and a second end, an inlet that comprises a filter or a place holder for a fluid retainment valve, a labyrinth coupled with the outer surface, a compensating chamber formed within an inner portion of the drip emitter, a compensating surface formed inside the compensating chamber, a pool coupled with the outer surface wherein the pool is configured to hold fluid when the emitter body is enclosed in the enclosing pipe, a fluid flow path leading from the inner portion to the outer portion of the drip emitter wherein the drip emitter is configured to allow the fluid to flow from the inlet, through the labyrinth, through the compensating chamber and to the pool through the fluid flow path. The more of the labyrinth that is sealed to air by the water retainment valve, the more resistant to clogging the drip emitter embodiment is. For example, mud cannot flow back into the drip emitter, and air cannot creep into the labyrinth, and hence water that contains suspended iron does not form rust. Hence, the protected internal components of the drip emitter are protected from the elements, which thus prevents clogging.

The emitter body may be formed as a flat object, or a cylindrical arc of less than 360 degrees, or a cylindrical arc of a full 360 degrees or any other shape that may fit inside a pipe for example.

The water retainment valve may be constructed in a manner or otherwise configured to either allow no backflow of air or water, or allow the backflow of air or water into the drip emitter when a pressure internal to the drip emitter is below a threshold pressure. For example, the water retainment valve may be configured with flaps. Depending on the configuration of the flaps, the valve may be non-drainable, or conversely, ventable in that under low pressures or a vacuum or negative pressure, the flaps may for example change direction to allow airflow into the drip emitter and pipe. In ventable embodiments, the flaps may be configured to point under no pressure in a direction of normal water flow under positive pressure with respect to internal pipe pressure and external air pressure. For non-drain embodiments, when the pressure is below a threshold then the water retainment valve ceases to allow water to flow. Ventable embodiments allow for the enclosing pipe to be rolled up for example while non-drain embodiments do not allow air into the pipe and hence do not allow for easily rolling up the pipe. Anti-siphon embodiments may be implemented similar to ventable embodiments, with longer flaps that are unable to bend back in towards the labyrinth for example.

Embodiments of the invention may be configured with a pressure compensating chamber (otherwise known as a compensating chamber herein) that is configured to allow pressure from the water in the emitter to limit a compressible element or deformable element that in effect controls the output pressure and/or flow of water from the emitter. In one or more embodiments of the invention, the compensating chamber is formed together with the water retainment valve in an integrated unit although this is not required. In one or more embodiments of the invention, the compensating chamber may be configured in such a way that there is minimal or no contact of the deformable element against the inside of the enclosing pipe. In this embodiment, the pressure compensating chamber is formed within the drip emitter, for example as part of a two-shot injection mold manufacturing process. This embodiment provides advantages of consistency since the enclosing pipe forms no direct portion of the pressure compensating chamber. In addition, this embodiment requires no manual labor or machine assembly to assemble and bypasses the need for ISO conditioning to properly seat the pressure compensating membrane as is required with known devices.

An embodiment of the method of producing the drip emitter includes selecting a first material for injection molding for an emitter body, selecting a second material for injection molding wherein the second material comprises an elastomeric material to effect regulation of the drip emitter, injecting an injection mold with a the first material and the second material in separate shots in a single mold to form the drip emitter, and, cross-linking the second material to increase elasticity of the second material after injection but before inserting the drip emitter into a pipe. The method may also include forming a water retainment valve with the second material in the single mold, forming a ventable/anti-siphon/anti-drain water retainment valve with the second material in the single mold, optionally forming a mechanical engagement between the first material and the second material wherein the mechanical engagement comprises at least one interlocking element formed into the first material and corresponding at least one interlocking element formed into the second material. In addition, the method for producing the drip emitter may include forming a water retainment valve that is configured to hinder or allow no backflow of air or water into the drip emitter when a pressure internal to the drip emitter is below the pressure external to the pipe. In one or more embodiments, the compensating element is injection molded into a portion of the drip emitter and does not operate against or require the support of the enclosing pipe or wherein the compensating surface does not depend on or require the pipe when the compensating membrane is deformed in operation against the compensating surface.

Another embodiment of the method of producing the drip emitter includes injecting a first material into an injection mold in a first injection and forming an emitter body wherein the emitter body includes an inner portion comprising an inner surface, an outer portion configured to contact an enclosing pipe wherein the outer portion comprises an outer surface, a first end, a second end, an inlet that comprises a filter or a place holder for a fluid retainment valve, a labyrinth coupled with the outer surface, a compensating chamber formed within an inner portion of the drip emitter, a compensating surface formed inside the compensating chamber, a pool coupled with the outer surface wherein the pool is configured to hold fluid when the emitter body is enclosed in the enclosing pipe, a fluid flow path leading from the inner portion to the outer portion of the drip emitter wherein the drip emitter is configured to allow the fluid to flow from the inlet, through the labyrinth, through the compensating chamber and to the pool through the fluid flow path, and injecting a second material into the injection mold in a second injection and forming a compensating membrane wherein the second material comprises an elastomeric material to effect regulation of the drip emitter and wherein the compensating membrane is configured to deform under positive pressure toward the compensating surface within the compensating chamber within the inner portion of the drip emitter.

Embodiments of the invention may be manufactured in a novel manner by injecting both the drip emitter and compensating diaphragm or compensating membrane and/or water or fluid retainment valve within an injection mold, for example using multiple shots of different material into the mold. In one or more embodiments, a pliable material is utilized for the pressure compensating component and/or ventable valve while a less pliable material for example a material that does not flex as much is utilized for the emitter body. In one or more embodiments three materials are optionally utilized, one for the drip emitter, a second material for the compensating membrane and a third material for the fluid compensating valve. Additionally, the method may include forming a hole in the drip emitter comprising a pressure chamber exit using a bypass shutoff injection mold wherein the hole extends from the inner surface to the outer surface of the drip emitter. Additionally, the method may also include coupling a fluid retainment valve with the drip emitter. Furthermore, the method may also include coupling the fluid retainment valve in a manner that includes forming the fluid retainment valve during the injecting the second material, optionally at the inlet or anywhere else in the fluid flow path. Alternatively, the method may include injecting a third material into the injection mold and forming the fluid retainment valve.

In one or more embodiments, after injection molding but before insertion into the pipe, cross-linking may be performed to enable the elastomer to retain shape and elasticity characteristics over time. This may be done using UV light, hot water, steam, beta radiation or any other technology that allows the materials to cross-link. Typically, cross-linked materials do not bond with polyethylene, so during injection cross-linking is undesirable since the elastomer will have to bond with PE.

One or more embodiments of the invention may be configured to restrict water flow, wherein the water retainment valve is alternately opened and closed under normal operation for example due to the Bernoulli effect to provide restricted water flow. Embodiments of the invention may be utilized in restricting or alternately open/close configurations for low flow level implementations. If for example the instantaneous flow from a dripper is 4 liters per hour with a pressure that is changing from 0 to 15 psi intermittently then the average flow might be 0.5 liters per hour or lower. This allows for use of 1) longer laterals of pipe because the drippers are not all flowing at the same time so there is less pressure loss in the pipe, 2) larger labyrinths for low flows (larger labyrinths clog less), 3) reduction in pumping costs and 4) extremely low flows become possible. For example, in embodiments that employ a water retainment valve after the labyrinth, this restricting effect occurs since the water pressure at the water retainment valve is the pressure after the labyrinth and compensation chamber and is much lower than pipe pressure and closer to atmospheric pressure (pressure outside the pipe). Hence, if the water pressure at the water retainment valve is close to the threshold pressure the flaps crack open and allow flow through the valve, however the Bernoulli principle states that as velocity of the water increases, when the flow increases from stagnate velocity V=0 to flow V>0, the pressure decreases. When the pressure has decreased below the threshold pressure the flaps close until the water is stagnant and the pressure quickly builds towards pipe pressure and exceeds the threshold, therein opening the water retainment valve. This cycle keeps repeating within a pressure range.

In non-drain drip emitters there are two threshold pressures of importance. As water fills an empty pipe and the pressure raises the drip emitters allow water to flow at the opening pressure threshold. When the pump that pressurizes water in the pipe is turned off, the drip emitters continue to allow water to flow until the closing pressure threshold is met and the water ceases flowing. It is desirable to have the closing pressure be high, however in non-drain drippers that exist today the closing pressure is lower than the opening pressure. With embodiments of the invention that make use of flaps, and under restricted pressure ranges, the water retainment valve is continuously alternating between a closed and open state during normal operation and the closing pressure is higher and closer or equal to the opening pressure.

Embodiments of the invention or method of producing embodiments of the invention may optionally utilize an inwardly projecting filter prevent clogging when the emitter oriented rotationally downward in the field as the filter is not a potential well and hence sediment does not drop into it. In addition, inwardly projecting filter embodiments provide a snorkel effect that enables faster moving and cleaner water to enter the emitter via the filter, hence eliminating the potential to clog in a second manner. Thus inwardly projecting filter embodiments eliminate clogs in two ways, by avoiding sediment with a height offset and avoiding sediment by selecting faster moving water away from the pipe outer surface. An emitter may also utilize more than one filter in a redundant configuration to either supply both pools on each side of the emitter or alternatively to supply an associated pool in a one-to-one manner.

Embodiments of the invention may further include a pool coupled with the outer cylindrical surface wherein the pool is configured to hold water filtered by the filter or inwardly offset filter when the hollow cylindrical emitter body is enclosed in a pipe. Embodiments further include a labyrinth coupled with the outer cylindrical surface wherein the labyrinth may optionally maximize use of turbulent transfer zones, at least after water enters the labyrinth, and wherein the labyrinth allows the water to flow from the filter or filter to the pool. Through the use of turbulent transfer zones once the water enters the labyrinth, sediment is continuously forced through the labyrinth and has no location to settle and hence the labyrinth minimizes the potential to clog. In other words, laminar flow transfer zones are avoided as these type of "straight" paths tend to clog over time with sediments. By utilizing a filter or an inwardly offset filter and a labyrinth that avoids laminar flow zones, embodiments of the invention so configured minimize the potential to clog in multiple ways.

Once an embodiment of the emitter is enclosed in a pipe, the pool is thus sealed, for example via a wall at one end of the emitter and a side of the labyrinth, for example when the labyrinth extends outwardly from the outer cylindrical surface of the emitter. The pool is tapped via one or more hole(s) in the enclosing pipe to allow for the water running in the inner portion of the pipe and inner portion of the emitter to flow through the filter and labyrinth to the pool and out the hole at a rate that is controlled by the particular shape and size of the labyrinth for example.

In one or more embodiment of the invention, a symmetrical embodiment may be utilized that provides two pools, two labyrinths and optionally two pressure compensation and/or two water retainment valves. This embodiment provides a robust redundant embodiment that continues to work even if one labyrinth were to clog, or if one hole into the pipe associated with a particular emitter were to be externally plugged, buried or blocked. Several embodiments of redundant configurations may be formed that include a two pool embodiment with one or more labyrinths, i.e., one labyrinth with a "T" or fork section, or two labyrinths, each flowing to a separate pool. Alternatively, the embodiment can be doubled to form more than one filter or inwardly offset filter, for example offset rotationally by 180 degrees, with separate labyrinth(s) and pool(s) coupled therewith for even more redundancy.

BRIEF DESCRIPTION OF THE DRAWINGS

The above and other aspects, features and advantages of the invention will be more apparent from the following more particular description thereof, presented in conjunction with the following drawings wherein:

FIG. 30 is a graph of flow versus pressure in a non-drain embodiment of the water retainment valve with flaps that are not fully closed at zero pressure difference.

FIG. 32 is a graph of flow versus pressure in ventable and anti-siphon embodiments of the water retainment valve with flaps that are not fully closed at zero pressure difference.

DETAILED DESCRIPTION OF THE INVENTION

An internally pressure compensated non-clogging drip emitter will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
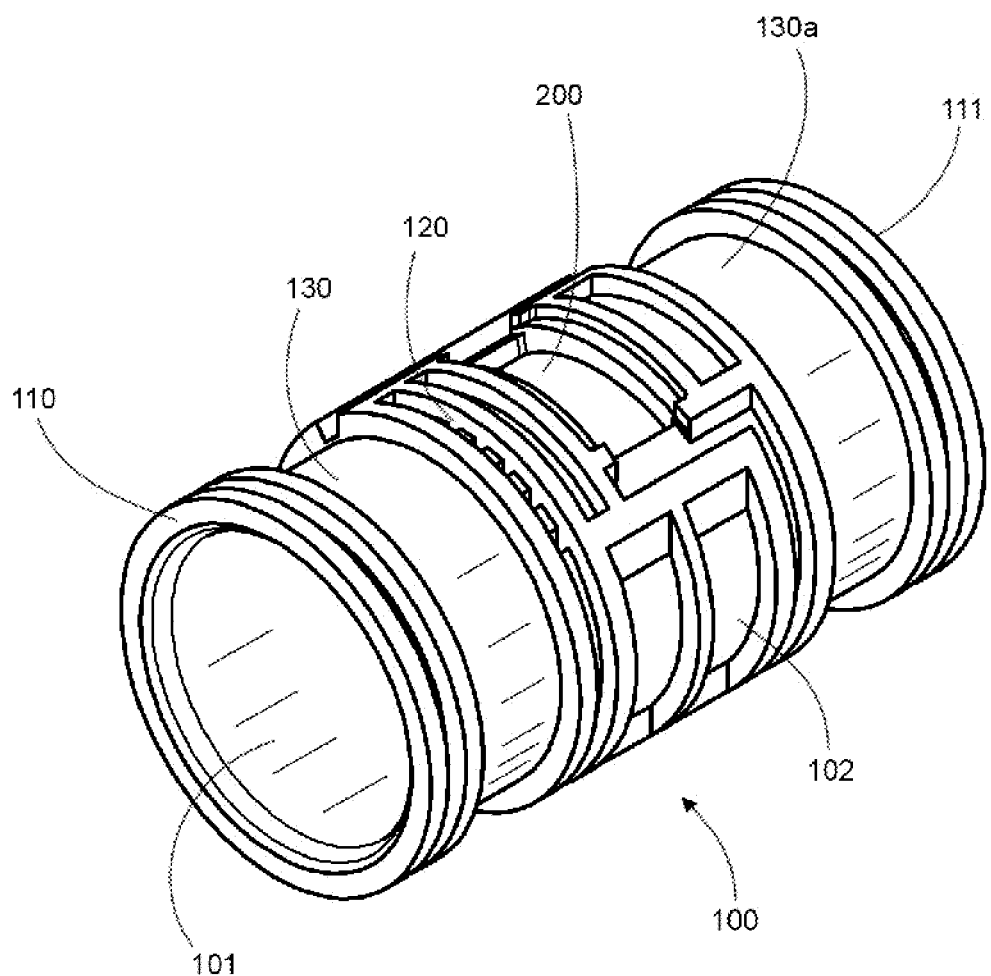
FIG. 1 is a perspective view of an embodiment of the drip emitter.

FIG. 1 is a perspective view of an embodiment of drip emitter 100. Embodiments include an emitter body having inner surface 101, outer surface 102 that forms the floor of the emitter working elements, first end 110 and second end 111. The emitter of FIG. 1 is inserted into a pipe or hose as is shown as a shaded tube in FIG. 2 wherein holes are created in the hose to allow water flowing from the inside of the pipe, and hence inside of inner surface 101 through filter 120, (into labyrinth entry 301, through labyrinth 140, through labyrinth transfer zone location 141, to labyrinth exit 142, to channel 310, to water retainment valve 281 for example as per FIGS. 3-6) and into pools 130 and 130a and out of holes 202 and 202a respectively (see FIG. 2). Embodiments provide pool 130 formed at the deepest offset by outer cylindrical surface 102, wherein pool 130 is configured to hold water filtered by filter 120. Water retainment valve 281 protects labyrinth 140 from the elements by preventing the backflow of air or water or mud for example into the drip emitter. Ventable embodiments of water retainment valve 281 allow for draining water from, and rolling of an enclosing pipe by lowering the internal pressure within the enclosing pipe (as per FIG. 2) to a pressure below a backflow threshold pressure. This allows an to enter water retainment valve 281 which enters the labyrinth and hence enters the pipe through the reverse path of normal water flow.

Figure 2:
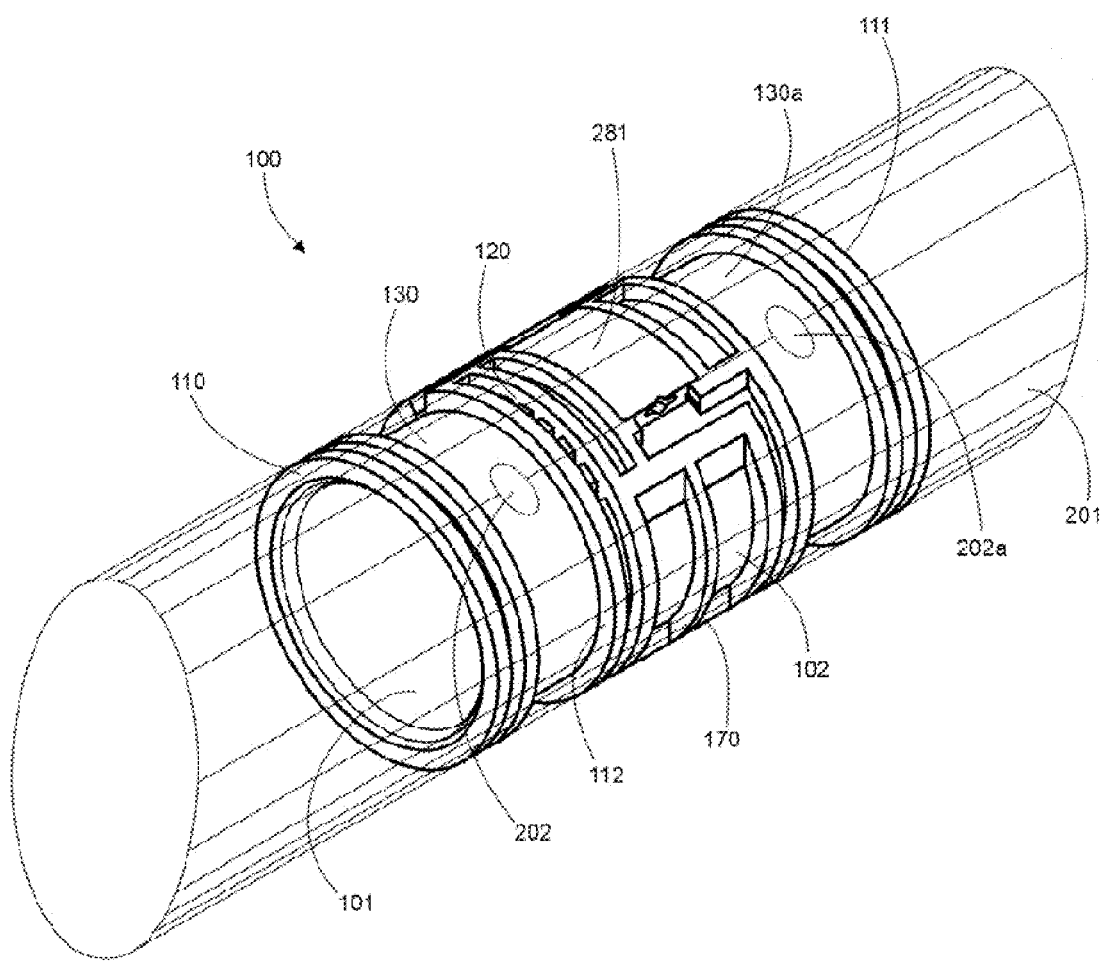
FIG. 2 is a perspective view of an embodiment of the drip emitter shown as situated inside a pipe or hose.
Figure 3:
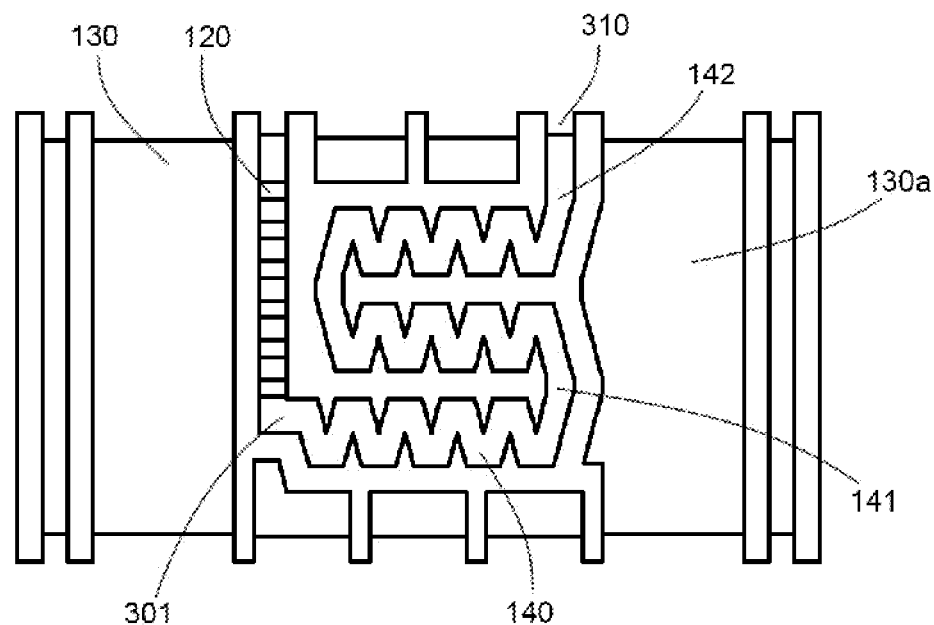
FIG. 3 is a bottom view of an embodiment of the drip emitter.

Embodiments further include labyrinth 140 coupled with the outer cylindrical surface wherein labyrinth 140 may utilize turbulent transfer zones once water enters the labyrinth and wherein labyrinth 140 allows the water to flow from inwardly offset filter 120 to pool 130. As shown in FIGS. 1-3, labyrinth 140 includes teeth that point inwardly into the path of water flow, wherein the teeth disrupt the flow of water through labyrinth 140 and provide turbulent transfer zones throughout labyrinth 140. Any shape may be utilized to create turbulent transfer zones, including but not limited to teeth, or any other geometric shape such as square waves, saw tooth shapes, or any other shape that provides for non-linear or non-laminar water flow.

Once an embodiment of the emitter is enclosed in a pipe, pool 130 is thus sealed, for example via the wall at first end 110 of the emitter and side 112 of the labyrinth/filter section. The "depth" of the pool 130 may be any depth that allows for the desired amount of water to flow through the particular embodiment. For example, when labyrinth 140 extends outwardly from the outer cylindrical surface of the emitter by a desired distance, this distance sets the depth of the path of the water through the labyrinth. By configuring the labyrinth with the desired number of turbulent features, for example teeth and setting the width of the water path through the labyrinth, any water flow amount can be easily configured for the desired product implementation. Pool 130 is tapped via hole 202 in the enclosing pipe to allow for the water running in the inner portion of the pipe and inner portion of the emitter to flow through inwardly offset filter 120 and labyrinth 140 to pool 130 and out hole 202. In other words, the rate of water flow is controlled by the particular shape and size of the labyrinth for example the length, cross-sectional area, number of teeth, length of teeth of the turbulent zones. Grid 170 is formed to minimize the amount of plastic for example utilized in each emitter, and provides a higher coefficient of static friction between the enclosing pipe and is optional in that it does not form a part of the water flow mechanism of embodiments of the invention.

One or more embodiments of the invention provide an elongated filter as shown in FIGS. 1-3, that is aligned lengthwise along the axis of the cylinder forming the emitter, for example lengthwise parallel along the axis of the cylinder of the emitter. The filter inward offset can be any depth greater than or equal to 0 mm from the inner diameter of the drip emitter inner surface 101 and the ends of the filter may be angled to provide for a more streamlined flow of water past the filter for example to aid in the snorkel effect of taking in faster moving water for embodiments having a filter inward offset greater than 0 mm. In one or more embodiment of the invention, a symmetrical embodiment may be utilized that provides two pools, i.e., 130, 130a as well as two labyrinths and/or two water retainment valves. This embodiment or any embodiments having more than two labyrinths and/or water retainment valves is in keeping with the spirit of the invention and is not shown for brevity. An embodiment of a robust implementation is shown in the parent application to this application which has been incorporated by reference above. Use of multiple redundant components within a single drip emitter provides a robust redundant embodiment that continues to work even if one labyrinth were to clog, or if one hole into the pipe associated with a particular emitter were to be externally plugged, buried or blocked. The labyrinth may be coupled with the emitter by forming the emitter via injection molding so that the labyrinth extends outwardly from the outer cylindrical surface of the emitter. In this embodiment, water is sealed on the bottom by the outer cylindrical surface of the emitter, i.e., the floor of the labyrinth, and is further sealed by the outwardly extending walls of the turbulent zones for example. In addition, water is sealed by the inner surface of the enclosing pipe into which the emitter is placed. The exit from the labyrinth allows water, to flow into the pool.

FIG. 2 is a perspective view of an embodiment of the shown in enclosing pipe 201 that is shown with holes 202 and 202a to provide exits for drip water. Pipe 201 is shown as a shaded cylindrical cut-away tube and may be formed of any material including but not limited to plastic. Embodiments of the invention may be inserted into pipe 201 using an extrusion process for example. The emitters may be inserted at fixed timing or fixed distance or any other displacement offset depending on the intended use for the implementation. For example, for a drip emitter system to be utilized for trees, the emitters may be introduced into pipe 201 at large intervals with respect to a drip emitter system for a garden having smaller plants.

FIG. 3 is a bottom view of an embodiment of the drip emitter. As shown, water flows out of the page toward the reader from filter 120 through labyrinth entry 301 and into labyrinth 140. The labyrinth may utilize turbulent transfer zones as the water for example travels toward the right in the labyrinth section closest to inwardly offset filter 120, bends at transfer zone location 141 and travels to labyrinth exit 142 into pool 130. From pool 130 water drips from the pipe at hole 202 (see FIG. 2).

Figure 4:
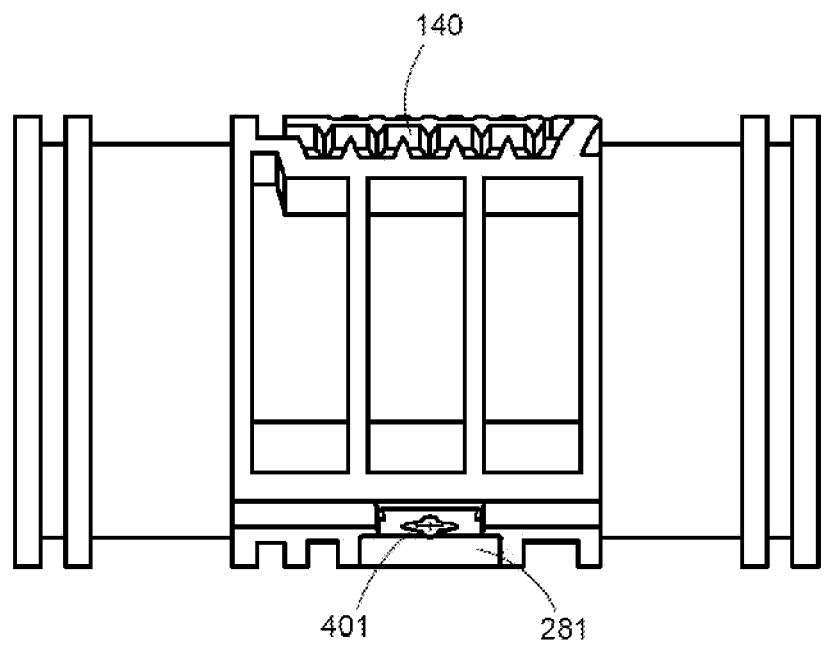
FIG. 4 is a side view of an embodiment of the drip emitter.

FIG. 4 is a side view of an embodiment of the drip emitter. In this view, water retainment valve 281 is shown from the end, wherein the flaps 401 are visible, wherein the flaps may be configured for non-drain or ventable operation based on their shape and orientation. Water retainment valve 281 may also be configured with an integrated pressure compensation valve.

Figure 5:
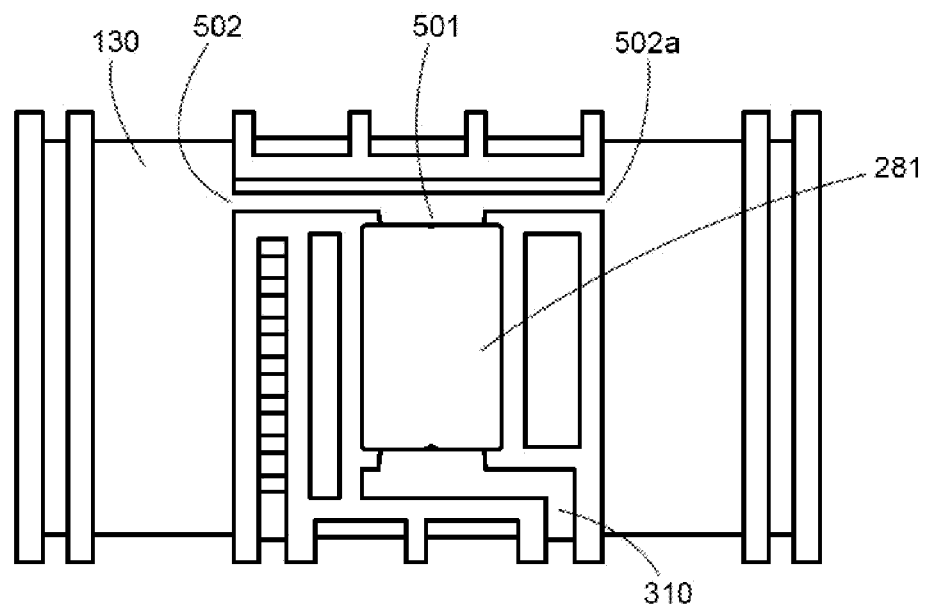
FIG. 5 is a top view of an embodiment of the drip emitter.

FIG. 5 is a top view of an embodiment of the drip emitter. In this view, water retainment valve 281 is seen from the top wherein the water flow path under normal drip emitter irrigation allows water to flow out of the water retainment valve to pool entries 502 and 502a from water retainment valve exit location 501.

Figure 6:
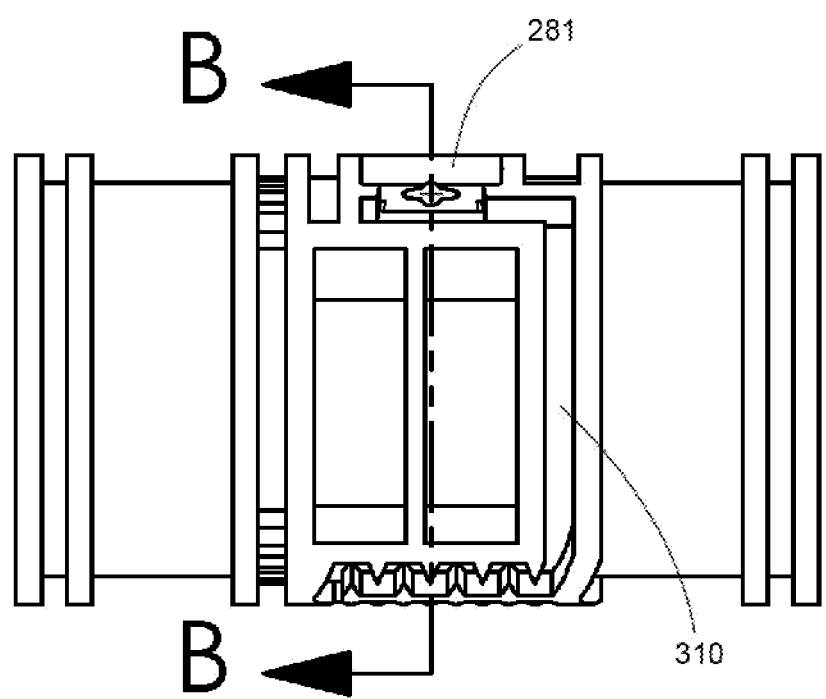
FIG. 6 is a secondary side view of an embodiment of the drip emitter.
Figure 7:
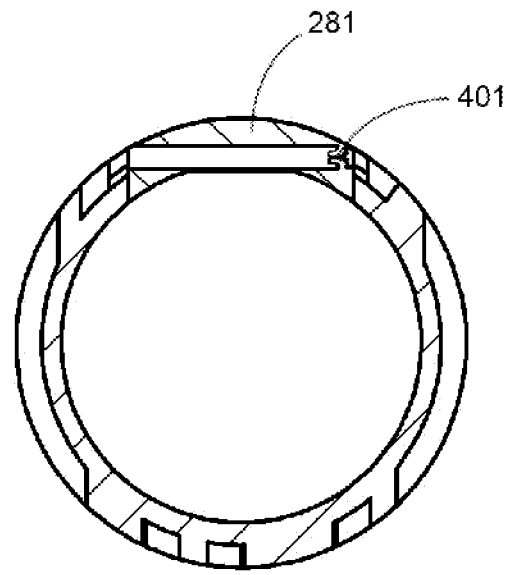
FIG. 7 is a cross-section end view of an embodiment of the drip emitter shown in FIG. 6.

FIG. 6 is a secondary side view of an embodiment of the drip emitter, i.e., opposite side of FIG. 4. FIG. 7 is a cross-section end view of an embodiment of the drip emitter shown in FIG. 6. In this view, cross section of water retainment valve 281 is shown with side view of flaps 401.

Figure 8:
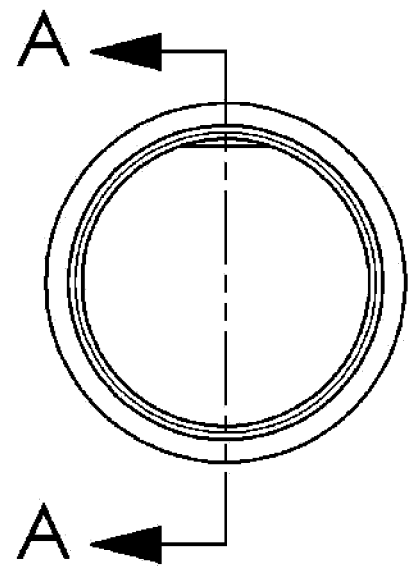
FIG. 8 is an end view of an embodiment of the drip emitter.
Figure 9:
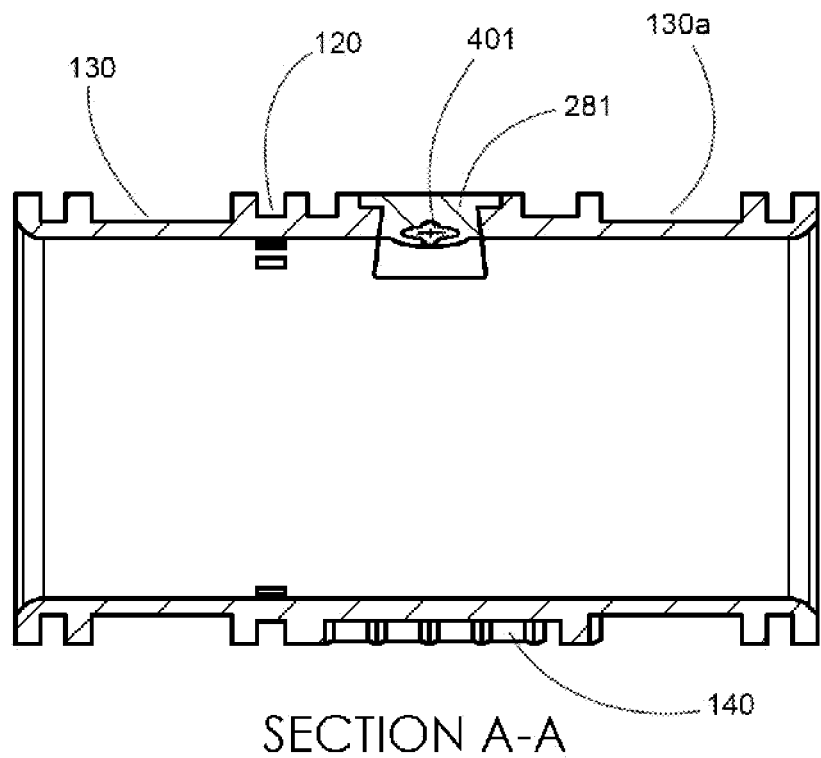
FIG. 9 is a cross-section side view of an embodiment of the drip emitter shown in FIG. 8.

FIG. 8 is an end view of an embodiment of the drip emitter. FIG. 9 is a cross-section side view of an embodiment of the drip emitter shown in FIG. 8. In this view, side cross section of water retainment valve 281 is shown with end view of flaps 401.

Figure 10:
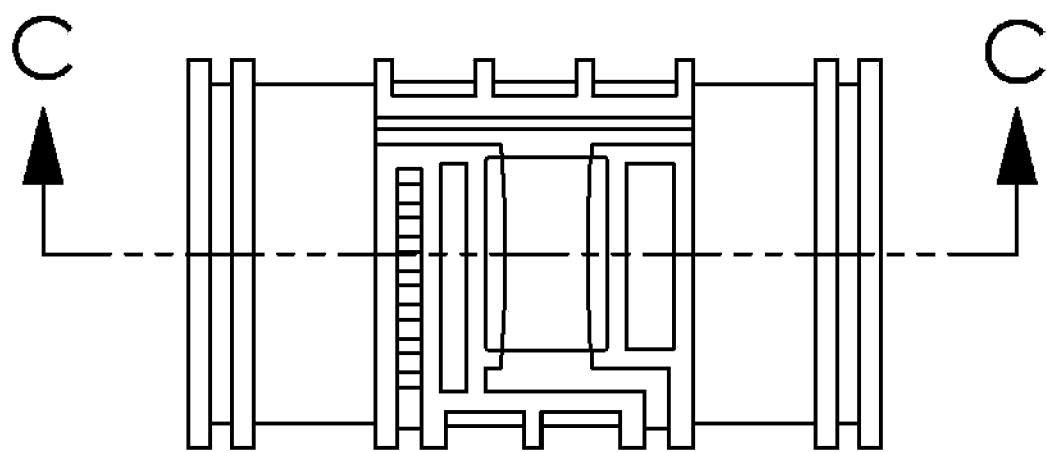
FIG. 10 is a top view of an embodiment of the drip emitter.
Figure 11:
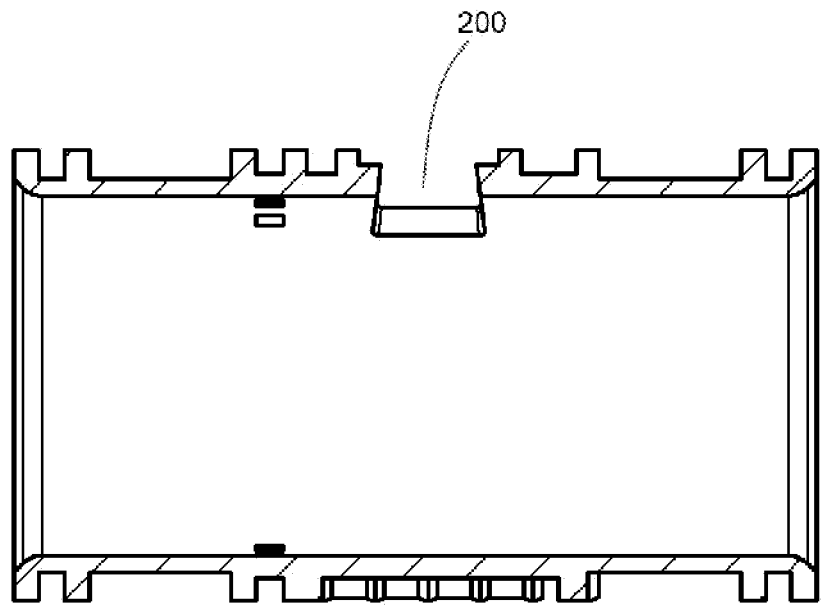
FIG. 11 is a cross-section side view of an embodiment of the drip emitter shown in FIG. 10.

FIG. 10 is a top view of an embodiment of the drip emitter. FIG. 11 is a cross-section side view of an embodiment of the drip emitter shown in FIG. 10. In this view, water retainment valve slot 200 is shown where water retainment valve 281 is placed before enclosing the drip emitter in an enclosing pipe.

Figure 12:
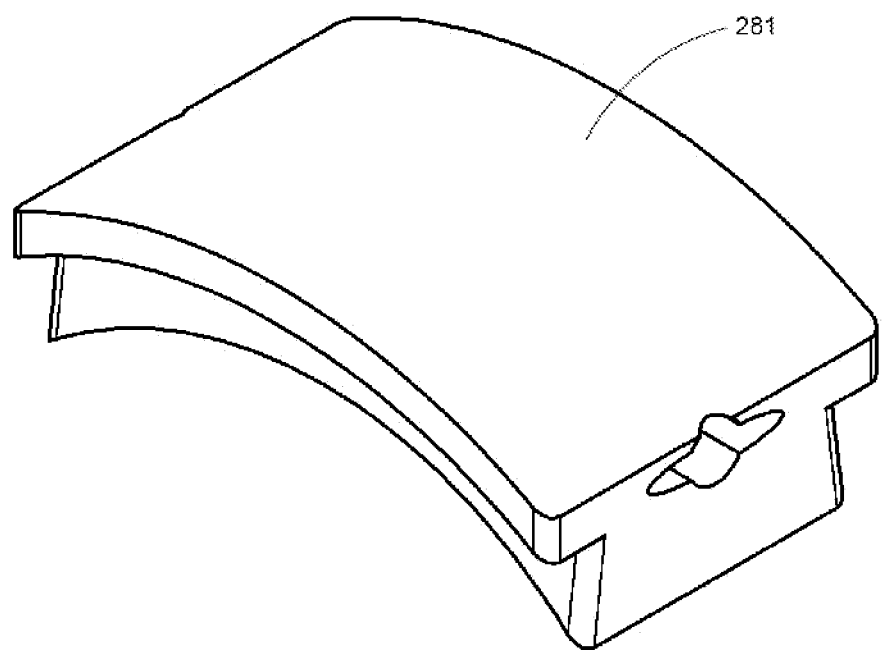
FIG. 12 is perspective view of an embodiment of the water retainment valve.

FIG. 12 is a perspective view of an embodiment of water retainment valve 281, which in this embodiment is a pressure compensated ventable water retainment valve that may be configured as a ventable or non-drain water retainment valve.

Figure 13:
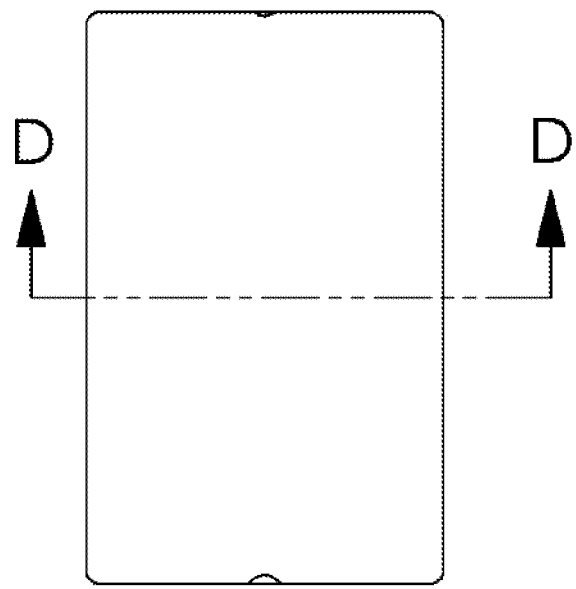
FIG. 13 is a top view of an embodiment of the water retainment valve.
Figure 14:
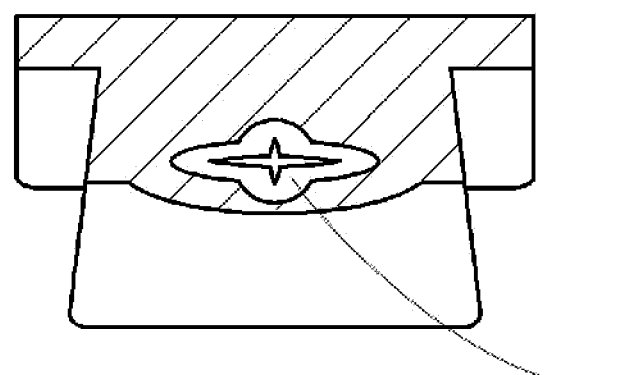
FIG. 14 is a cross-section view of an embodiment of the water retainment valve shown in FIG. 13.

FIG. 13 is a top view of an embodiment of the water retainment valve. FIG. 14 is a cross-section view of an embodiment of the water retainment valve shown in FIG. 13 showing an end view of flaps 401.

Figure 15:
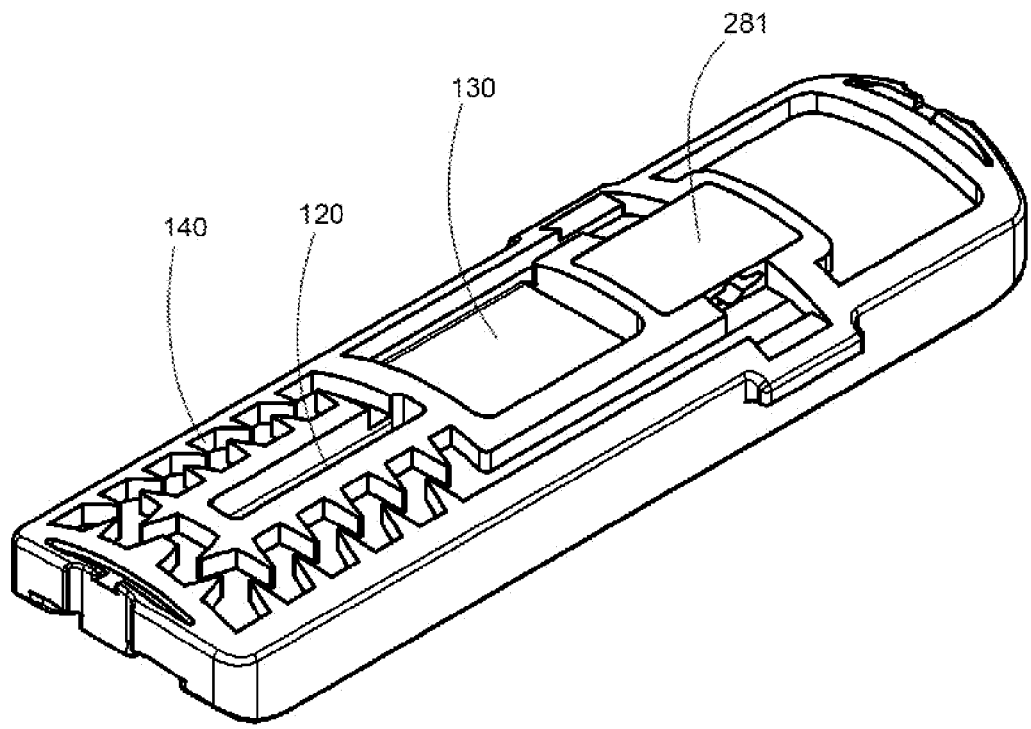
FIG. 15 is a perspective view of a second embodiment of the drip emitter.

FIG. 15 is a perspective view of a second embodiment of the drip emitter. In this semi-cylindrical embodiment, water enters the drip emitter through filter 120, passes into labyrinth 140, through water retainment valve 281 that may also include an integrated pressure compensation member and into pool 130. Placement of the water retainment valve after the initial portion of the labyrinth, or after the end of the labyrinth allows for minimizing the labyrinth to exposure to the elements and prevents clogging.

Figure 16:
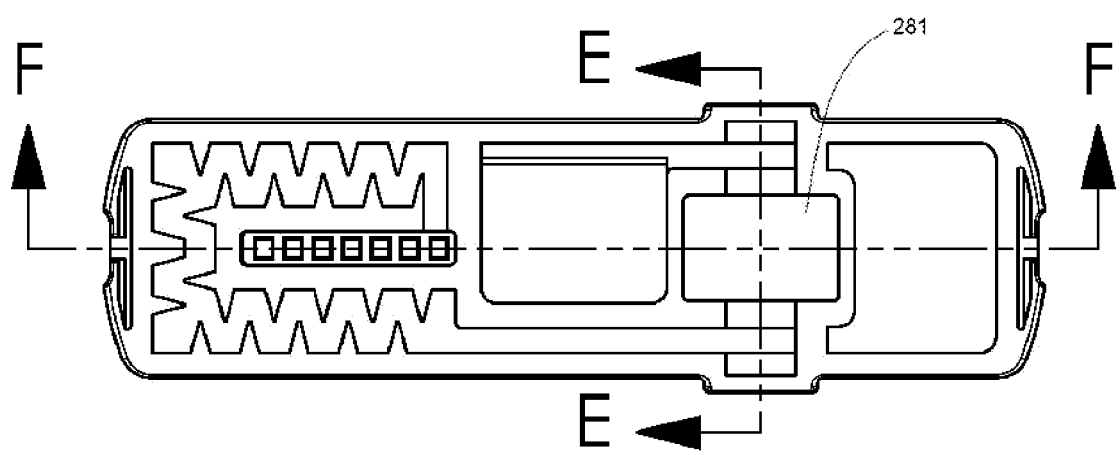
FIG. 16 is a top view of a second embodiment of the drip emitter.
Figure 17:
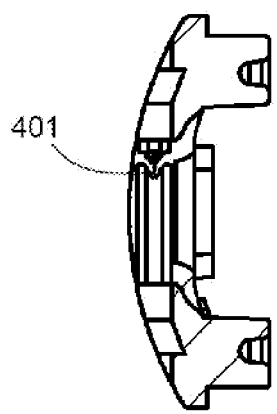
FIG. 17 is a side cross-section view of a second embodiment of the drip emitter shown in FIG. 16.
Figure 18:
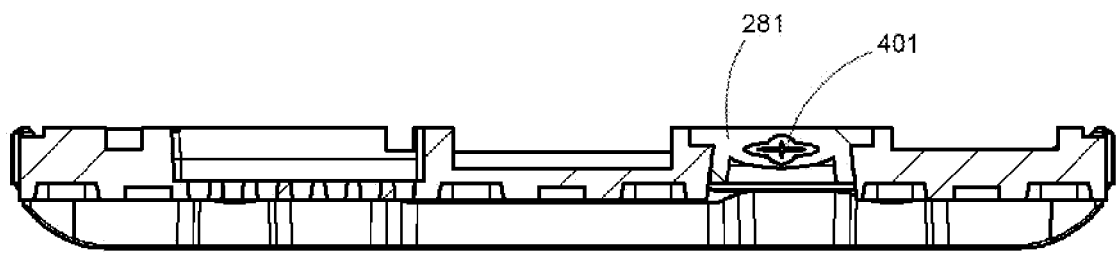
FIG. 18 is an end cross-section view of a second embodiment of the drip emitter shown in FIG. 16.

FIG. 16 is a top view of a second embodiment of the drip emitter. In this view, water retainment valve 281 is shown from the top. FIG. 17 is a side cross-section view of a second embodiment of the drip emitter shown in FIG. 16. In this view flaps 401 are shown from the side. FIG. 18 is an end cross-section view of a second embodiment of the drip emitter shown in FIG. 16. In this view, flaps 401 are seen from the end within water retainment valve 281.

Figure 19:
FIG. 19 is a side view of a second embodiment of the drip emitter.

FIG. 19 is a side view of a second embodiment of the drip emitter. In this view, flaps 401 are seen from the end within water retainment valve 281.

Figure 20:
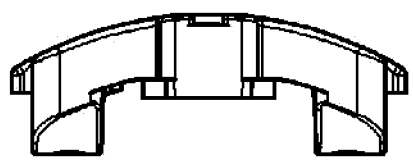
FIG. 20 is an end view of a second embodiment of the drip emitter.

FIG. 20 is end view of a second embodiment of the drip emitter. In this particular embodiment the height of the drip emitter is 3.3 mm. Any depth of drip emitter may be manufactured depending on the implementation requirements.

Figure 21:
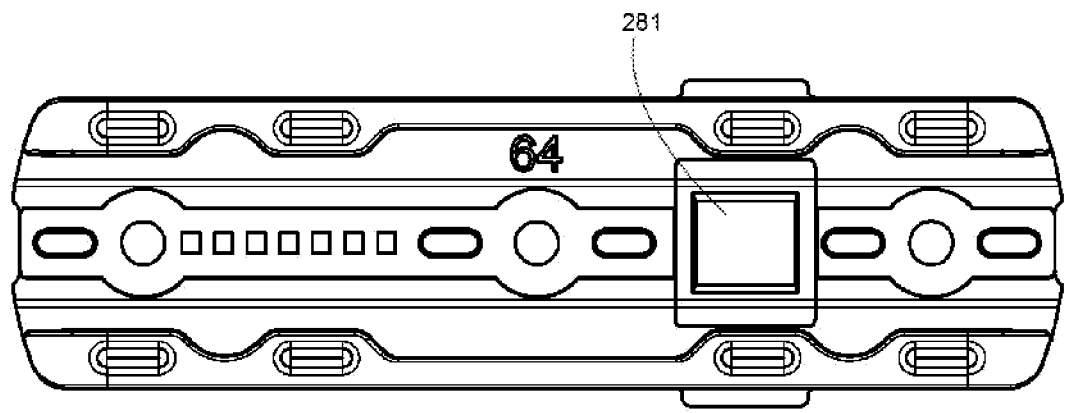
FIG. 21 is a bottom view of a second embodiment of the drip emitter.
Figure 22:
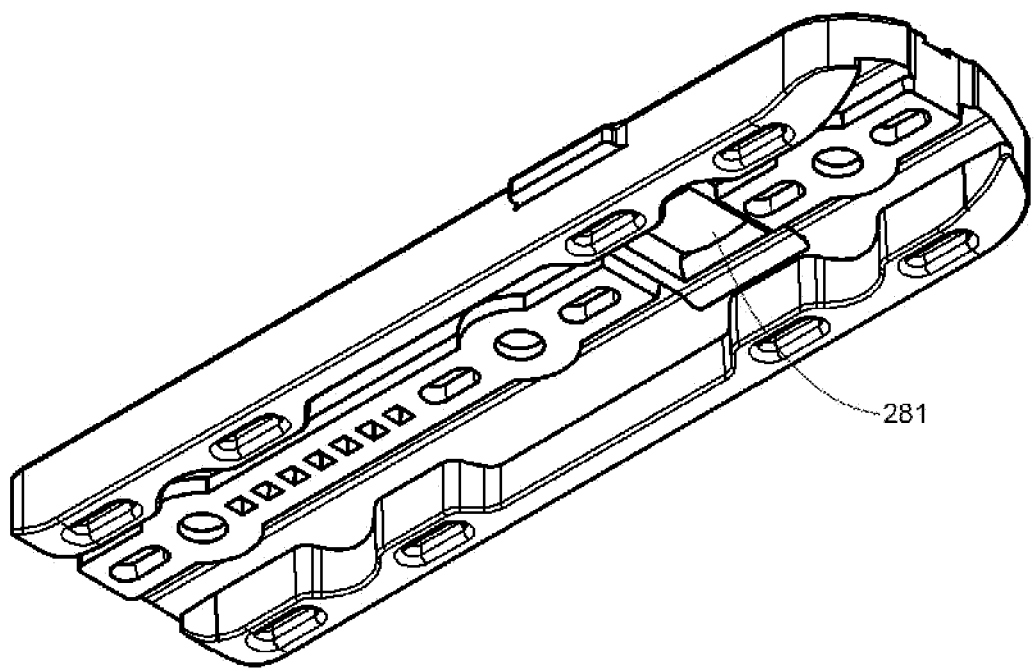
FIG. 22 is a perspective bottom view of a second embodiment of the drip emitter.

FIG. 21 is a bottom view of a second embodiment of the drip emitter. In this view, the drip emitter is shown as 29.8 mm in length and 8.4 mm in width. Any length or width of drip emitter can be manufactured depending on the implementation requirements. FIG. 22 is a perspective bottom view of a second embodiment of the drip emitter.

Figure 23:
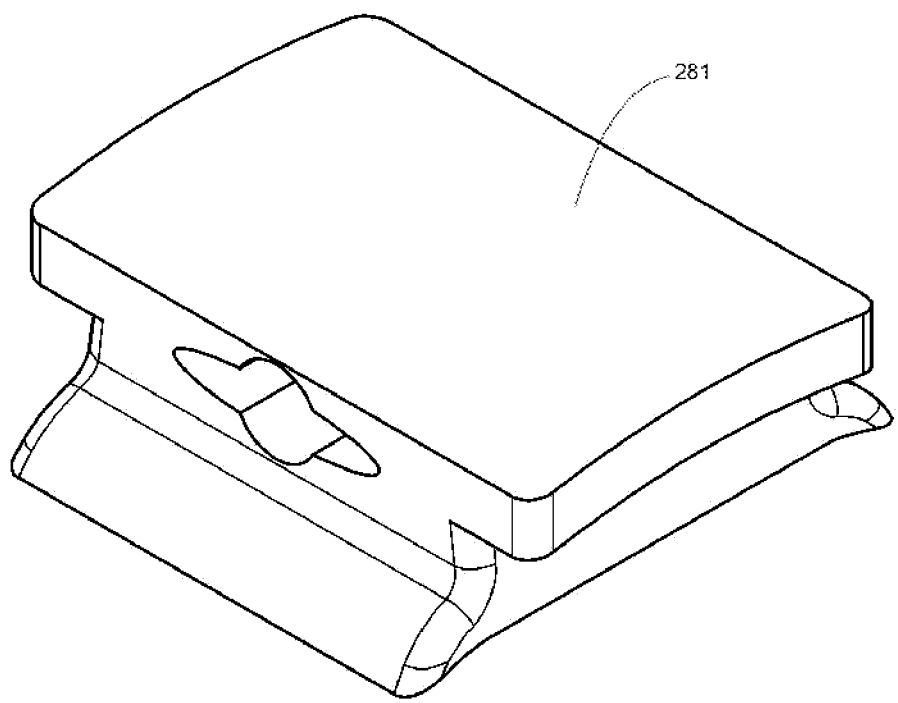
FIG. 23 is a perspective view of a second embodiment of the water retainment valve.
Figure 24:
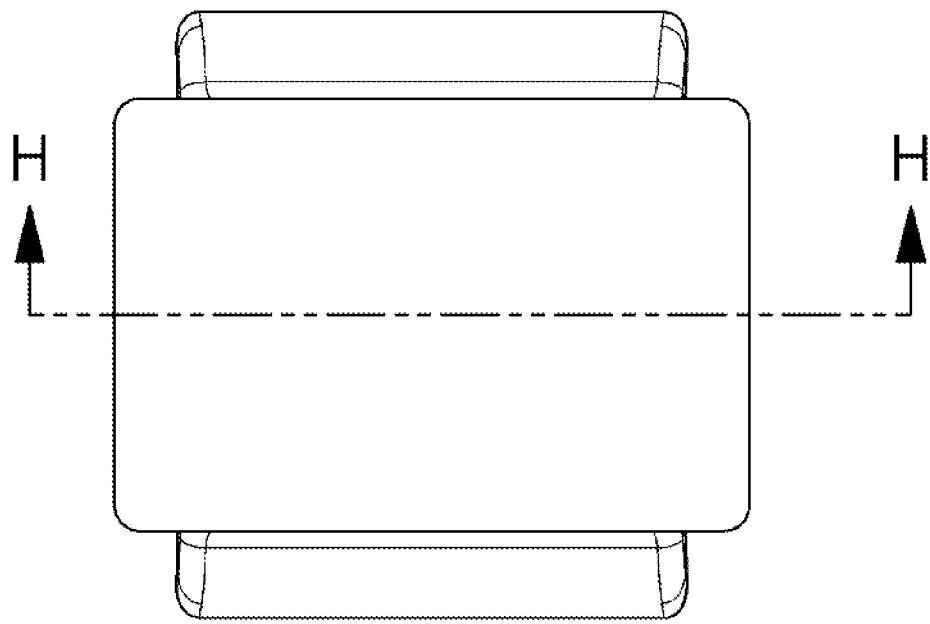
FIG. 24 is a top view of a second embodiment of the water retainment valve.
Figure 25:
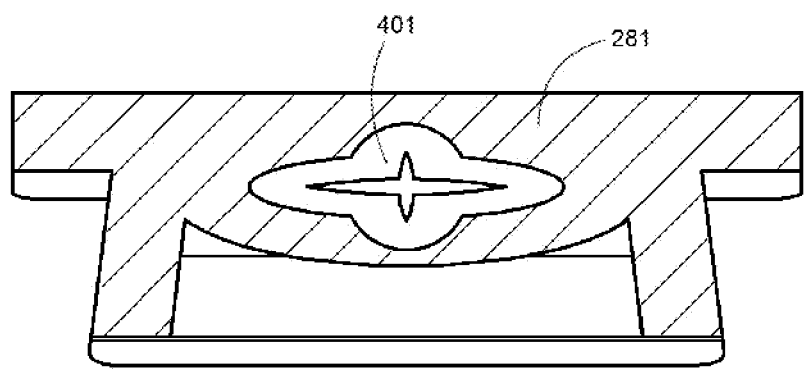
FIG. 25 is an end cross-section view of a second embodiment of the water retainment valve shown in FIG. 24.
Figure 26:
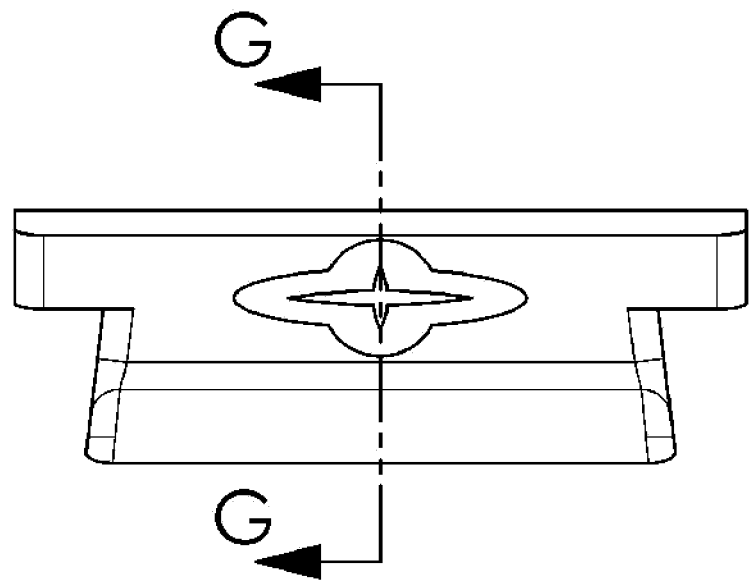
FIG. 26 is end view of a second embodiment of the water retainment valve.
Figure 27:
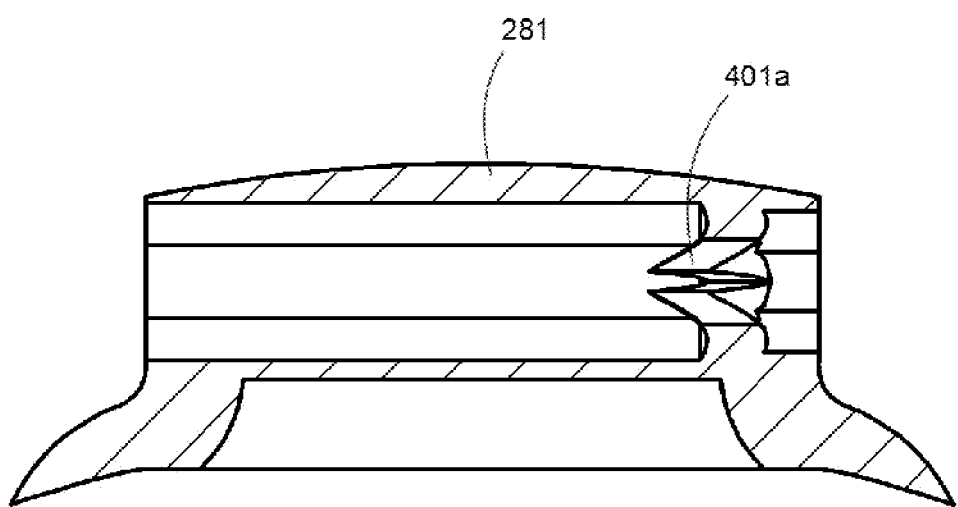
FIG. 27 is a side cross-section view of a second embodiment of the water retainment valve shown in FIG. 26.
Figure 28:
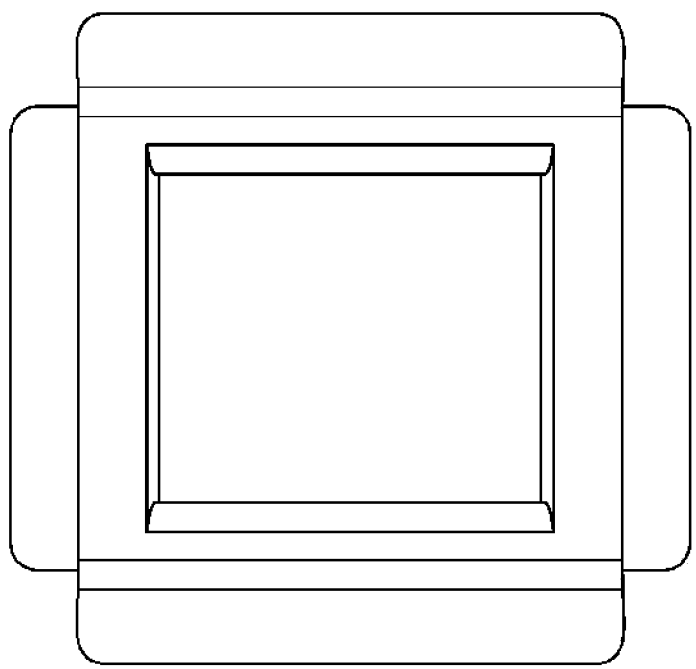
FIG. 28 is a bottom view of a second embodiment of the water retainment valve.

FIG. 23 is a perspective view of a second embodiment of the water retainment valve. FIG. 24 is a top view of a second embodiment of the water retainment valve. FIG. 25 is an end cross-section view of a second embodiment of the water retainment valve shown in FIG. 24. In this embodiment, flaps 401 in water retainment valve 281 are shown from the end. FIG. 26 is end view of a second embodiment of the water retainment valve. FIG. 27 is a side cross-section view of a second embodiment of the water retainment valve shown in FIG. 26. In this embodiment, flaps 401a point inward under no pressure and form a non-drain embodiment of the water retention valve. FIG. 28 is a bottom view of a second embodiment of the water retainment valve.

Figure 29:
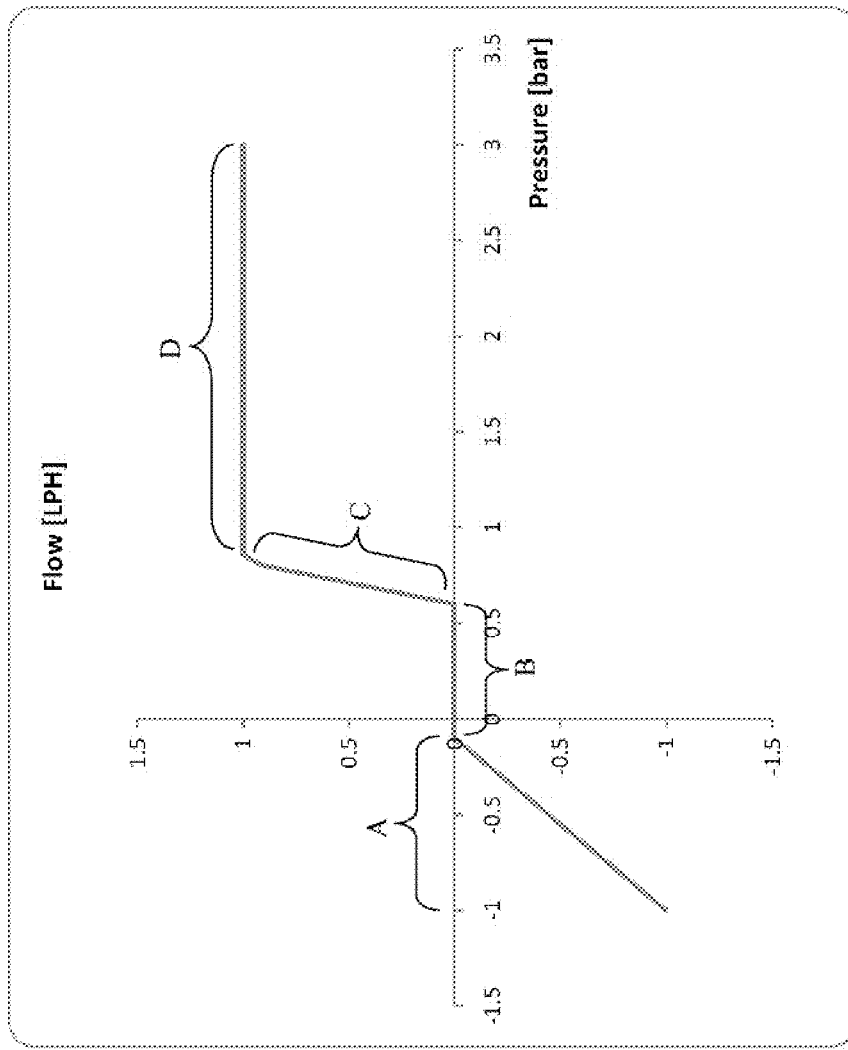
FIG. 29 is a graph of flow versus pressure in a non-drain embodiment of the water retainment valve.

FIG. 29 is a graph of flow versus pressure in a non-drain embodiment of the water retainment valve. In FIG. 29, the water retention valve is constructed with inwardly pointing flaps (against the flow of water in the water path) that touch one another under zero pressure difference. As shown in flow area A, under negative pressure, air can backflow into the drip emitter as the flaps point inward and are easily opened under negative pressure. As shown in flow area B, at a pressure slightly below atmospheric pressure within the drip emitter up until a particular threshold, for example 0.5 atmosphere higher than atmospheric pressure, there is no water flow out of the drip emitter as the inwardly pointing flaps are pressed against one another under the pressure. As shown in flow area C, at above 0.5 atmosphere pressure difference between internal drip emitter and atmospheric pressure, the flaps are forced in the opposite direction along the water flow path and begin to open. As shown in flow area D, once the flaps have fully opened, the water flow rate is limited by the resistance to water flow within the drip emitter water flow path.

In FIG. 30, the water retention valve is constructed with inwardly pointing flaps (against the flow of water in the water path) that do not touch one another under zero pressure difference. For example, there is a slight gap between the flaps under no pressure difference between internal and external drip emitter pressure. As shown in flow area A, under negative pressure, air can backflow into the drip emitter as the flaps point inward and are easily opened under negative pressure. As shown in flow area E, water slightly flows through the flaps until the flaps have enough pressure against them, which requires a slight flow of water to press the flaps together. As shown in flow area B, at a pressure slightly above atmospheric pressure within the drip emitter up until a particular threshold, for example 0.5 atmosphere higher than atmospheric pressure, there it no water flow out of the drip emitter as the inwardly pointing flaps are pressed against one another under the pressure. As shown in flow area C, at above 0.5 atmosphere pressure difference between internal drip emitter and atmospheric pressure, the flaps are forced in the opposite direction along the water flow path and begin to open. As shown in flow area D, once the flaps have fully opened, the water flow rate is limited by the resistance to water flow within the drip emitter water flow path.

Figure 31:
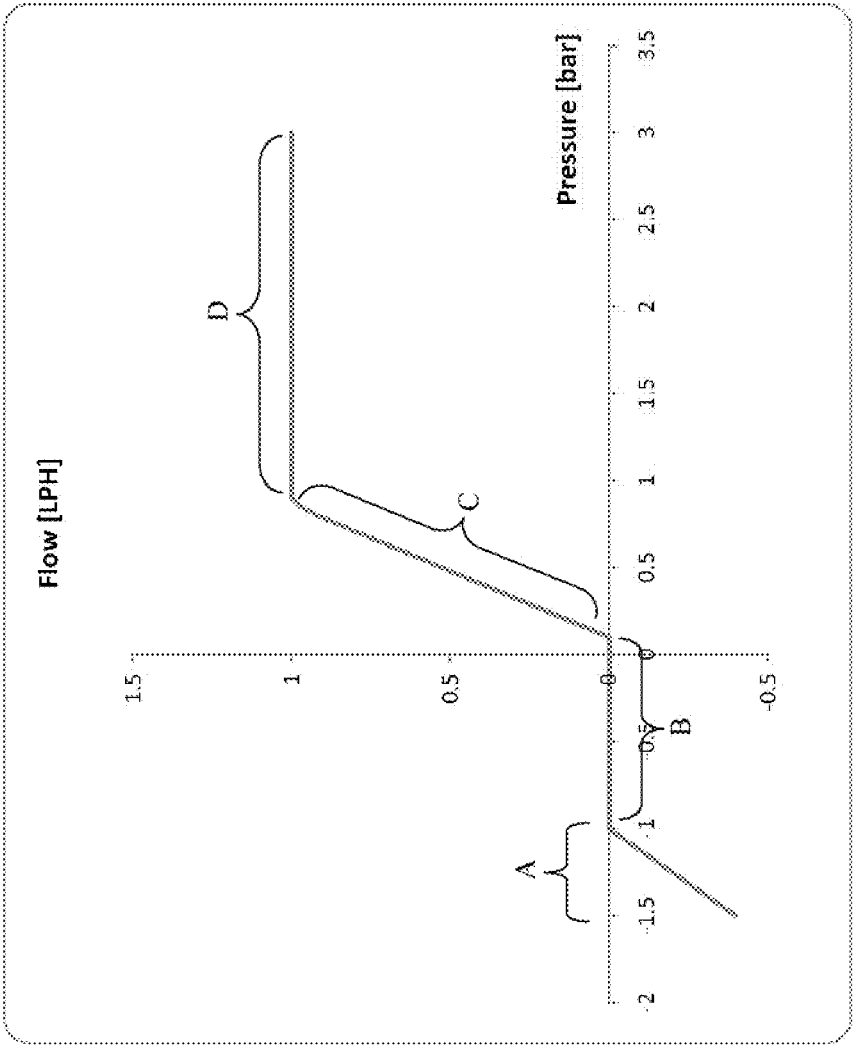
FIG. 31 is a graph of flow versus pressure in ventable and anti-siphon embodiments of the water retainment valve.

FIG. 31 is a graph of flow versus pressure in ventable and anti-siphon embodiments of the water retainment valve. In FIG. 31, the water retention valve is constructed with outwardly pointing flaps (aligned in the direction of the flow of water in the water path when irrigating) that touch one another under zero pressure difference. As shown in flow area A, under negative pressure, air can backflow into the drip emitter as the flaps change direction to point inward and are thus opened under negative pressure. As shown in flow area B, at a negative pressure below atmospheric pressure within the drip emitter up until a particular threshold, for example 0.1 atmosphere higher than atmospheric pressure, there it no water flow out of the drip emitter as the outwardly pointing flaps are pressed against one another. As shown in flow area C, at above for example 0.1 atmosphere pressure difference between internal drip emitter and atmospheric pressure, the flaps are pointed in the direction along the water flow path and begin to open. As shown in flow area D, once the flaps have fully opened, the water flow rate is limited by the resistance to water flow within the drip emitter water flow path.

FIG. 32 is a graph of flow versus pressure in ventable and anti-siphon embodiments of the water retainment valve with flaps that are not fully closed at zero pressure difference. In FIG. 32, the water retention valve is constructed with outwardly pointing flaps (in the direction of the flow of water in the water path during irrigation) that do not touch one another under zero pressure difference. For example, there is a slight gap between the flaps under no pressure difference between internal and external drip emitter pressure. As shown in flow area A, under negative pressure, air can backflow into the drip emitter as the flaps change direction to point inward and are thus opened under negative pressure. As shown in flow area B, at a negative pressure below atmospheric pressure within the chip emitter up until a particular threshold, for example −0.1 atmosphere lower than atmospheric pressure, there it no water flow out of the drip emitter as the outwardly pointing flaps are pressed against one another. As shown in flow area E, air slightly flows through the flaps into the drip emitter until the flaps have enough pressure against them, which requires a slight flow of inward flow of air (or any other matter) to press the flaps together. As shown in flow area C, at above for example 0.0 atmosphere pressure difference between internal drip emitter and atmospheric pressure, the flaps are pointed in the direction along the water flow path and are already slightly open at zero pressure difference. The flaps begin to open more as the pressure difference increases. As shown in flow area D, once the flaps have fully opened, the water flow rate is limited by the resistance to water flow within the drip emitter water flow path.

Figure 33:
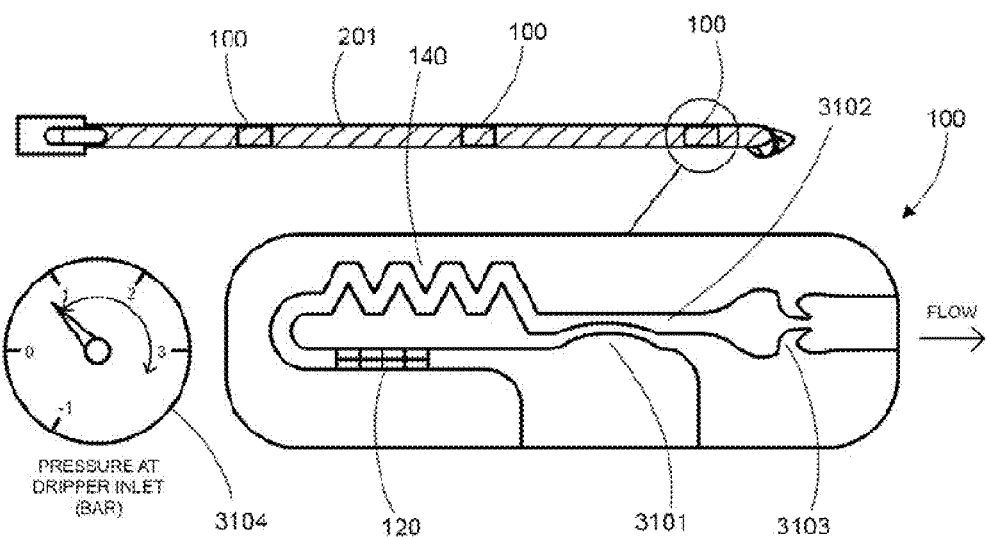
FIG. 33 shows a view of the pressure compensation and ventable valve components at a given pressure range depicted at flow D in FIGS. 29 and 30.

FIG. 33 shows a view of the pressure compensation and ventable valve components at a given pressure range depicted at flow D in FIGS. 29 and 30. In this view, under positive relative pressure as shown at pressure chart 3104, pressure compensation element 3101 bends toward water flow path 3102 which tends to limit the flow of water through water flow path 3102 as the pressure rises. Under normal positive water flow through water flow path 3102, flaps 3103 that form a water retainment valve are open and water flow exits drip emitter 100 to water an agricultural area for example.

Figure 34:
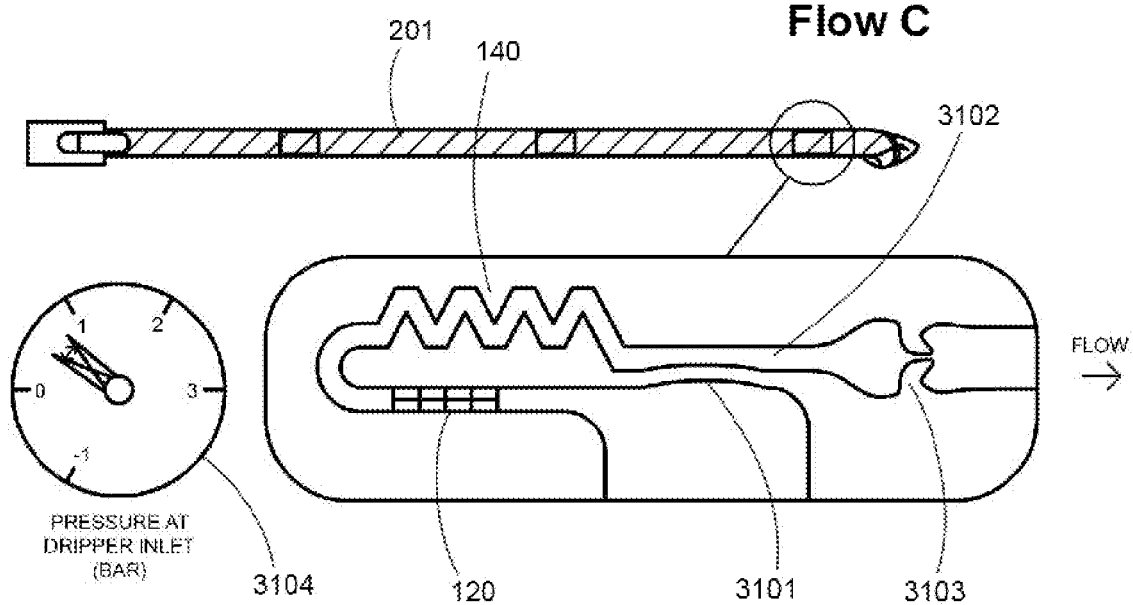
FIG. 34 shows a view of the pressure compensation and ventable valve components at a given pressure range depicted at flow C in FIGS. 29 and 30.

FIG. 34 shows a view of the pressure compensation and ventable valve components at a given pressure range depicted at flow C in FIGS. 29 and 30. In this view, under a positive threshold pressure, positive water flow occurs through drip emitter 100. Pressure compensation element 3101 is not active to the point of limiting the flow out of the drip emitter as the pressure is low enough so that pressure compensation element 3101 does not bend into water flow path 3102. Flaps 3103 are slightly open under this input pressure and a slight flow of water exits the drip emitter.

Figure 35:
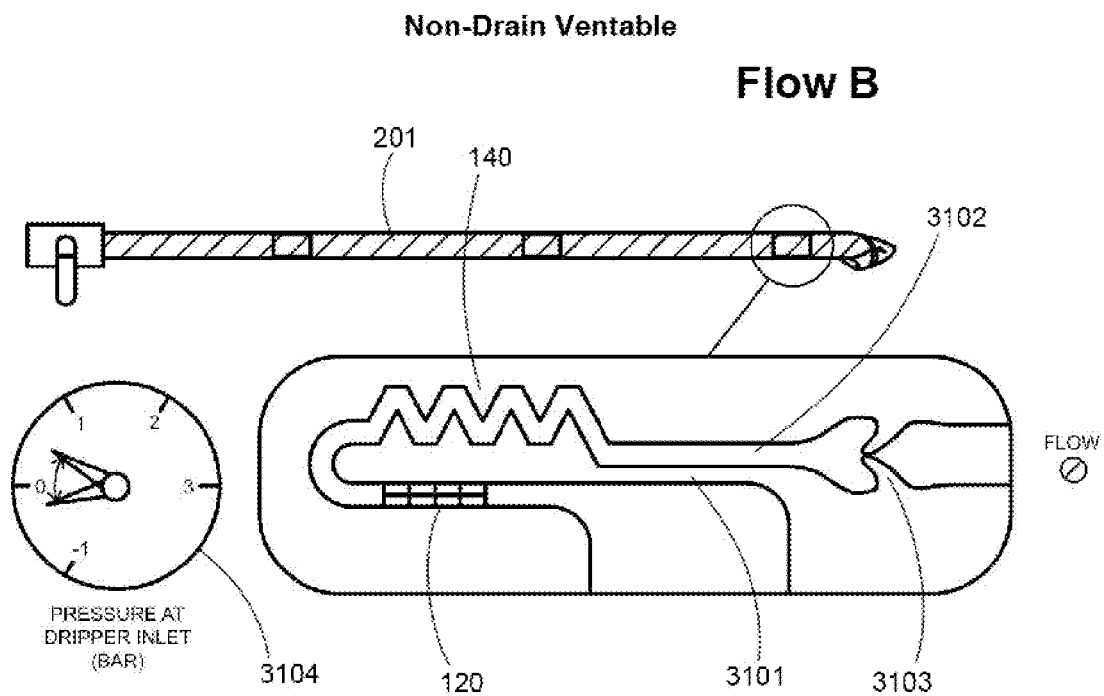
FIG. 35 shows a view of the pressure compensation and ventable valve components at a given pressure range depicted at flow B in FIGS. 29 and 30.

FIG. 35 shows a view of the pressure compensation and ventable valve components at a given pressure range depicted at flow B in FIGS. 29 and 30. In this view, under a small and/or negative pressure, flaps 3103 change direction to point into the drip emitter. Although no flow of air enters the drip emitter, a small increase in negative pressure results in the state shown in FIG. 36.

Figure 36:
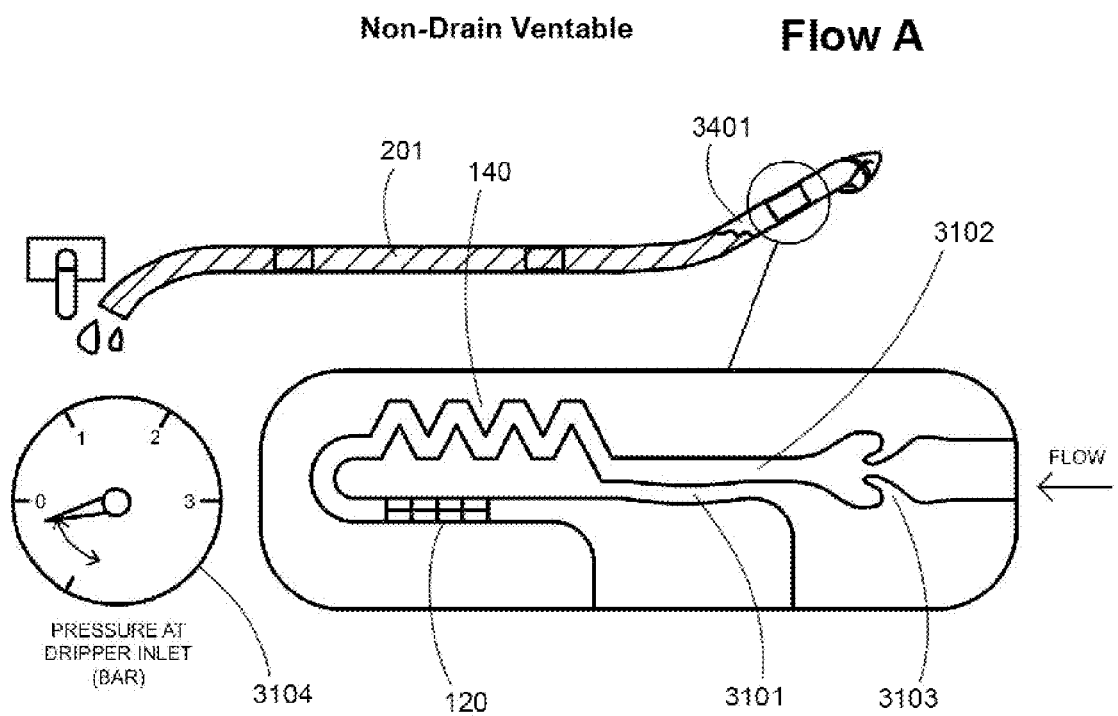
FIG. 36 shows a view of the pressure compensation and ventable valve components at a given pressure range depicted at flow A in FIGS. 29 and 30.

FIG. 36 shows a view of the pressure compensation and ventable valve components at a given pressure range depicted at flow A in FIGS. 29 and 30. In this view, which corresponds to a ventable embodiment which allow for pipe draining and rolling for example, flaps 3103 open as a large enough backflow pressure threshold is applied to the pipe with respect to atmospheric pressure external to the pipe. As flaps 3103 open, air 3401 (or water), enters water flow path 3102, labyrinth 140, filter 120 and pipe 201.

Figure 37:
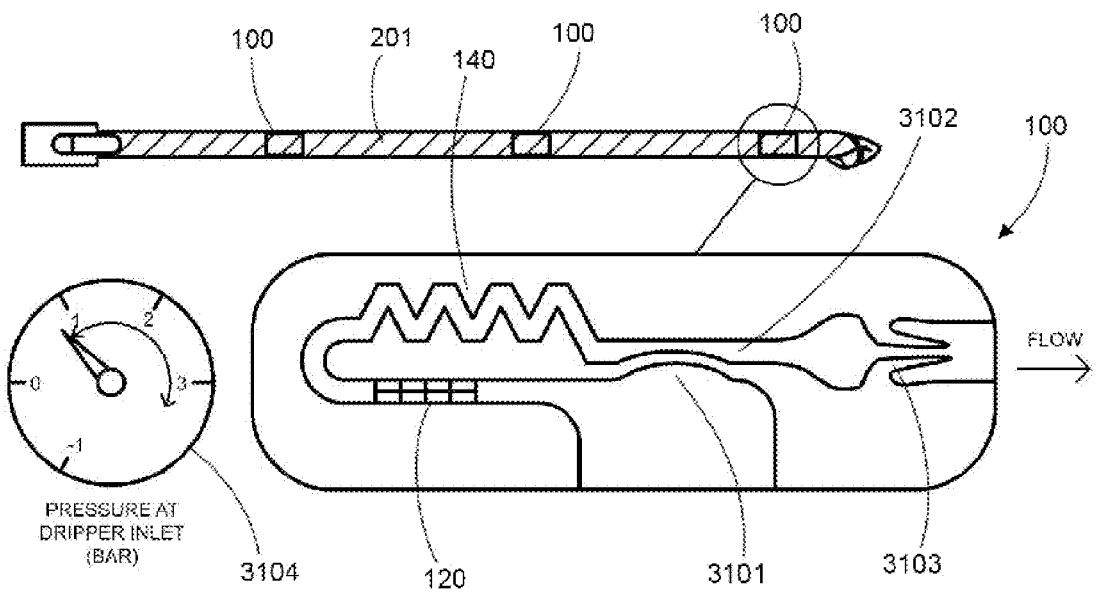
FIG. 37 shows a view of the pressure compensation and ventable valve components at a given pressure range depicted at flow D in FIGS. 31 and 32.

FIG. 37 shows a view of the pressure compensation and ventable valve components at a given pressure range depicted at flow D in FIGS. 31 and 32. In this view, under positive relative pressure as shown at pressure chart 3104, pressure compensation element 3101 bends toward water flow path 3102 which tends to limit the flow of water through water flow path 3102 as the pressure rises. Under normal positive water flow through water flow path 3102, flaps 3103 that form a water retainment valve are open and water flow exits drip emitter 100 to water an agricultural area for example.

Figure 38:
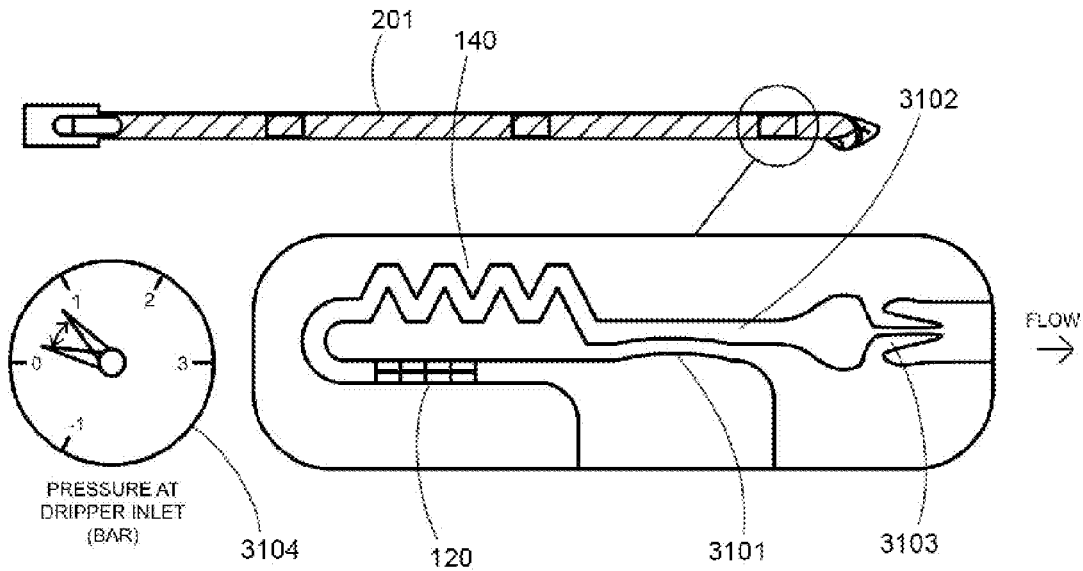
FIG. 38 shows a view of the pressure compensation and ventable valve components at a given pressure range depicted at flow C in FIGS. 31 and 32.

FIG. 38 shows a view of the pressure compensation and ventable valve components at a given pressure range depicted at flow C in FIGS. 31 and 32. In this view, under a positive threshold pressure, positive water flow occurs through drip emitter 100. Pressure compensation element 3101 is not active to the point of limiting the flow out of the drip emitter as the pressure is low enough so that pressure compensation element 3101 does not bend into water flow path 3102. Flaps 3103 are slightly open under this input pressure and a slight flow of water exits the drip emitter.

Figure 39:
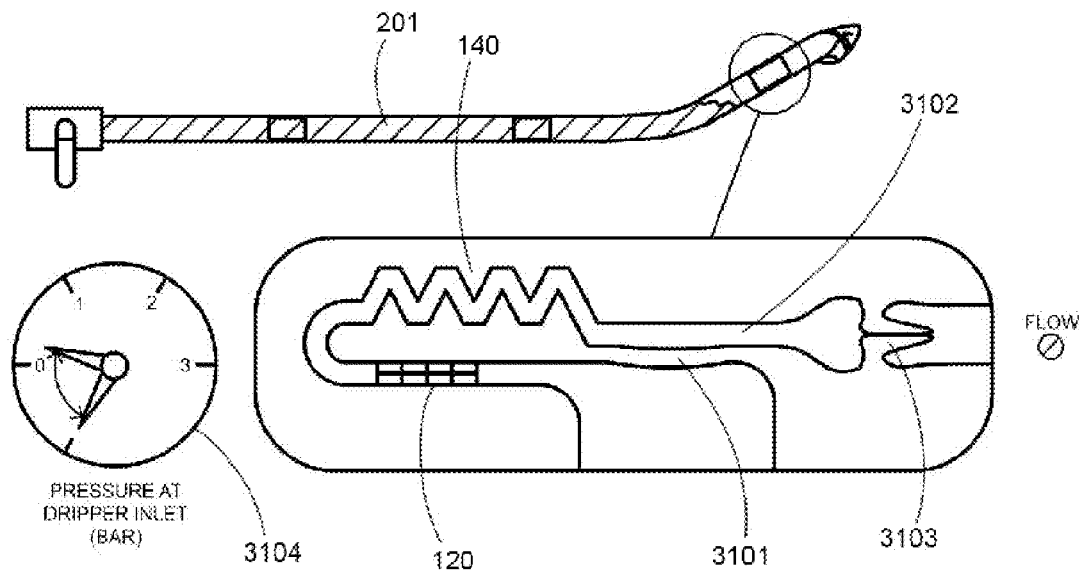
FIG. 39 shows a view of the pressure compensation and ventable valve components at a given pressure range depicted at flow B in FIGS. 31 and 32.

FIG. 39 shows a view of the pressure compensation and ventable valve components at a given pressure range depicted at flow B in FIGS. 31 and 32. In this view, under a small and/or negative pressure, flaps 3103 change direction to point into the drip emitter. Although no flow of an enters the drip emitter, a small increase in negative pressure results in the state shown in FIG. 40.

Figure 40:
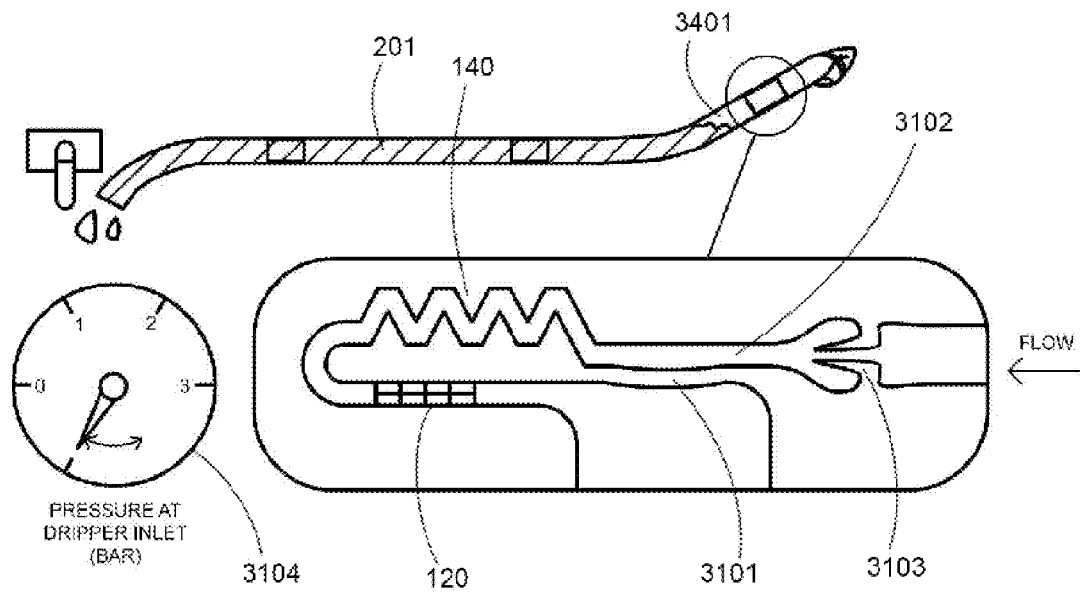
FIG. 40 shows a view of the pressure compensation and ventable valve components at a given pressure range depicted at flow A in FIGS. 31 and 32.

FIG. 40 shows a view of the pressure compensation and ventable valve components at a given pressure range depicted at flow A in FIGS. 31 and 32. In this view, which corresponds to a ventable embodiment which allow for pipe draining and rolling for example, flaps 3103 open as a large enough backflow pressure threshold is applied to the pipe with respect to atmospheric pressure external to the pipe. As flaps 3103 open, air 3401 (or water), enters water flow path 3102, labyrinth 140, filter 120 and pipe 201.

Figure 41:
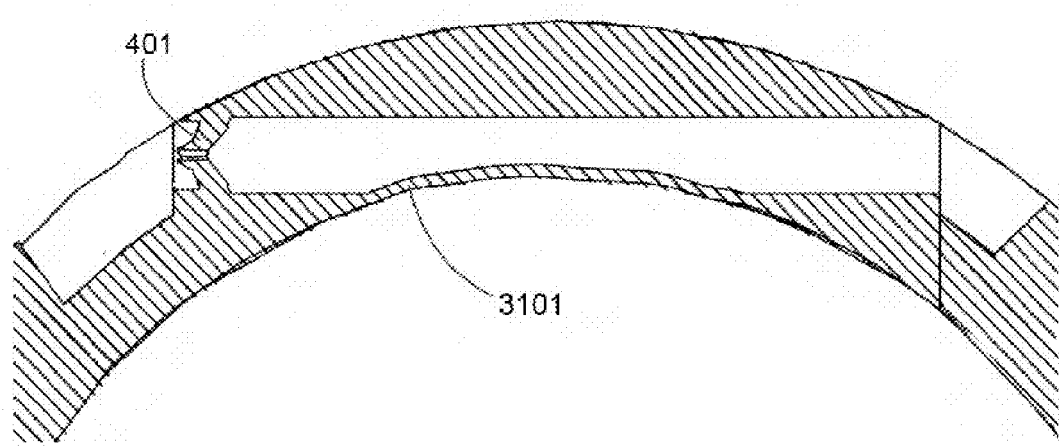
FIG. 41 shows a side cross-section view of the pressure compensation and ventable valve components at a given pressure range depicted at flow D in FIGS. 29 and 30.

FIG. 41 shows a side cross-section view of the pressure compensation and ventable valve components at a given pressure range depicted at flow D in FIGS. 29-32. This corresponds to the pressure range shown in FIG. 34 (also see FIG. 38) with slight positive water flow from the drip emitter.

Figure 42:
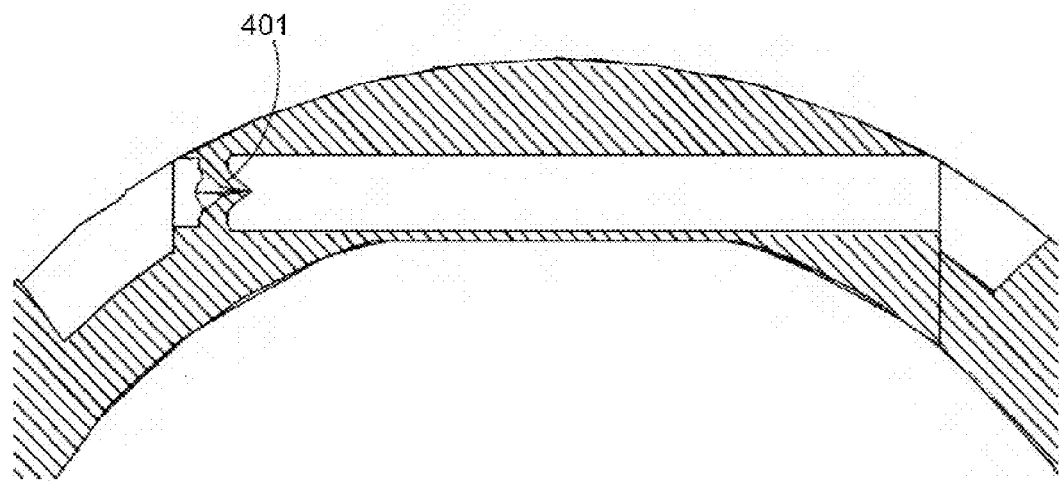
FIG. 42 shows a side cross-section view of the pressure compensation and ventable valve components at a given pressure range depicted at flow B in FIGS. 29 and 30.

FIG. 42 shows a side cross-section view of the pressure compensation and ventable valve components at a given pressure range depicted at flow B in FIGS. 29-32. This corresponds to the pressure range shown in FIG. 35 for a ventable embodiment at the point of allowing air to enter the drip emitter.

Figure 43:
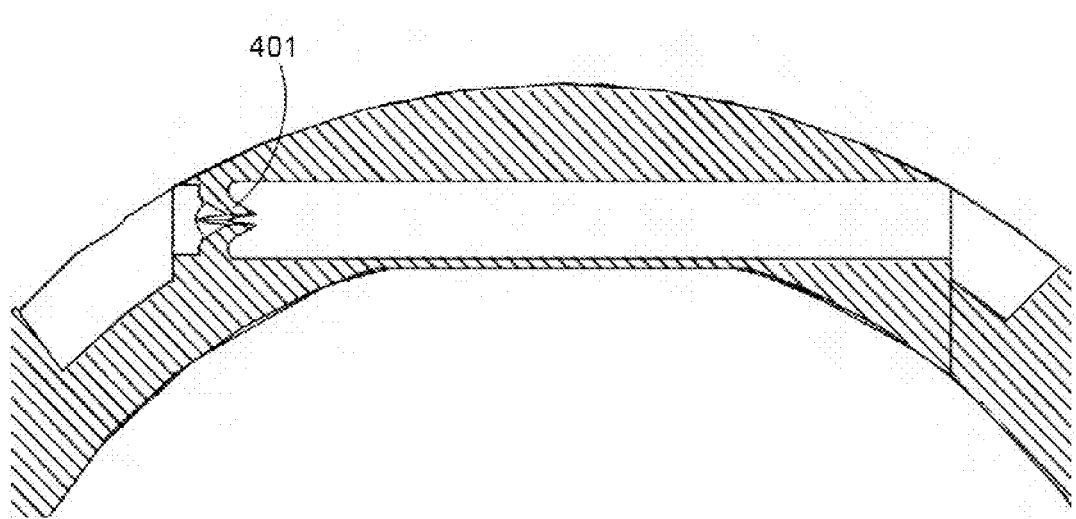
FIG. 43 shows a side cross-section view of the pressure compensation and ventable valve components at a given pressure range depicted at flow A in FIGS. 29 and 30.

FIG. 43 shows a side cross-section view of the pressure compensation and ventable valve components at a given pressure range depicted at flow A in FIGS. 29-32. This corresponds to the pressure range shown in FIG. 36 for a ventable embodiment with air entering the drip emitter.

Figure 44:
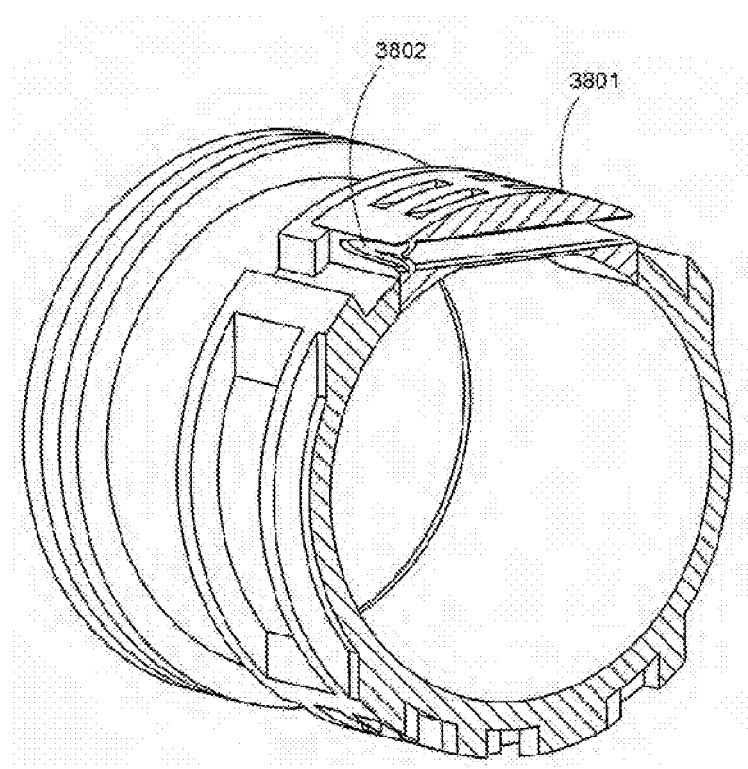
FIG. 44 shows a perspective end view of a non-drain valve showing flaps pointing inward under no pressure.

FIG. 44 shows a perspective end view of an anti-siphon water retainment valve embodiment 3801 showing flaps 3802 pointing outwardly (to the left in the figure) under no pressure. This embodiment allows for no entry of air under negative pressure if the flaps are long, if the flaps are short, then the valve can be vented. (See flow area A of FIG. 31). By constructing the flaps slightly shorter, the flaps are able to flip direction, which creates a ventable embodiment of the water retention valve that allows for rolling up the enclosing pipe for example by allowing air to enter the water retention valve when for example a low pressure is applied to the water in the enclosing pipe. (See flow area A of FIG. 32).

Figure 45:
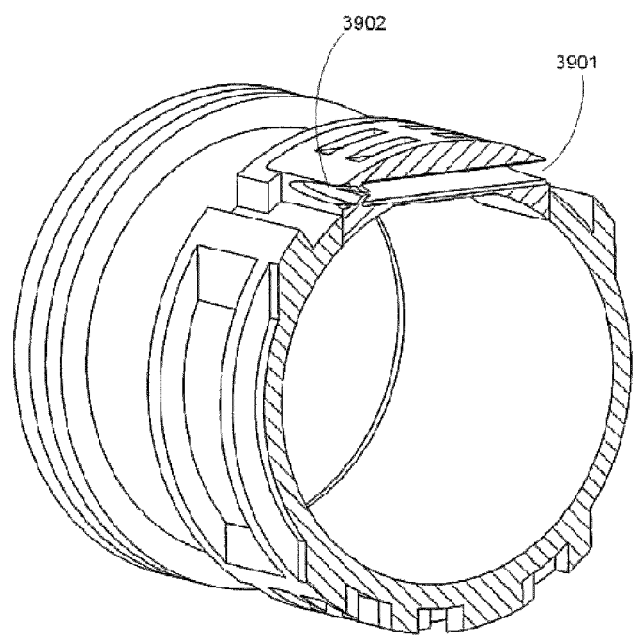
FIG. 45 shows a perspective end view of a non-drain valve showing flaps pointing outward under no pressure.

FIG. 45 shows a perspective end view of a non-drain water retainment valve embodiment 3901 showing flaps 3902 pointing inwardly (to the right in the figure) under no pressure. Depending on the construction of the flaps, i.e., whether slightly touching or not under zero pressure difference between internal drip emitter pressure and external atmospheric pressure. (see flow areas in FIGS. 29A-B).

Figure 46:
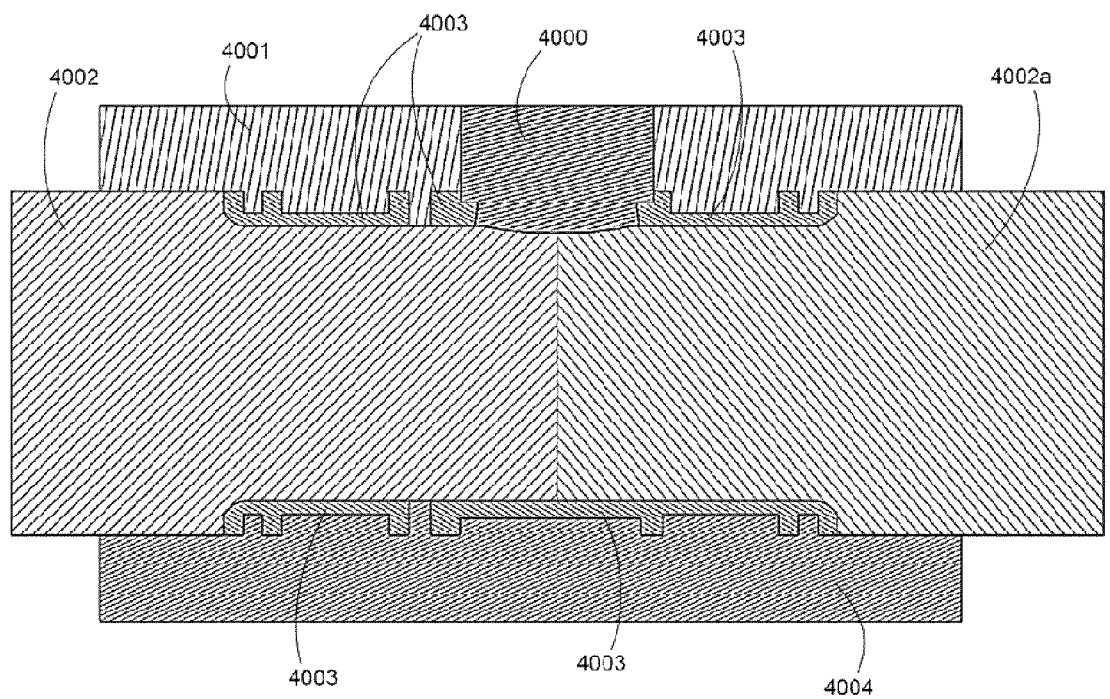
FIG. 46 shows a side cross-section view of an injection mold for manufacture of an embodiment of the invention.

FIG. 46 shows a side cross-section view of an injection mold for manufacture of an embodiment of the invention. In this view, drip emitter content 4003 is shown as injected into injection mold with bottom 4004, elements 4002 and 4002a and injection mold top 4001 that form the remainder of mold for the exterior of drip emitter content 4003. Water retainment valve place holder 4000 creates a void in which a water retainment valve may be formed using the same injection mold with a second injection.

Figure 47:
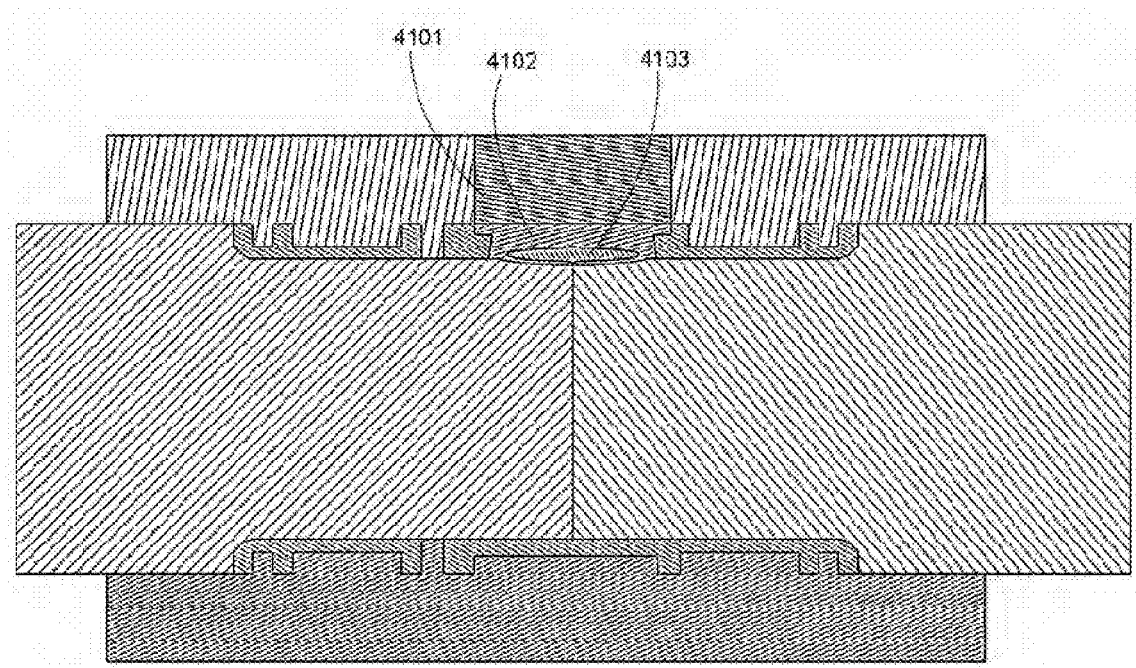
FIG. 47 shows an opposing side cross-section view with respect to FIG. 40 of an injection mold for manufacture of an embodiment of the invention.

FIG. 47 shows an opposing side cross-section view with respect to FIG. 46 of an injection mold for manufacture of an embodiment of the invention. In this view, water retainment valve injection mold top 4101 replaces water retainment valve place holder 4000 for the second injection. As shown, water retainment valve content 4102 is injected into the mold wherein the material may be elastomeric for example. Block 4103 prohibits water retainment valve content 4102 from an internal portion of the water retainment valve.

Figure 48:
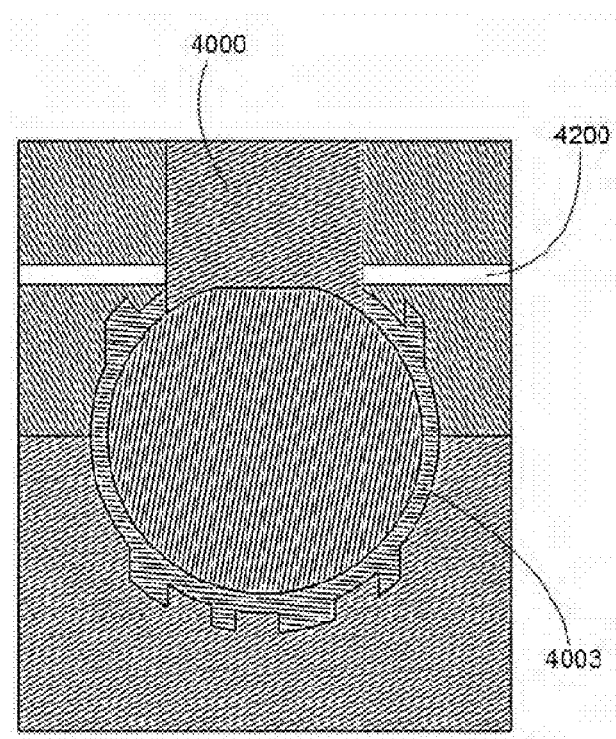
FIG. 48 shows an end cross-section view of an injection mold for manufacture of an embodiment of the invention.

FIG. 48 shows an end cross-section view of an injection mold for manufacture of an embodiment of the invention. In this embodiment, water retainment valve place holder 4000 is in place for the first injection of drip emitter content 4003.

Figure 49:
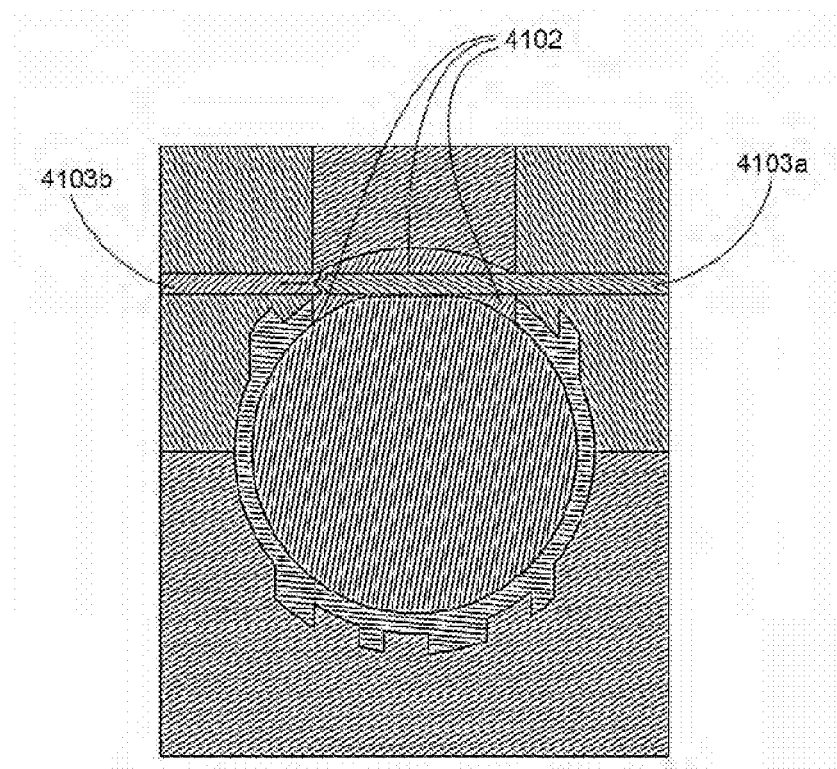
FIG. 49 shows an end cross-section view of an injection mold for manufacture of an embodiment of the invention showing an insert for creation of an embodiment of the pressure compensated ventable valve.

FIG. 49 shows an end cross-section view of an injection mold for manufacture of an embodiment of the invention showing an insert for creation of an embodiment of the pressure compensated ventable valve. In this view, block 4103a and 4103b are shown in cross section which create a void which is the internal portion of pressure compensation and water retainment valve 4102.

Figure 50:
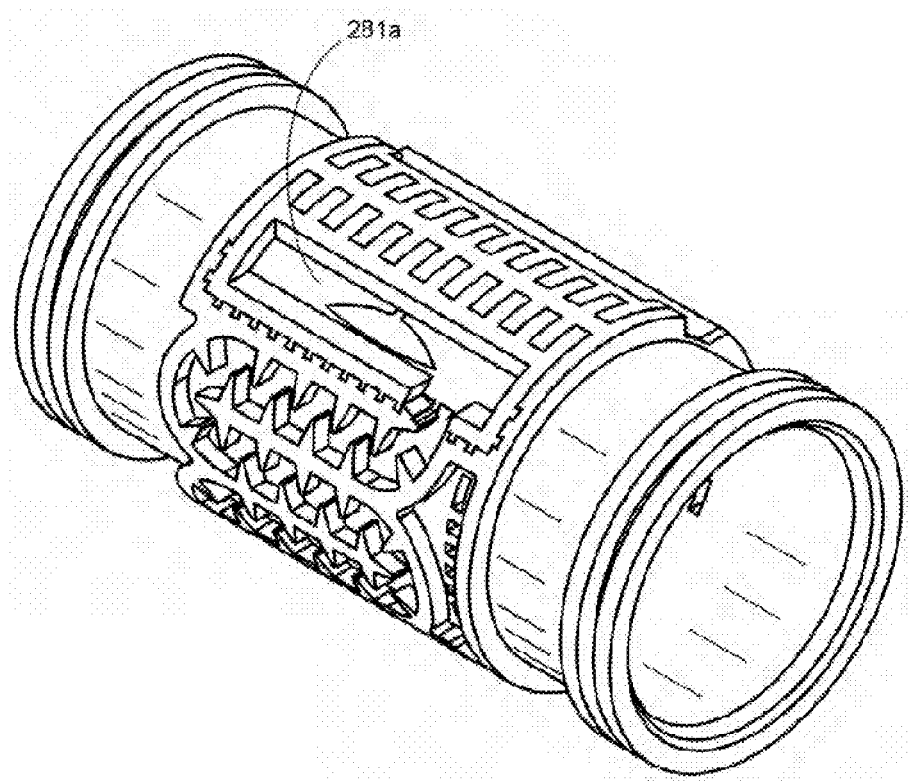
FIG. 50 shows a perspective side view of an embodiment that enables mechanical engagement of the water retention valve with the drip emitter with area that holds the water retention valve visible.
Figure 57:
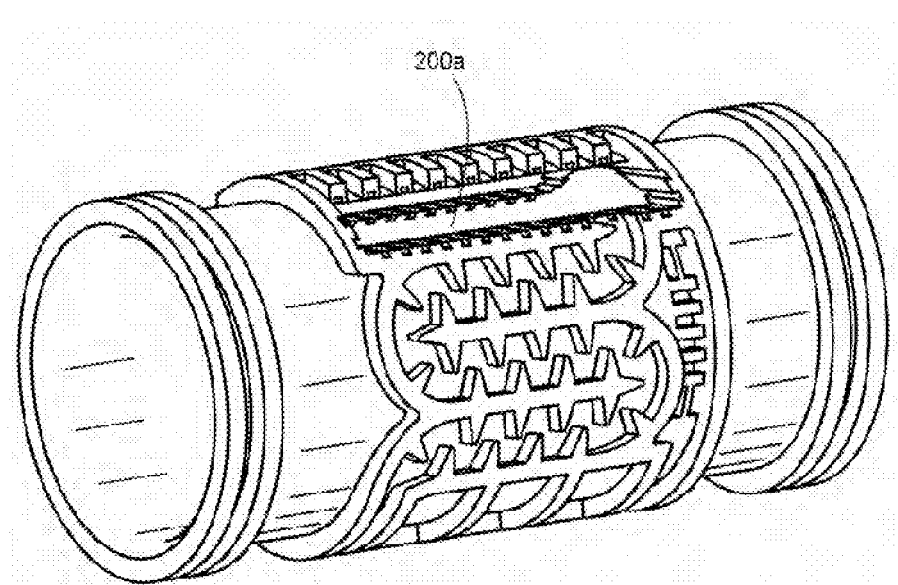
FIG. 57 shows an empty area that is configured as the water retainment valve slot.
Figure 60:
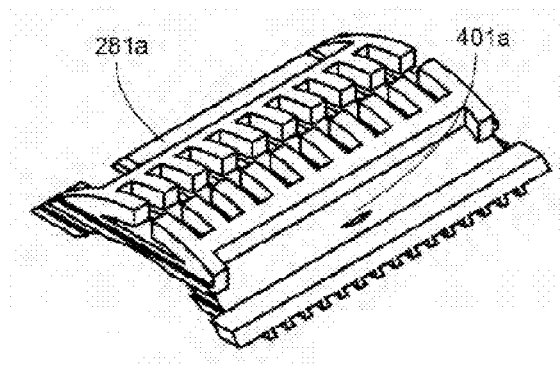
FIG. 60 shows a perspective view of an embodiment of mechanically engaged water retention valve having flaps.
Figure 61:
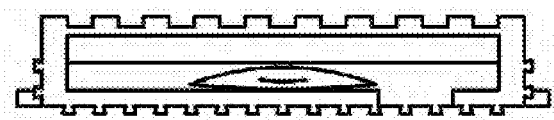
FIG. 61 shows a side view of the mechanically engaged water retention valve of FIG. 60.

FIG. 50 shows a perspective side view of an embodiment that enables mechanical engagement of the water retention valve with the drip emitter with area that holds the water retention valve visible. In this figure, water retainment valve 281a is mechanically engaged (as per the water retainment valve slot 200a as shown in FIG. 57) before enclosing the drip emitter in an enclosing pipe via for example teeth 4701 (as shown in FIG. 60-61).

Figure 51:
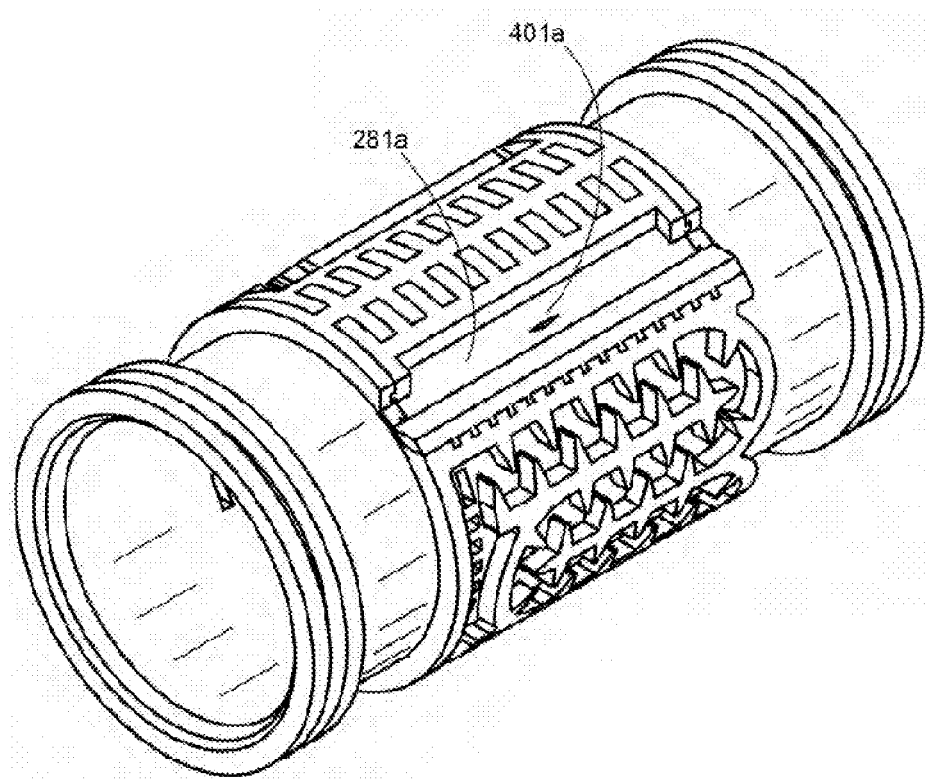
FIG. 51 shows a perspective view from a different angle with respect to FIG. 50.

FIG. 51 shows a perspective view from a different angle with respect to FIG. 50. In this figure. Flaps 401a are shown in water retention valve 281a.

Figure 52:
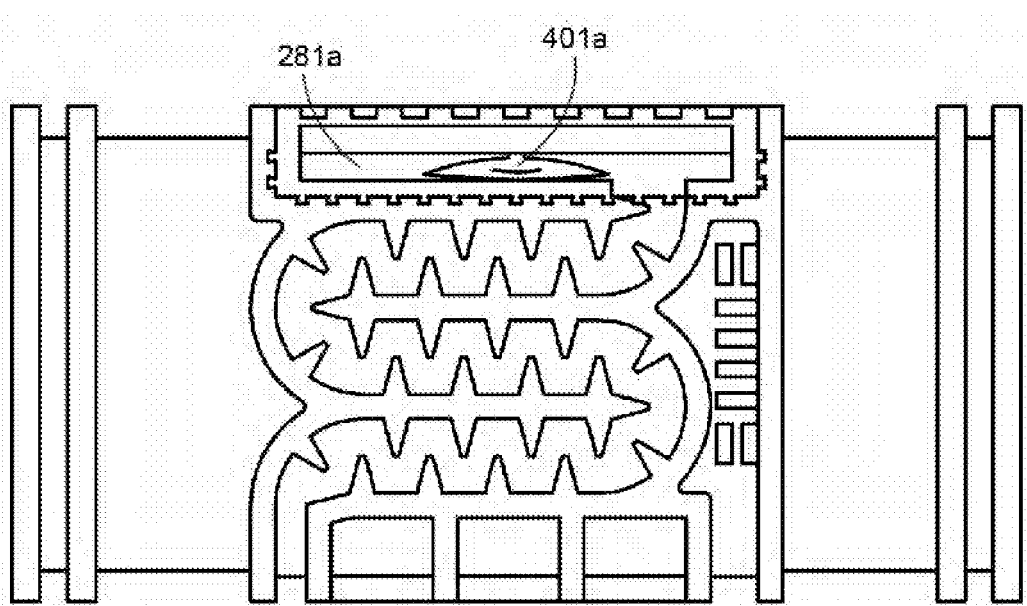
FIG. 52 shows a side view of an embodiment that enables mechanical engagement of the water retention valve with the drip emitter wherein the water retention valve is mechanically engaged to the drip emitter.

FIG. 52 shows a side view of an embodiment that enables mechanical engagement of the water retention valve with the drip emitter wherein the water retention valve is mechanically engaged to the drip emitter.

Figure 53:
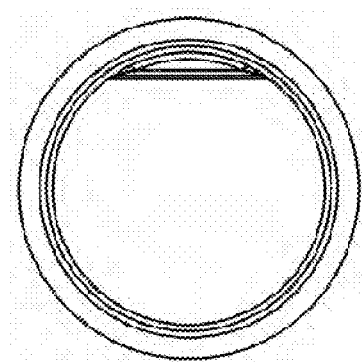
FIG. 53 shows an end view of the drip emitter with a mechanically engaged ventable embodiment of the water retention valve.

FIG. 53 shows an end view of the drip emitter with a mechanically engaged ventable embodiment of the water retention valve.

Figure 54:
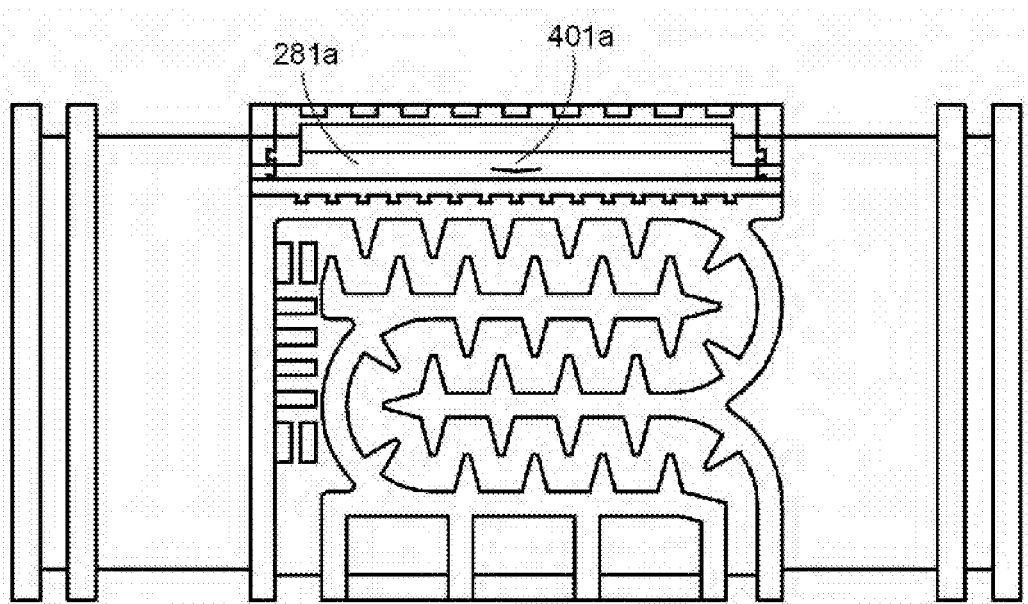
FIG. 54 shows a side view of the drip emitter with a mechanically engaged ventable embodiment of the water retention valve.

FIG. 54 shows a side view of the drip emitter with a mechanically engaged ventable embodiment of the water retention valve showing flaps 401a.

Figure 55:
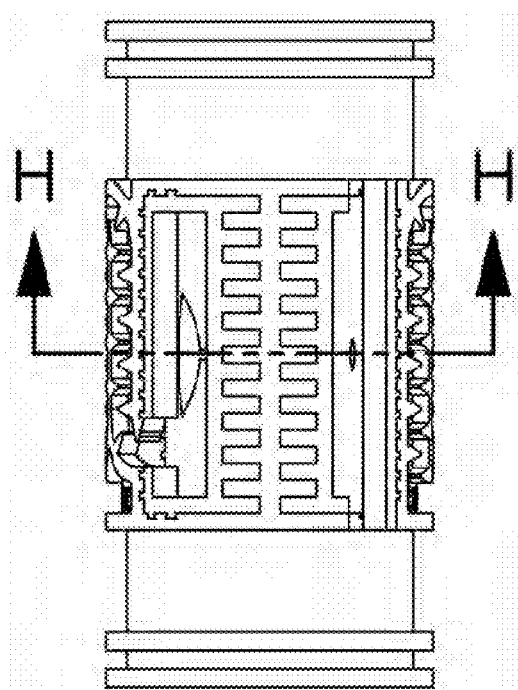
FIG. 55 shows a top view of the drip emitter with a mechanically engaged ventable embodiment of the water retention valve.

FIG. 55 shows a top view of the drip emitter with a mechanically engaged ventable embodiment of the water retention valve.

Figure 56:
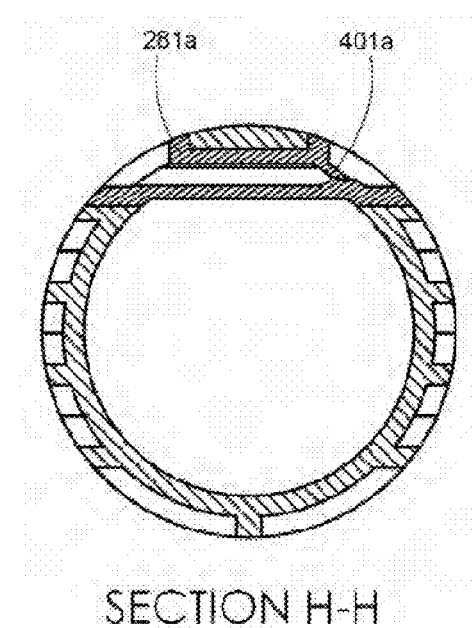
FIG. 56 shows a side cross-section view of the drip emitter along the section line of FIG. 55, with a mechanically engaged ventable embodiment of the water retention valve.

FIG. 56 shows a side cross-section view of the drip emitter along the section line of FIG. 55, with a mechanically engaged ventable embodiment of the water retention valve 281a, with water flow path where water moves from left to right in the figure during irrigation and exiting via flaps 401a.

FIG. 57 shows an empty area that is configured as water retainment valve slot 200a, into which water retainment valve is for example injected in.

Figure 58:
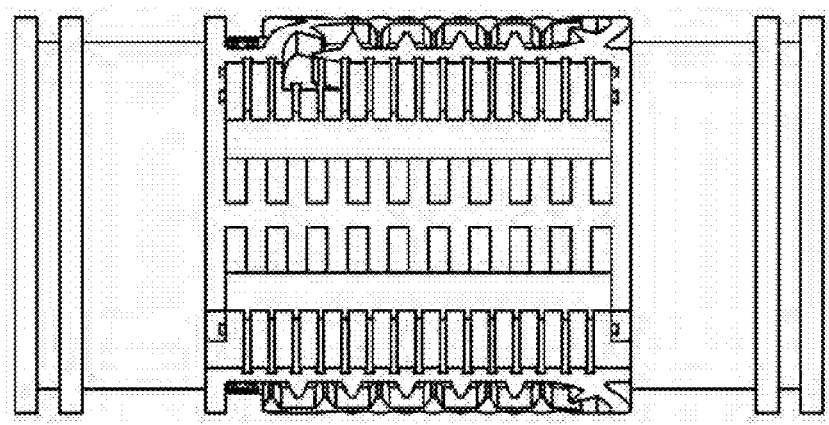
FIG. 58 shows a top view of FIG. 55 without the mechanically engaged water retention valve.

FIG. 58 shows a top view of FIG. 55 without the mechanically engaged water retention valve.

Figure 59:
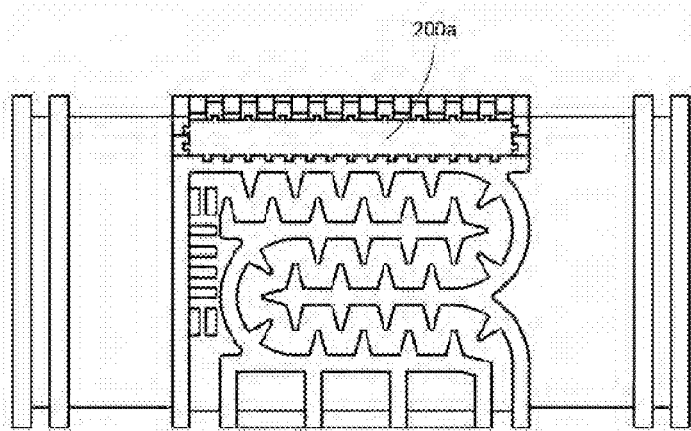
FIG. 59 shows a side view of the drip emitter showing the water retainment valve slot without a mechanically engaged water retention valve inserted.

FIG. 59 shows a side view of the drip emitter showing water retainment valve slot 200a without a mechanically engaged water retention valve inserted.

FIG. 60 shows a perspective view of an embodiment of mechanically engaged water retention valve 281a having flaps 401a and teeth 4701 for mechanical engagement with the drip emitter.

FIG. 61 shows a side view of the mechanically engaged water retention valve of FIG. 60 having teeth 4701 for mechanical engagement with the drip emitter.

Figure 62:
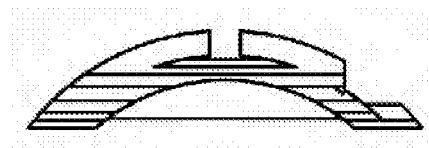
FIG. 62 shows a cross-section view of the mechanically engaged water retention valve of FIG. 61.

FIG. 62 shows an end view of the mechanically engaged water retention valve of FIG. 61.

Figure 63:
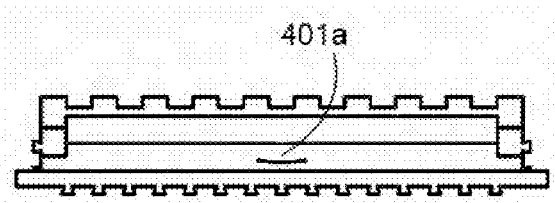
FIG. 63 shows an opposing side view of the mechanically engaged water retention valve of FIG. 61 showing flaps.

FIG. 63 shows an opposing side view of the mechanically engaged water retention valve of FIG. 61 showing flaps 401a.

Figure 64:
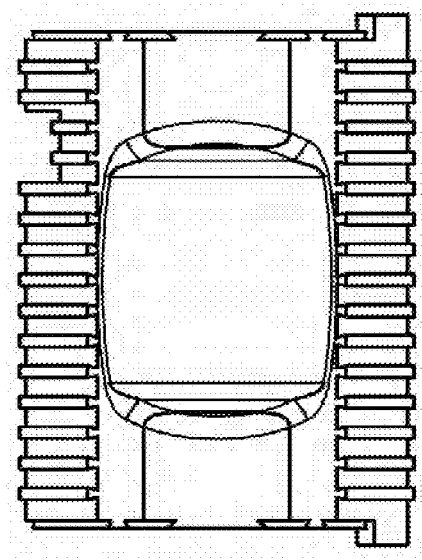
FIG. 64 shows a bottom view of the mechanically engaged water retention valve showing teeth for mechanical engagement to the drip emitter via water retainment valve slot as shown in FIG. 59.

FIG. 64 shows a bottom view of the mechanically engaged water retention valve showing teeth 4701 for mechanical engagement to the drip emitter via water retainment valve slot 200a as shown in FIG. 59 for example.

Figure 65:
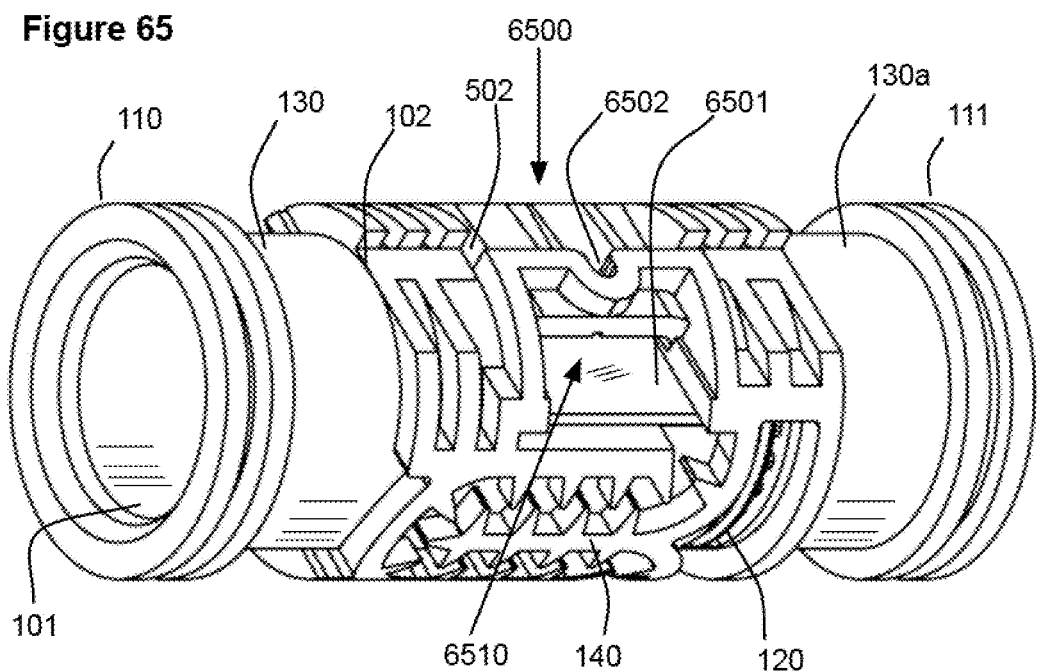
FIG. 65 shows a perspective view of an embodiment of the invention that is configured with an pressure compensating element that does not contact the enclosing pipe.

FIG. 65 shows a perspective view of an embodiment of the invention, namely drip emitter 6500 that is configured with a compensating element 6501 that does not operate against or directly require the enclosing pipe to limit the pressure or flow of fluid through the compensating chamber 6510 (also referred to herein as the pressure compensating chamber 6510). This embodiment is the first known drip emitter formed from a two-shot injection mold process that includes a deformable element, membrane or compressible element such as compensating element 6501 that compensates pressure or flow of water against a stiff injection molded surface that is part of the drip emitter body, for example in an internal portion of the drip emitter. In addition, this is the first drip emitter (two-shot or otherwise) that includes a compensating surface that is not parallel to the membrane, i.e., at an angle.

The compensating surface and hole that allows water to flow out of the chamber, i.e., pressure compensating chamber exit 6502, is formed in one or more embodiments by with a "bypass shut off" instead of a side core in the injection mold. It is believed that this is the first drip emitter to be injected molded in this manner. Bypass shut off injection mold process utilizes two parallel metal parts that slide on top of one another to create a hole feature. Traditional drip emitters have utilized side core injection molds wherein metal mold portions press against one another on flat surfaces and do not slide past one another. Using bypass shut off to form the top of the pressure compensating chamber at an angle offset from the plane of the membrane allows for the formation of the hole which forms the pressure compensating chamber exit 6502. This allows the mold to be very simple and in addition, elimination of the side core greatly frees the area on the side of the drip emitter and allows for more labyrinth and hence better uniformity of flow between drip emitters. Embodiments may optionally include a bypass channel or minimum flow channel (see FIGS. 72 and 73) that allows a minimal amount of flow through pressure compensating chamber exit 6502 when the membrane is asserted radially outward from the center of drip emitter 6501 when under pressure.

Embodiments include an emitter body having inner surface 101, outer surface 102 (see FIG. 68) that forms the floor of the emitter working elements, first end 110 and second end 111. The drip emitter also includes an outer portion which refers to the portion that contacts an enclosing pipe and an inner portion that is utilized herein to signify anything beneath the floor of the outer surface 102. The emitter of FIG. 65 is inserted into a pipe or hose as is shown (with respect to the first embodiment) as a shaded tube in FIG. 2 wherein holes are created in the hose to allow water flowing from the inside of the pipe, and hence inside of inner surface 101 through inlet or filter 120 (wherein the inlet may be utilized as a placeholder for a fluid retainment valve for example), through labyrinth 140, to pressure compensating chamber 6510 (shown as the empty volume above the deformable element 6501 that is enclosed by an enclosing pipe), to pressure compensating chamber exit 6502 and through channel 502 into pools 130 and 130a and out of holes 202 and 202a respectively (see FIG. 2). Embodiments provide pool 130 formed at the deepest offset by outer cylindrical surface 102, wherein pool 130 is configured to hold water filtered by filter 120.

A water retainment valve may optionally be formed at the inlet or at the start of the labyrinth or at the entry of the pressure compensating chamber of the drip emitter to provide non-drain, anti-siphon and/or ventable versions of water retainment valves or anywhere else in the water flow path between the inlet and the pools. Ventable embodiments of water retainment valves allow for draining water from, and rolling of an enclosing pipe by lowering the internal pressure within the enclosing pipe (as per FIG. 2) to a pressure below a backflow threshold pressure. This allows air to enter water retainment valve that enters the labyrinth and hence enters the pipe through the reverse path of normal water flow. For example, the flaps that form the fluid retainment valve as shown in FIG. 12 (albeit shaped appropriately) and formed to fit in the space where pressure chamber exit 6502 allows water to flow through channel 502 to pools 130 and 130a can be utilized to provide any of the embodiments of fluid retainment valves described herein. Such an embodiment may be formed so that the upper portion of the water retainment valve contacts or does not contact a pipe configured to retain the drip emitter.

Embodiments further include labyrinth 140 coupled with the outer cylindrical surface wherein labyrinth 140 may utilize turbulent transfer zones once water enters the labyrinth and wherein labyrinth 140 allows the water to flow from inwardly offset filter 120 to pool 130. As shown in FIGS. 1-3, labyrinth 140 includes teeth that point inwardly into the path of water flow, wherein the teeth disrupt the flow of water through labyrinth 140 and provide turbulent transfer zones throughout labyrinth 140. Any shape may be utilized to create turbulent transfer zones, including but not limited to teeth, or any other geometric shape such as square waves, saw tooth shapes, or any other shape that provides for non-linear or non-laminar water flow.

Figure 68:
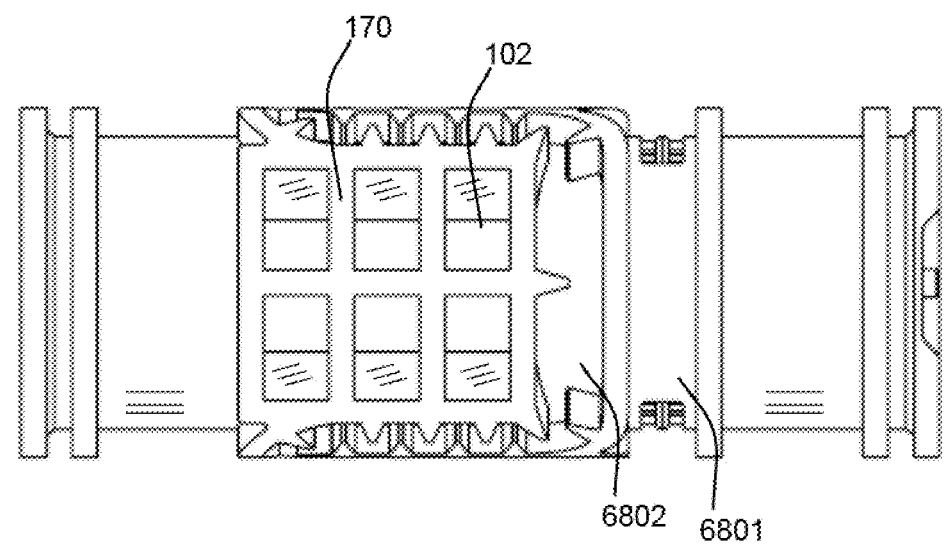
FIG. 68 shows a bottom view of the embodiment of FIG. 65.
Figure 69:
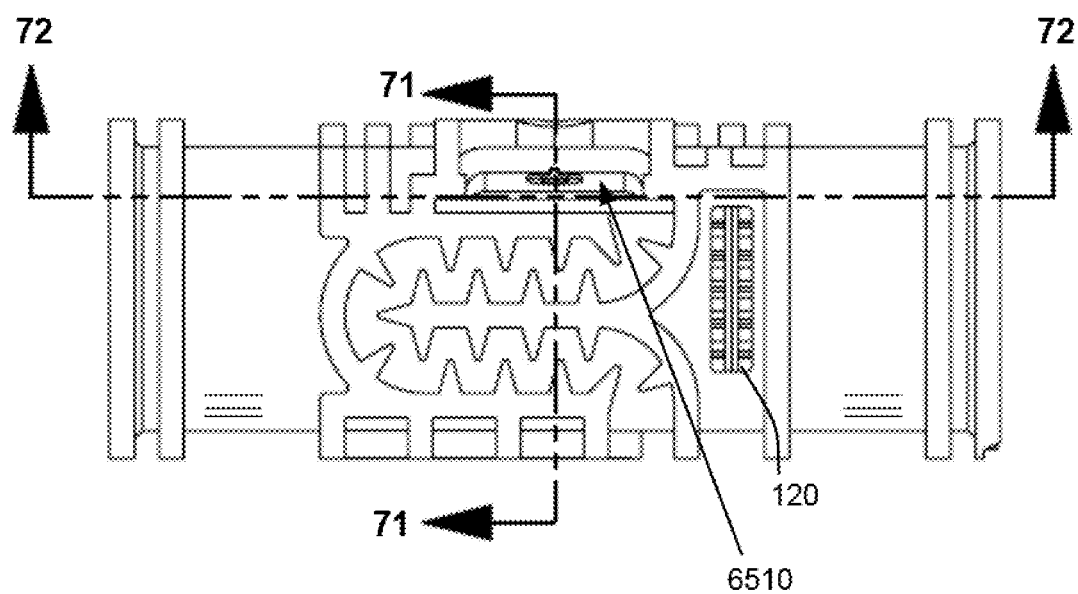
FIG. 69 shows a second side view of the embodiment of FIG. 65 that is opposite of the side shown in FIG. 67.

Once an embodiment of the emitter is enclosed in a pipe, pool 130 is thus sealed, for example via the wall at first end 110 of the emitter and side 112 of the labyrinth/filter section. The "depth" of the pool 130 may be any depth that allows for the desired amount of water to flow through the particular embodiment. For example, when labyrinth 140 extends outwardly from the outer cylindrical surface of the emitter by a desired distance, this distance sets the depth of the path of the water through the labyrinth. By configuring the labyrinth with the desired number of turbulent features, for example teeth and setting the width of the water path through the labyrinth, any water flow amount can be easily configured for the desired product implementation. Pool 130 is tapped via hole 202 (see FIG. 2) in the enclosing pipe to allow for the water running in the inner portion of the pipe and inner portion of the emitter to flow through inwardly offset filter 120 and labyrinth 140 to pool 130 and out hole 202. In other words, the rate of water flow is controlled by the particular shape and size of the labyrinth for example the length, cross-sectional area, number of teeth, length of teeth of the turbulent zones. Grid 170 (see FIG. 68) is formed to minimize the amount of plastic for example utilized in each emitter, and provides a higher coefficient of static friction between the enclosing pipe and is optional in that it does not form a part of the water flow mechanism of embodiments of the invention. One or more embodiments of the invention provide filter 120 as shown in FIGS. 65, 67 and 69, that is aligned orthogonal to the axis of the cylinder forming the emitter.

Figure 66:
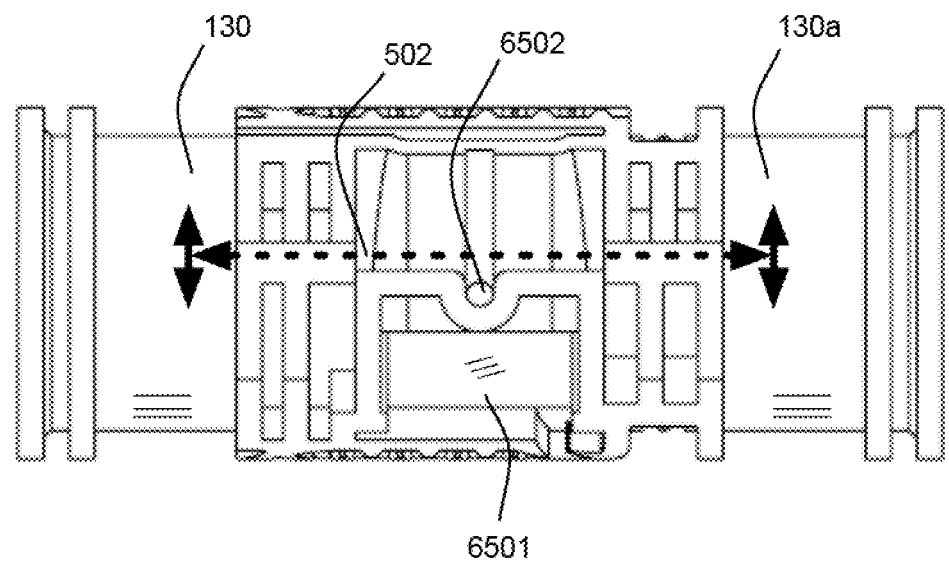
FIG. 66 shows a top view of the embodiment of FIG. 65.

FIG. 66 shows a top view of the embodiment of FIG. 65. As shown, a hole, namely pressure compensating chamber exit 6502 extends from the outer surface of drip emitter 6500 from the top inner portion of the pressure compensating chamber 6510, the floor of which is formed by deformable element 6501. Water flows to pools 130 and 130*a* via channel 502.

Figure 67:
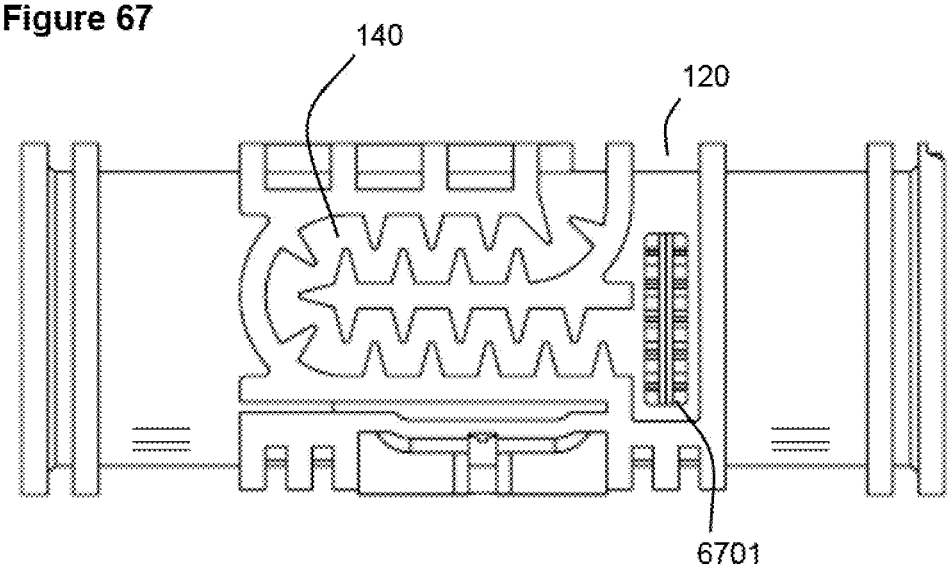
FIG. 67 shows a first side view of the embodiment of FIG. 65.

FIG. 67 shows a first side view of the embodiment of FIG. 65 including filter with holes 6701. FIG. 68 shows a bottom view of the embodiment of FIG. 65. FIG. 69 shows a second side view of the embodiment of FIG. 65 that is opposite of the side shown in FIG. 67. Water flows from the inner portion of the drip emitter through filter 120*a* in FIG. 69 via channel 6801 in FIG. 68 and filter 120 into labyrinth 140, through second channel 6801, through second labyrinth 140*a* into pressure compensating chamber 6510. Use of two filters and two labyrinths in this embodiment is not required, but provides reliability and uniformity benefits.

Figure 70:
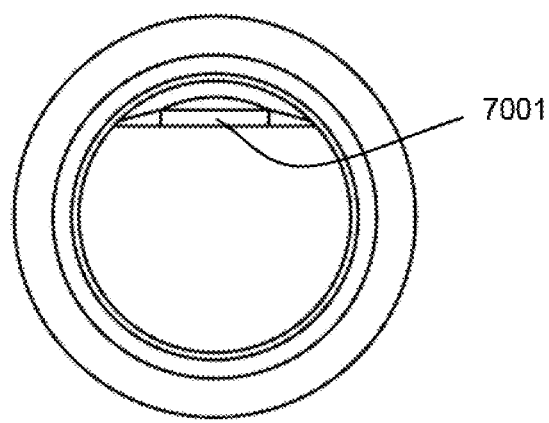
FIG. 70 shows an end view of the embodiment of FIG. 65.

FIG. 70 shows an end view of the embodiment of FIG. 65. The bottom portion of compensating element 6501 lies behind shoulder 7001 in the inner portion of the drip emitter. Shoulder 7001 provides an angled ramp over which water flows and contacts the innermost portion of compensating element 6501.

Figure 71:
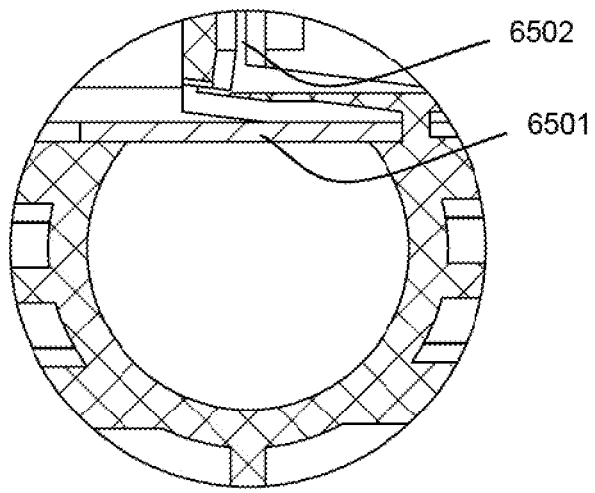
FIG. 71 shows a first section view of the embodiment of FIG. 65 as viewed parallel to the longest axis of the embodiment as depicted in FIG. 69.

FIG. 71 shows a first section view of the embodiment of FIG. 65 as viewed parallel to the longest axis of the embodiment as depicted in FIG. 69. Compensating element 6501 is shown in a non-deformed state under no pressure difference between the inner portion of the pipe and external portion of the pipe. When a pressure differential exists, the compensating element 6501 can deform toward the pressure compensating chamber exit 6502.

Figure 72:
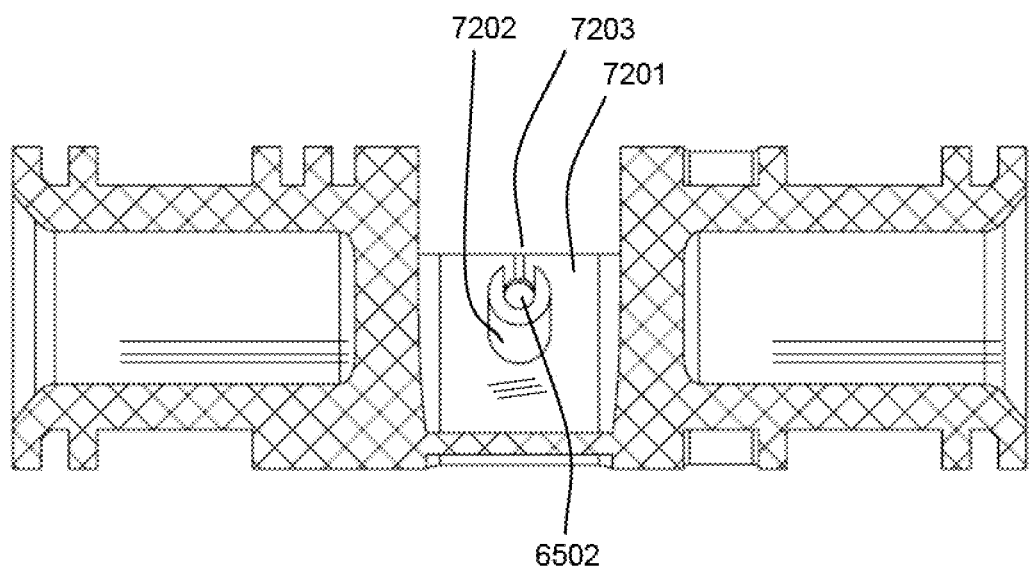
FIG. 72 shows a second section view of the embodiment of FIG. 65 as viewed orthogonally to the longest axis of the embodiment as depicted in FIG. 69 and as viewed from underneath the top view of FIG. 66.

FIG. 72 shows a second section view of the embodiment of FIG. 65 as viewed orthogonally to the longest axis of the embodiment as depicted in FIG. 69 and as viewed from underneath the top view of FIG. 66. The upper portion of the pressure compensating chamber makes up the pressure compensating surface 7201. The upper portion also includes an extended flange 7202 and optional bypass channel 7203 that allows a small amount of water to flow even if the pressure is high enough to deform the compensating element 6501 fully over the pressure compensating chamber exit 6502.

Figure 73:
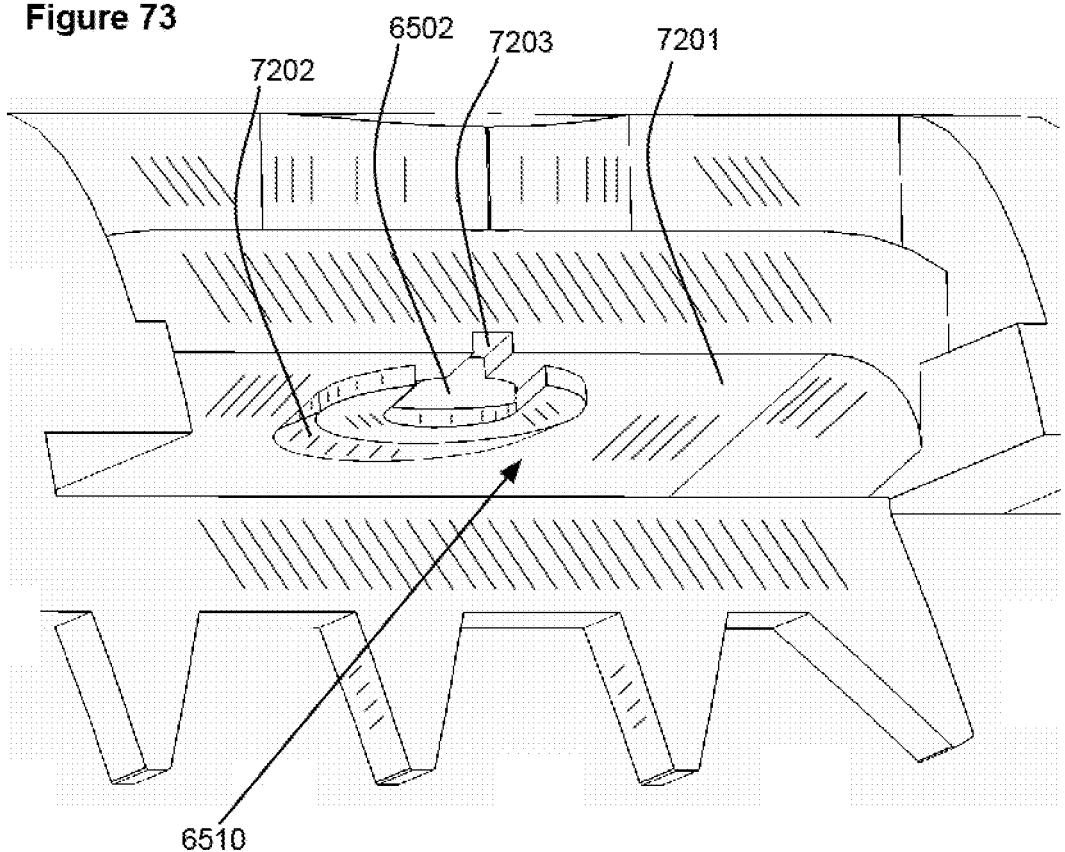
FIG. 73 shows a perspective view of the inner portion of the internal pressure compensating chamber without the deformable element wherein the extended flange, bypass channel and pressure chamber exit are visible.

FIG. 73 shows a perspective view of the inner portion of the internal pressure compensating chamber without the pressure compensating element wherein the extended flange 7202, bypass channel 7203 and pressure compensating chamber exit 6502 are visible.

Figure 74:
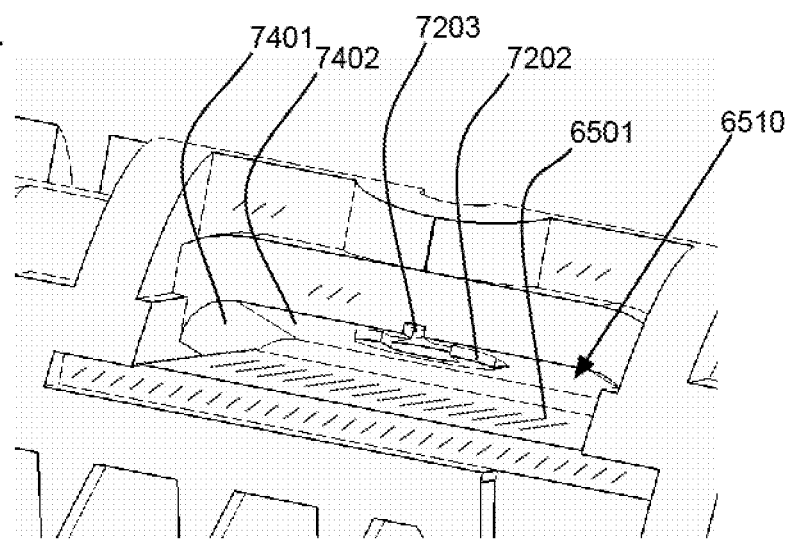
FIG. 74 shows a perspective view of the inner portion of the internal pressure compensating chamber with the deformable element in the bottom portion of the pressure chamber.

FIG. 74 shows a perspective view of the inner portion of internal pressure compensating chamber 6510 with compensating element 6501 fixed in the bottom portion of the pressure chamber wherein the pressure compensating chamber 6510 is angled downward toward the back of the chamber as shown with side wall 7401, chamber top 7402, extended flange 7202 and bypass channel 7203.

Figure 75:
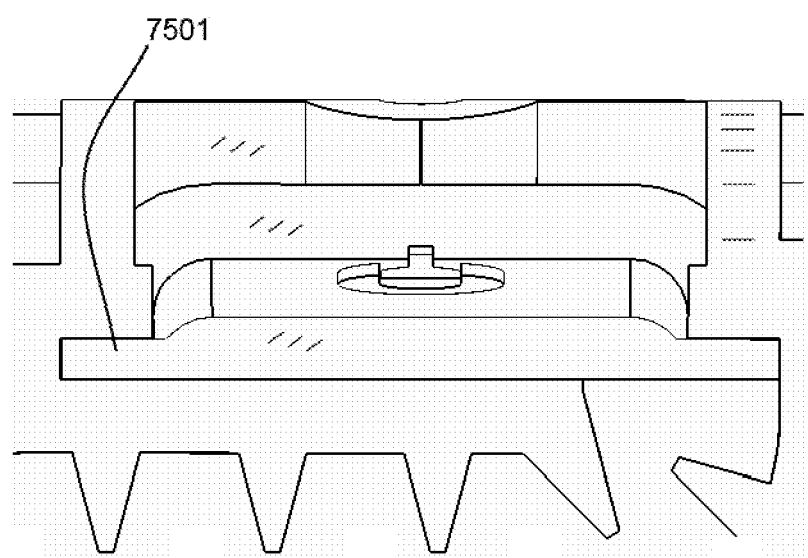
FIG. 75 shows a zoomed front view of a portion of the embodiment of FIG. 65 showing the pressure compensating chamber without the deformable element.

FIG. 75 shows a zoomed front view of a portion of the embodiment of FIG. 65 showing the pressure compensating chamber without the deformable element in pressure compensating element slot 7501.

Figure 76:
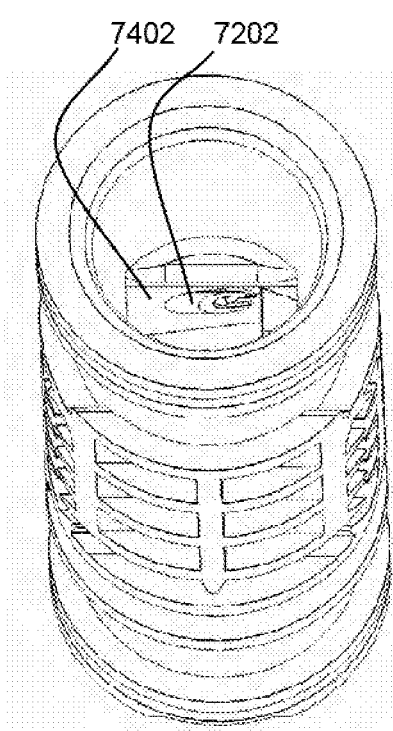
FIG. 76 shows a perspective view of the inner portion of the embodiment of FIG. 65 wherein the pressure compensating chamber is visible without the deformable element.
Figure 77:
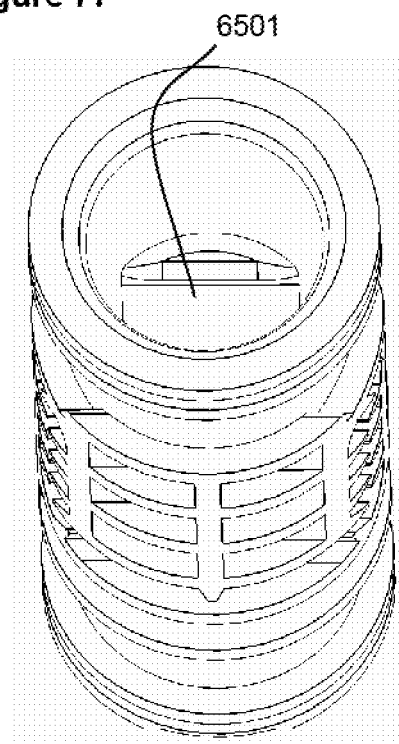
FIG. 77 shows the FIG. 76 with the deformable element as injected and that forms the bottom of the pressure compensating chamber.

FIG. 76 shows a perspective view of the inner portion of the embodiment of FIG. 65 wherein the chamber top 7402 of the pressure compensating chamber is visible without the deformable element. FIG. 77 shows the FIG. 76 with the compensating element 6501 as injected and that forms the bottom of the pressure compensating chamber.

Figure 78:
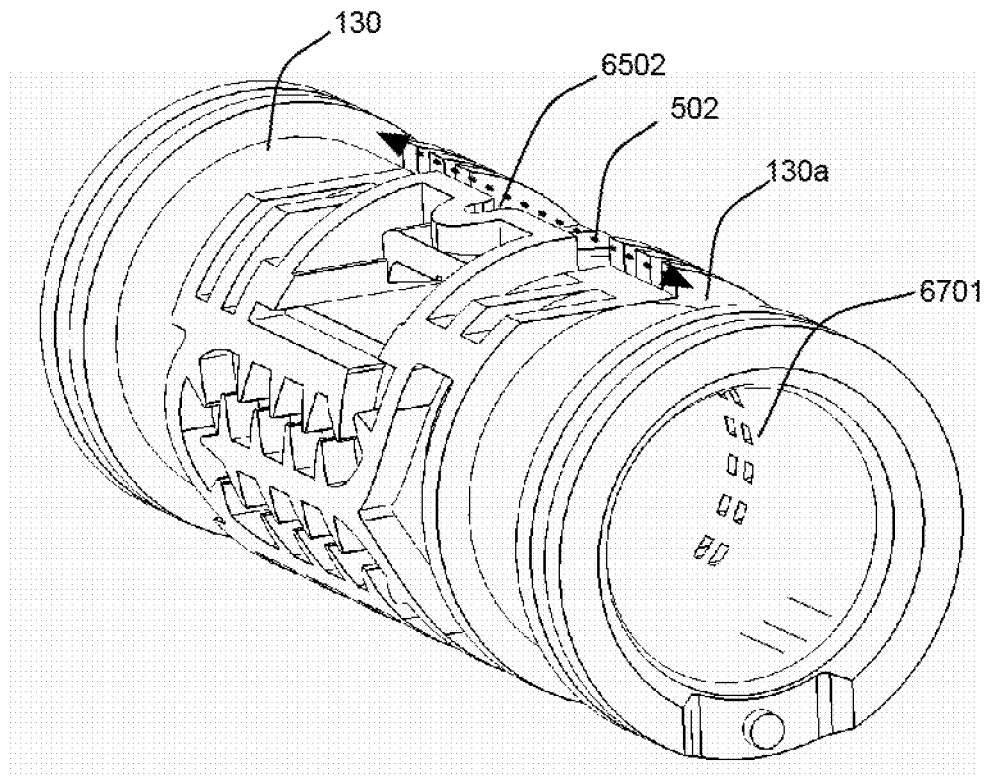
FIG. 78 shows a perspective view of the end of the embodiment of FIG. 65 with filter holes visible on the inner portion of the emitter.

FIG. 78 shows a perspective view of the end of the embodiment of FIG. 65 with filter holes 6701 visible on the inner portion of the emitter and wherein the channel 502 is shown that allows water to flow to the pools 130 and 130*a*.

Figure 79:
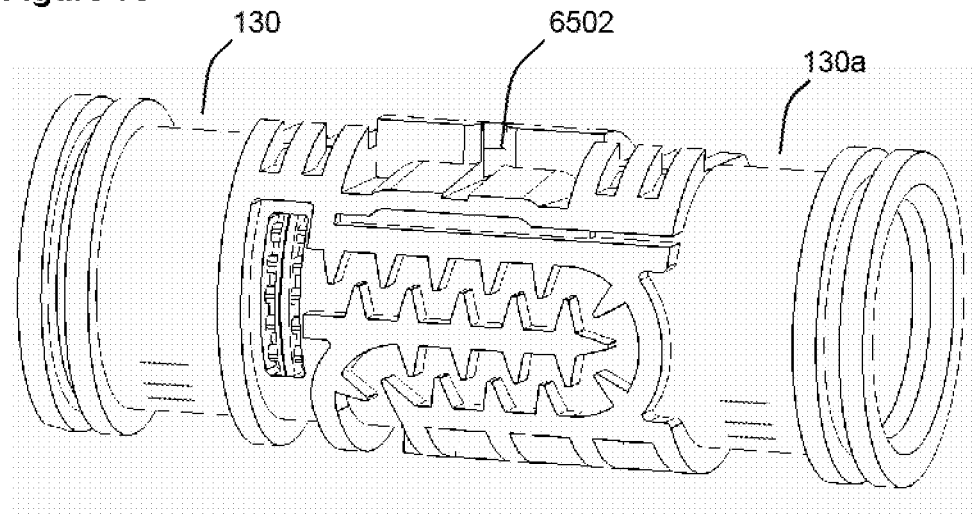
FIG. 79 shows a perspective view of FIG. 67 wherein the pressure chamber exit is visible.

FIG. 79 shows a perspective view of FIG. 67 wherein the pressure chamber 6502 is visible from the opposing side of the drip emitter.

Figure 80:
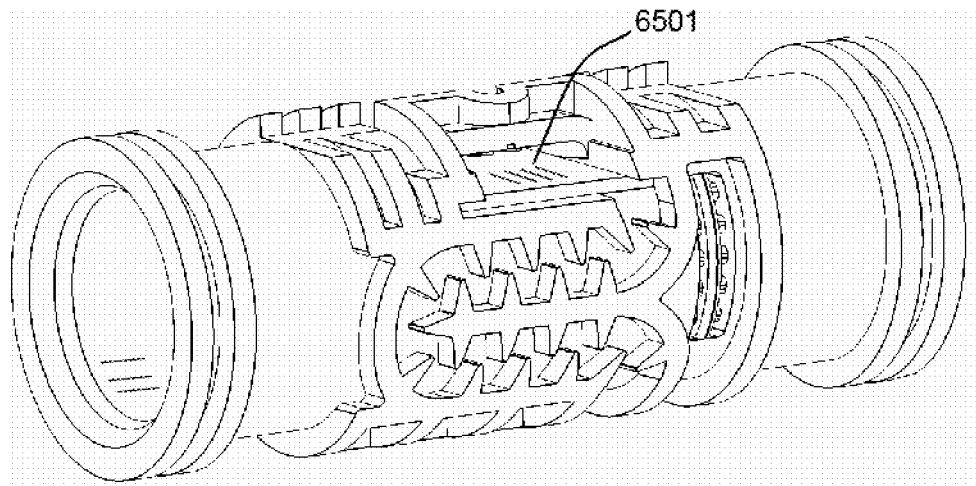
FIG. 80 shows another perspective view of the embodiment of FIG. 65 wherein the deformable element is visible.

FIG. 80 shows another perspective view of the embodiment of FIG. 65 wherein the compensating element 6501 is visible in the pressure compensating chamber.

Figure 81:
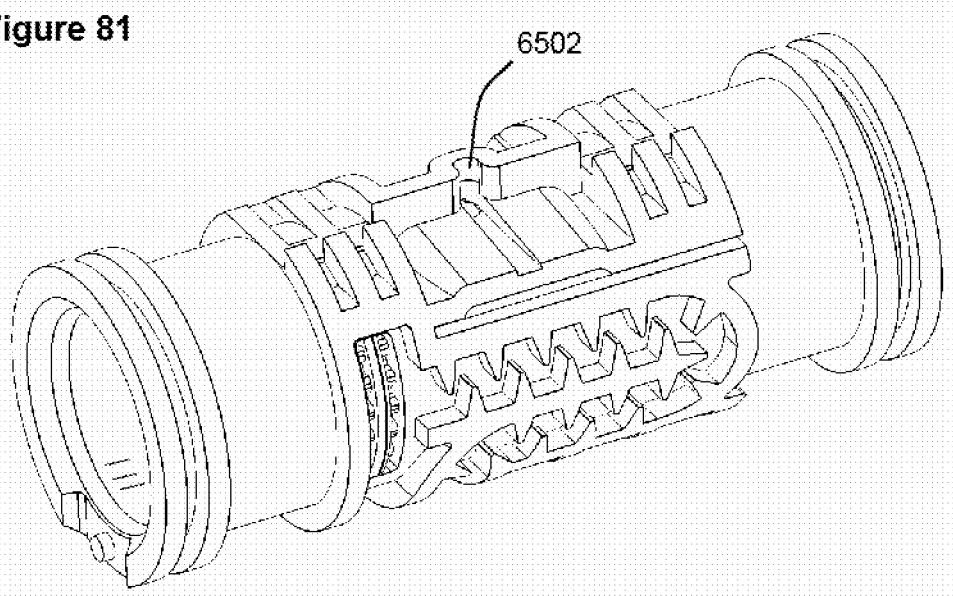
FIG. 81 shows another perspective view of FIG. 79 wherein the pressure chamber exit is visible from above.

FIG. 81 shows another perspective view of FIG. 79 wherein the pressure chamber exit 6602 is visible from above.

Figure 82:
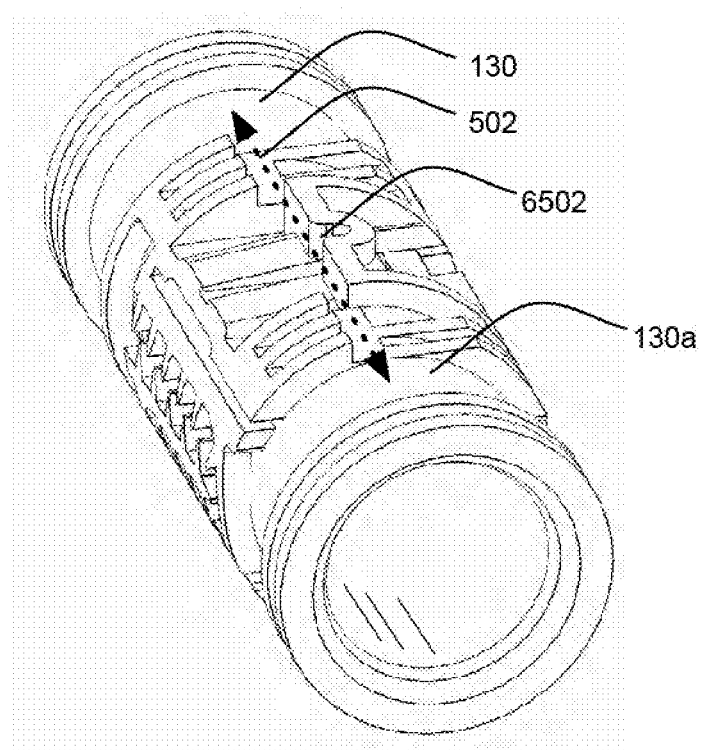
FIG. 82 shows another perspective view of FIG. 65 showing the flow path of water that exits the pressure chamber exit to each pool on opposing ends of the emitter.

FIG. 82 shows another perspective view of FIG. 65 showing the flow path of water that exits the pressure chamber exit 6602 and flows through channel 502 to each pool, 130 and 130*a* on opposing ends of the emitter.

Figure 83:
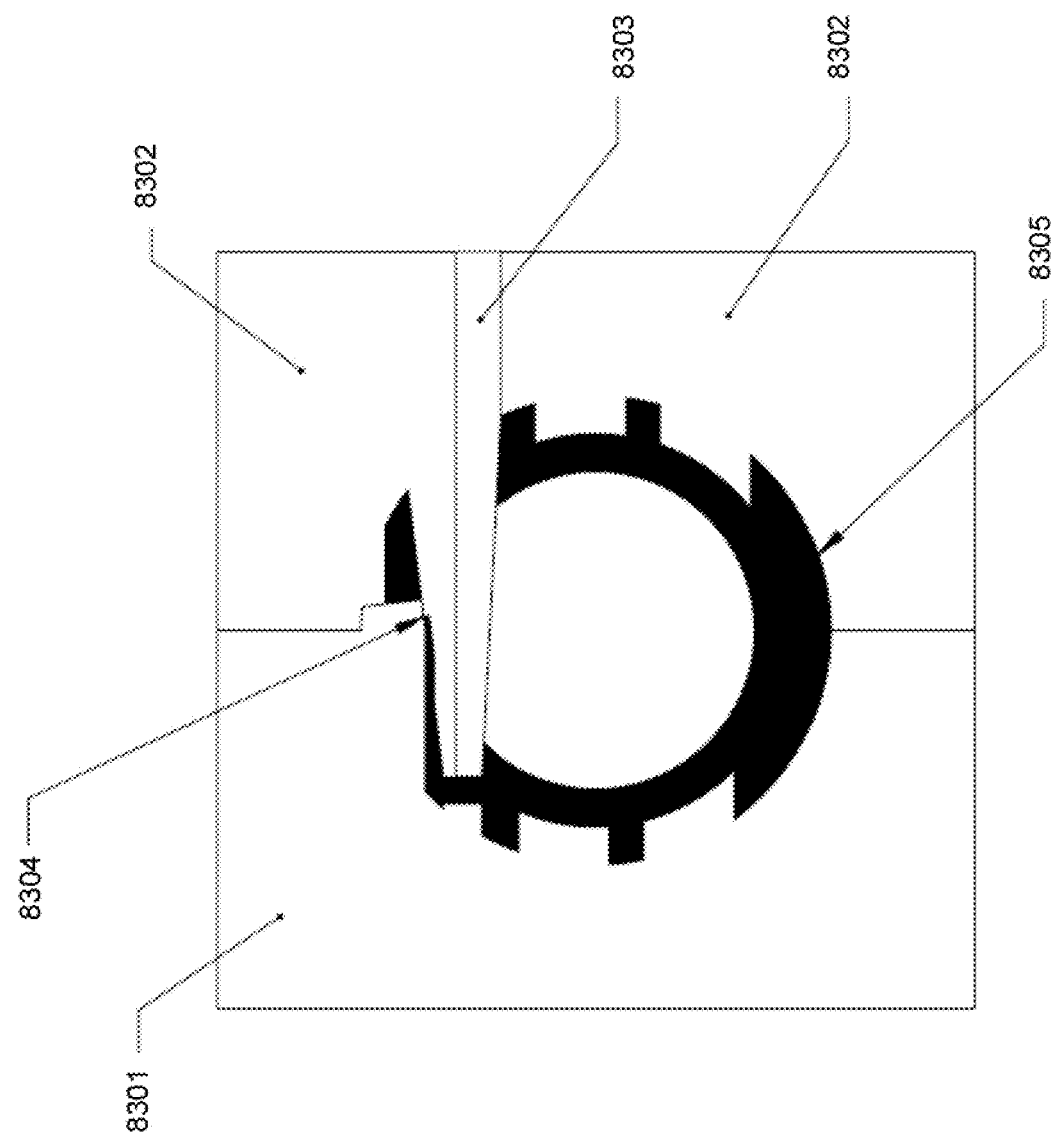
FIG. 83 shows a side cross-section view of an embodiment of the injection mold utilized to produce one or more embodiments of the invention.

FIG. 83 shows a side cross-section view of an embodiment of the injection mold utilized to produce one or more embodiments of the invention. Mold half 8301 is shown on the left side of the figure. Mold half 8302 is shown in the right side of the figure (upper right and lower right as portions of the same injection mold half). Core 8303 is shown on the right side of the figure and allows for a second injection of compensating element 6501. A hole that allows for fluid to exit the pressure chamber may be formed in one or more embodiments using Bypass Shutoff at 8304, i.e., mold half 8301 and mold half 8302 in contact with one another so that for example a pin is not required vertically extending into the mold for example. This makes the mold simpler to make. As shown in the figure after first injection, cavity 8305 is filled with a first material. After removing core 8303, a second material that is deformable for example may be injected in one or more embodiments to form the compensating element 6501. In one or more embodiments the front of the pressure chamber can be coupled with an embodiment of the fluid retainment valve (for example a pie shaped version of FIG. 12, or embodiments detailed in FIGS. 84-88) configured to allow water to flow in to the pressure chamber via the labyrinth. In one or more embodiments, this coupling may be performed by forming the water retainment valve during the second shot of the injection molding or after the two shot injection process by simply inserting or forming a fluid retainment valve (ventable, non-ventable, anti-siphon, anti-drain or any other embodiment detailed in this specification or otherwise), at the front of the pressure chamber, or between the labyrinth and the pressure chamber for example or anywhere before or after the filter or in place of the filter in other embodiments of the invention as one skilled in the art will recognize.

An embodiment of the method of producing the drip emitter using for example the injection mold of FIG. 83 includes injecting a first material into an injection mold in a first injection and forming an emitter body wherein the emitter body includes an inner portion comprising an inner surface, an outer portion configured to contact an enclosing pipe wherein the outer portion comprises an outer surface, a first end, a second end, an inlet that comprises a filter or a place holder for a fluid retainment valve, a labyrinth coupled with the outer surface, a compensating chamber formed within an inner portion of the drip emitter, a compensating surface 7201 formed inside the compensating chamber, a pool coupled with the outer surface wherein the pool is configured to hold fluid when the emitter body is enclosed in the enclosing pipe, a fluid flow path leading from the inner portion to the outer portion of the drip emitter wherein the drip emitter is configured to allow the fluid to flow from the inlet, through the labyrinth, through the compensating chamber and to the pool through the fluid flow path, and injecting a second material into the injection mold in a second injection and forming a compensating membrane 6501 wherein the second material comprises an elastomeric material to effect regulation of the drip emitter and wherein the compensating membrane is configured to deform under positive pressure toward the compensating surface 7201 within the compensating chamber within the inner portion of the drip emitter.

Embodiments of the invention may be manufactured in a novel manner by injecting both the drip emitter and compensating diaphragm or compensating membrane and/or water or fluid retainment valve within an injection mold, for example using multiple shots of different material into the mold shown in FIG. 83. In one or more embodiments, a pliable material is utilized for the compensating membrane 6501 and/or ventable valve while a less pliable material for example a material that does not flex as much is utilized for the emitter body and compensating surface 7201. In one or more embodiments three materials are optionally utilized, one for the drip emitter, a second material for the compensating membrane and a third material for the fluid compensating valve (see FIG. 84). Additionally, the method may include forming a hole in the drip emitter comprising a pressure chamber exit using a bypass shutoff injection mold wherein the hole extends from the inner surface to the outer surface of the drip emitter. Additionally, the method may also include coupling a fluid retainment valve with the drip emitter. Furthermore, the method may also include coupling the fluid retainment valve in a manner that includes forming the fluid retainment valve during the injecting of the second material, optionally at the inlet or anywhere else in the fluid flow path. Alternatively, the method may include injecting a third material into the injection mold and forming the fluid retainment valve.

Figure 84:
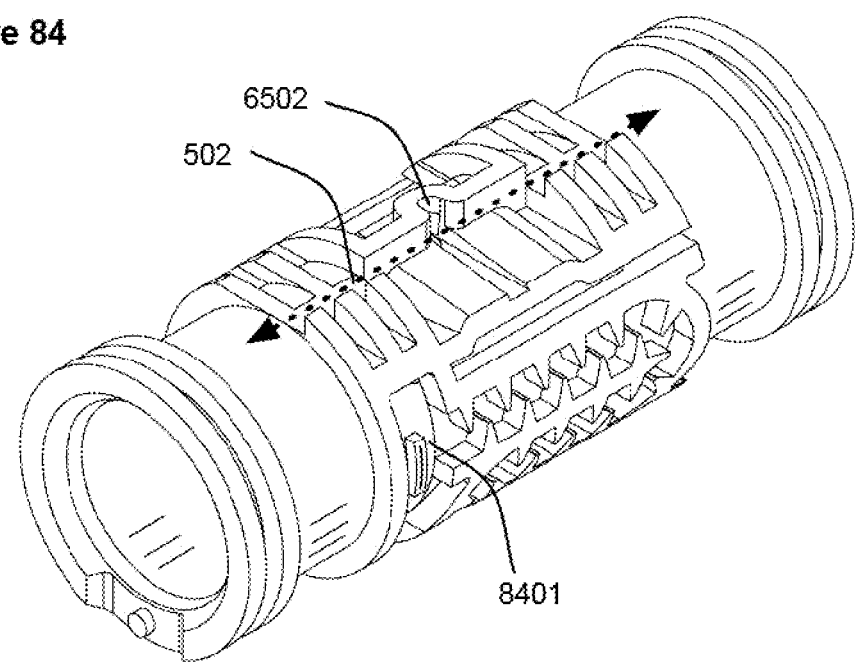
FIG. 84 shows a perspective view of an embodiment of FIG. 65 with at least one valve in place of a filter, wherein the valve is formed in the second injection mold shot (with a second material or third material or third shot with a third material) and wherein the valve can be any type described in this specification based on the direction and length of the valve flaps.

FIG. 84 shows a perspective view of an embodiment of FIG. 65 with at least one water retainment valve 8401, formed in place of at least one of the filters 6701, wherein the water retainment valve is formed in the second injection mold shot and wherein the water retainment valve can be any type described in this specification based on the direction and length of the valve flaps. Any type of water retainment valve capable of injection molding can be utilized in place of the exemplary water retainment valve embodiments described herein.

Figure 85:
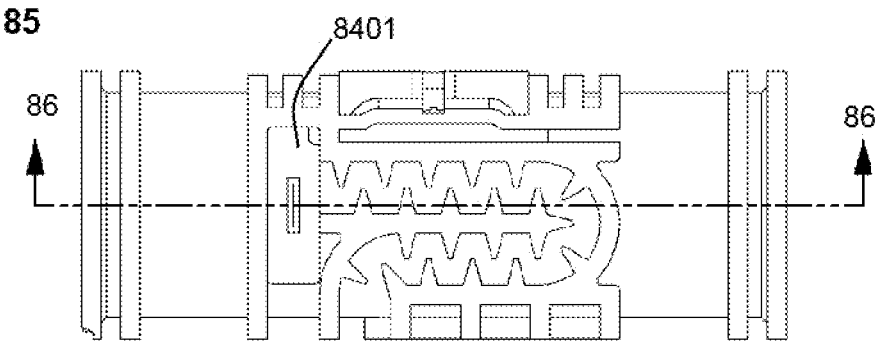
FIG. 85 shows a side view of the embodiment of FIG. 84 with the valve formed at the start of the first labyrinth.

FIG. 85 shows a side view of the embodiment of FIG. 84 with water retainment valve 8401 formed at the start of the first labyrinth.

Figure 86:
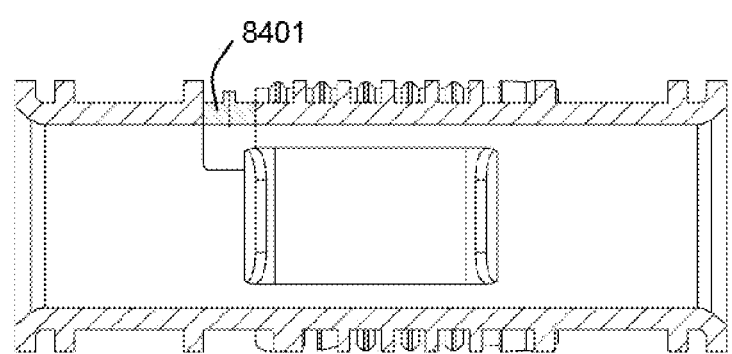
FIG. 86 shows the cross-section called out in FIG. 85 with the valve shown on the top of the figure in the printed page.

FIG. 86 shows the cross-section called out in FIG. 85 with the water retainment valve shown on the top of the figure in the printed page. As shown in the figure there is a line in the middle of water retainment valve 8401 that separates to flaps, shown as outward extending portions on either side of the line, wherein the line represents a slot that allows fluid to flow therebetween. One skilled in the art will understand that the flaps outward extending portions may represent flaps as previously detailed in this specification above. In addition, the water retainment valve may utilize no flaps, or inward pointing flaps as well if an injection mold with a two section core is utilized to create space for inward pointing flaps for example.

Figure 87:
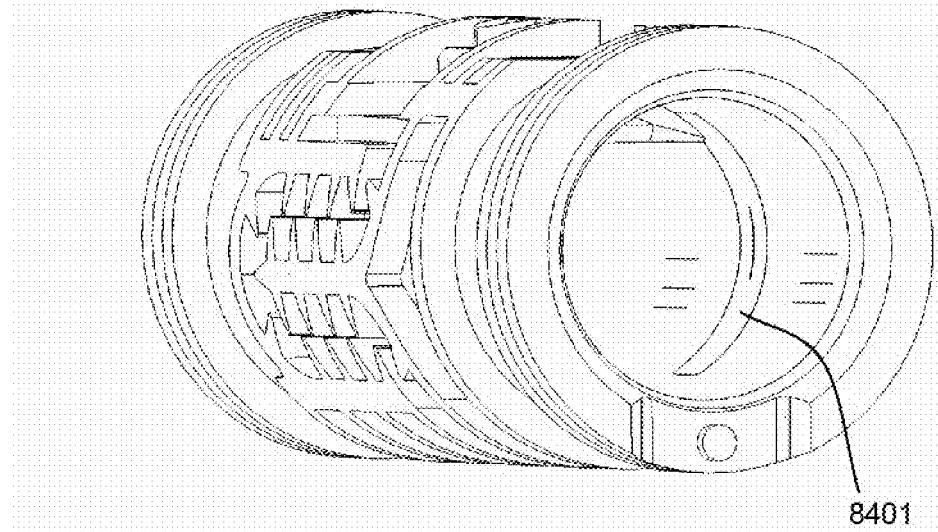
FIG. 87 shows an end perspective view of the embodiment of FIG. 84 showing the inner portion of the valve.

FIG. 87 shows an end perspective view of the embodiment of FIG. 84 showing the inner portion of water retainment valve 8401, which in this embodiment is formed parallel to the inner portion of the drip emitter.

Figure 88:
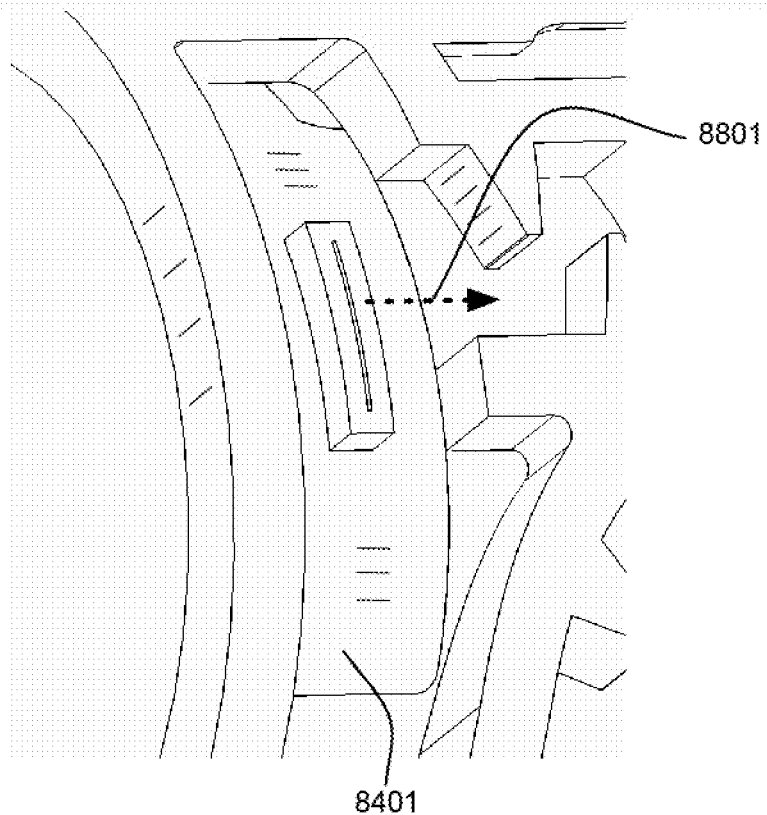
FIG. 88 shows a close up of the valve of the embodiment of FIG. 84 and also shows the direction of flow of fluid out of the valve and into the labyrinth.

FIG. 88 shows a close up of water retainment valve 8401 of the embodiment of FIG. 84 and also shows the direction of flow of fluid 8801 out of the water retainment valve and into the labyrinth.

In the embodiments detailed herein the term "inlet" is used to describe either the filter or the hole that forms a place holder for the water retainment valve since either of these elements form the inlet for fluid to flow to the pressure compensating chamber.

Figure 89:
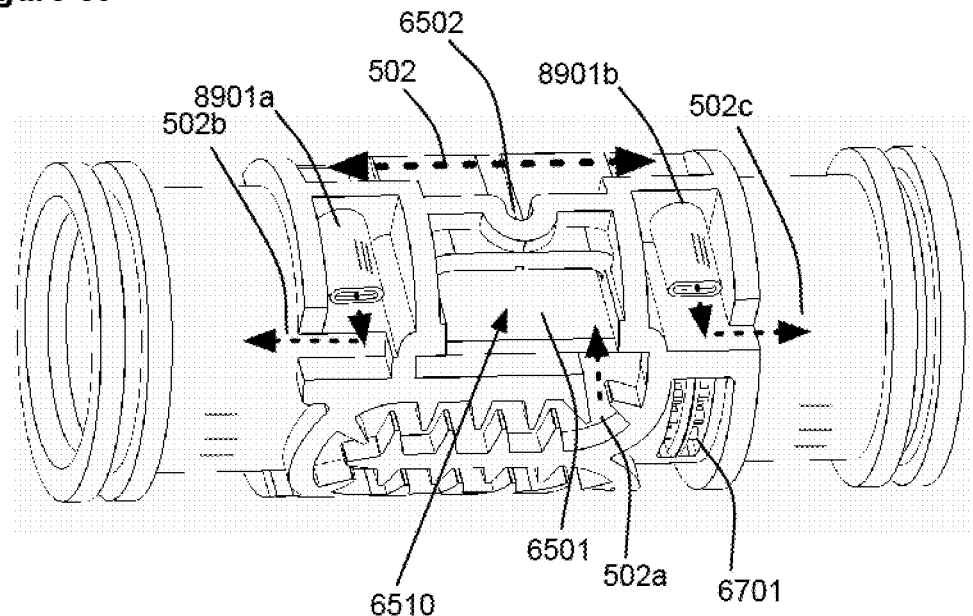
FIG. 89 shows a perspective view of an embodiment of FIG. 65 with at least one valve situated between a pool and the chamber exit and at least one filter, wherein the valve is formed in the second injection mold shot (with a second material or third material or third shot with a third material) and wherein the valve can be any type described in this specification based on the direction and length of the valve flaps.

FIG. 89 shows a perspective view of an embodiment of FIG. 65 with at least one valve situated between a pool and the chamber exit and at least one filter, wherein the valve is formed in the second injection mold shot (with a second material or third material or third shot with a third material) and wherein the valve can be any type described in this specification based on the direction and length of the valve flaps. As shown in the figure, fluid flows into compensation chamber 6510 via path 502a from the labyrinth. Compensating element 6501 deforms under pressure to regulate the pressure/flow of fluid at chamber exit 6502. Fluid flowing through the inside of the drip emitter emerges from filter 6701 (and flows as previously described through the labyrinth) through channel 502a, into compensation chamber 6510, out of chamber exit 6502, via channel 502 into valve 8901a and 8901b and out channels 502b and 502c into the pools on each side of the drip emitter. In this embodiment, the internal workings of the drip emitter are protected via the valves. The valves may be of the ventable/non-ventable/non-drain/anti-siphon type or any other type known. In addition, the inlet where filter 6701 is situated may be optionally be covered or replaced by the valve of FIG. 84 in combination with valves 8901a and 9801b for example. Any other combination of elements described herein may be combined with one another in keeping with the spirit of the invention.

Figure 90:
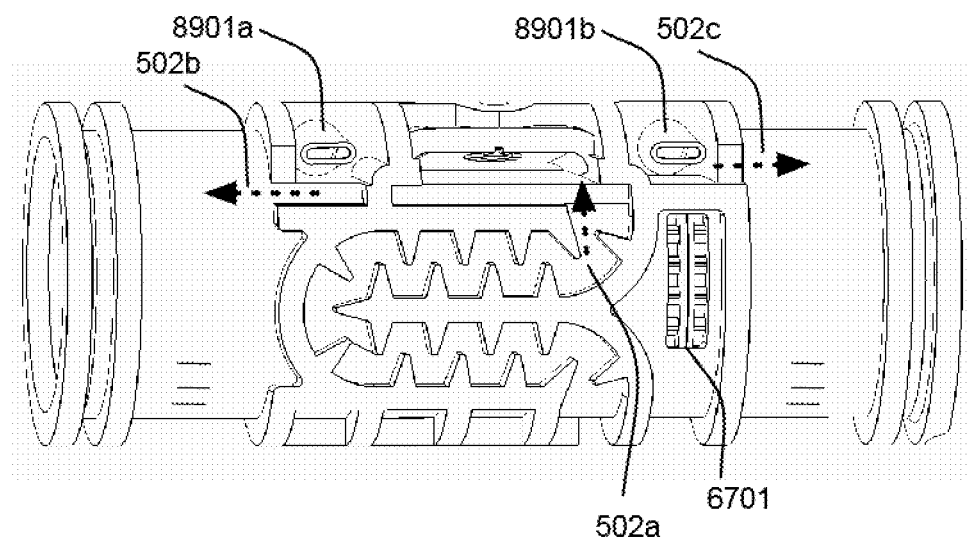
FIG. 90 shows a rotated view of the embodiment of FIG. 89.

FIG. 90 shows a rotated view of the embodiment of FIG. 89. Although valves 8901a and 8901b are shown with lips pointing toward the reader on the written page, they may also be formed in the other direction to form the various embodiments previously described herein whereby the length of flaps utilized in the valves may determine the precise pressure curve versus flow as previously described with respect to FIGS. 29-40. Any other geometry may be utilized for valves 8901a and 8901b to provide the type of pressure curve versus flow as is desired.

Figure 91:
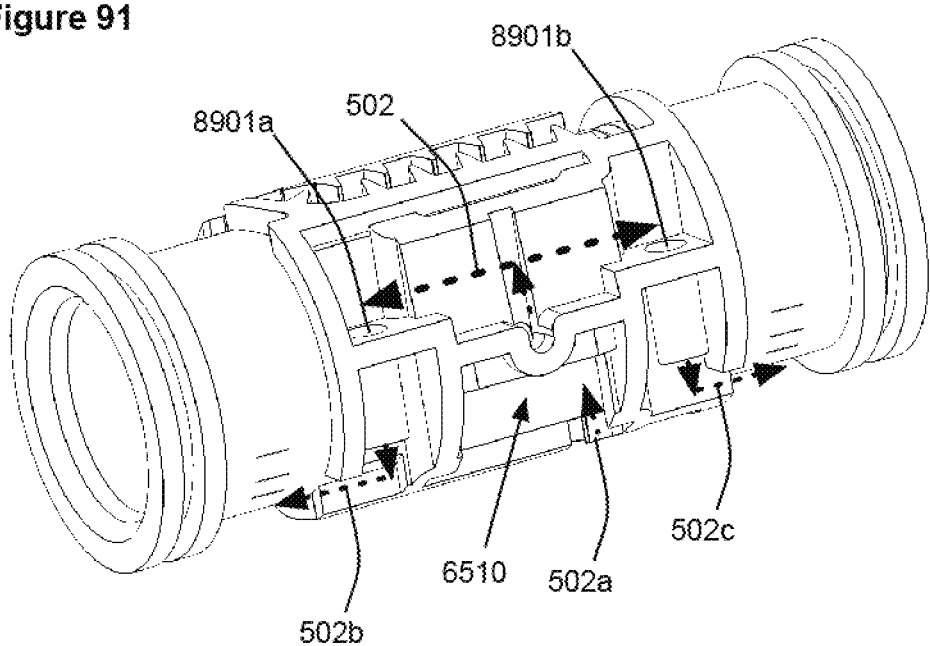
FIG. 91 shows a top perspective view of the embodiment of FIG. 89.

FIG. 91 shows a top perspective view of the embodiment of FIG. 89. The entry ways to valves 8901a and 8901b are pointed to by the lead lines in this figure.

Figure 92:
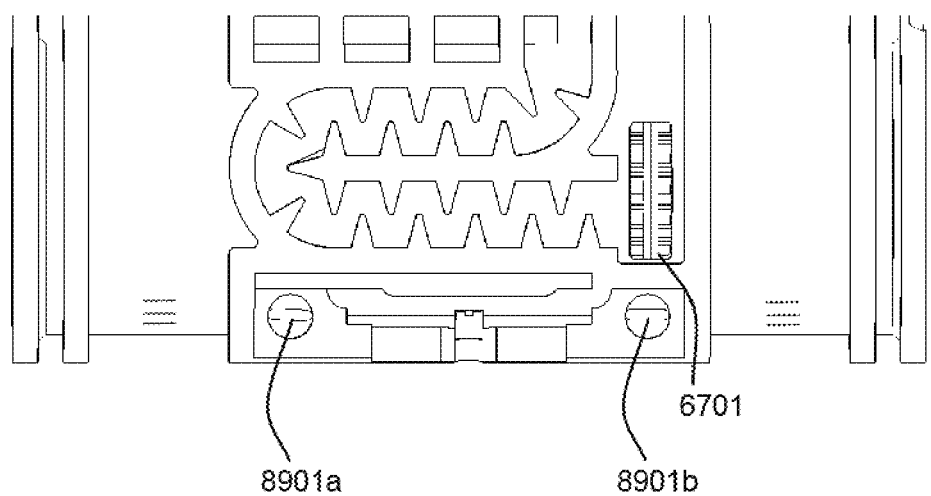
FIG. 92 shows a further rotated view of the embodiment of FIG. 89.

FIG. 92 shows a further rotated view of the embodiment of FIG. 89. As is seen in the figure, valve flaps are visible when valves 8901a and 8901b are viewed lengthwise through the longest axis of the valves. Again, the valves may be formed toward the reader or away from the reader or utilize any other geometry to produce the desired pressure versus flow functionality.

Embodiments of the invention formed as shown in FIGS. 65-92 provide a device that does not need to be conditioned under ISO 9261:2004 which describes how to test pressure compensating emitters using au hour-long conditioning procedure for each test pressure (includes a minimum of 4 pressures for each emitter). Such testing is costly and takes time.

---

ISO 9261:2004 Section 9.1.3 Regulated emitters/emitting pipes
Condition the emitters/emitting units in the test sample by operating them for a total of 1 h. The conditioning procedure shall consist of the following steps.

a) Set the minimum working pressure and maintain it for 3 min.
b) Set the maximum working pressure and maintain it for 3 min.
c) Set the minimum working pressure and maintain it for 3 min.
d) Set the maximum working pressure and maintain it for 3 min.
e) Set the minimum working pressure and maintain it for 3 min.
f) Set the maximum working pressure and maintain it for 3 min.
g) Set the pressure at the midpoint of the range of regulation and maintain it until the total time of the conditioning procedure (1 h) is completed.
h) Immediately after conditioning and while maintaining the inlet pressure at the midpoint of the range of regulation. test the emitters/emitting units according to 9.1.2

---

Due to the second injection molding shot that forms compensating element 6501, there is no seating of a pressure compensating element that needs to be performed by hand and hence, the compensating element 6501 is fully seated and does not have to run through several cycles to free and fully seat the element.

While the invention herein disclosed has been described by means of specific embodiments and applications thereof, numerous modifications and variations could be made thereto by those skilled in the art without departing from the scope of the invention set forth in the claims. All references to singular elements in the claims may include multiple occurrences thereof.

What is claimed is:

1. A method for producing a drip emitter comprising:
    injecting a first material into an injection mold in a first injection and forming an emitter body with a stiff injection molded surface, wherein said emitter body comprises
        an inner portion comprising an inner surface and said stiff injection molded surface;
        an outer portion configured to contact an enclosing pipe wherein said outer portion comprises an outer surface;
        a first end;
        a second end;
        an inlet that comprises a filter or a fluid retainment valve place holder;
        a labyrinth coupled with the outer surface;
        a compensating chamber formed within an inner portion of said drip emitter;
        a compensating surface formed inside said compensating chamber wherein said compensating surface comprises said first material and not said enclosing pipe and where said compensating surface comprises a chamber exit that leads from said inner portion that does not contact said enclosing pipe to said outer surface that does contact said enclosing pipe;
        a pool coupled with the outer surface wherein the pool is configured to hold fluid when the emitter body is enclosed in said enclosing pipe;
        a fluid flow path leading from said inner portion to said outer portion of said drip emitter wherein said drip emitter is configured to allow said fluid to flow from the inlet, through the labyrinth, through the compensating chamber, through the chamber exit and to the pool through the fluid flow path;
    injecting a second material into said injection mold in a second injection and forming a compensating membrane wherein said second material comprises an elastomeric material to effect regulation of the drip emitter and wherein said compensating membrane is configured to
        compensate for pressure or flow of water by compensating against said stiff injection molded surface of said emitter body, wherein said compensating occurs entirely within said compensating chamber against said compensating surface in said inner portion and between said first material and said second material; and,
        deform under positive pressure said second material toward said compensating surface comprising said first material within said compensating chamber within said inner portion of said drip emitter.

2. The method for producing the drip emitter of claim 1 further comprising:
    forming a hole in said drip emitter comprising a pressure chamber exit using a bypass shutoff injection mold wherein said hole extends from said inner surface to said outer surface.

3. The method for producing the drip emitter of claim 1 further comprising:
    coupling a fluid retainment valve with said drip emitter.

4. The method for producing the drip emitter of claim 3 wherein said coupling the fluid retainment valve comprises forming the fluid retainment valve during said injecting said second material.

5. The method for producing the drip emitter of claim 3 further comprising:
    injecting a third material into said injection mold and forming said fluid retainment valve.

6. The method for producing the drip emitter of claim 3 wherein said coupling the fluid retainment valve comprises coupling an anti-siphon fluid retainment valve configured to hinder or allow no backflow of air or water through the drip emitter when a pressure internal to the drip emitter is below a pressure external to the pipe.

7. The method for producing the drip emitter of claim 3 wherein said coupling the fluid retainment valve comprises coupling a ventable anti-siphon fluid retainment valve configured to hinder or allow no backflow of air or water through the drip emitter and wherein when a pressure internal to the drip emitter is below a pressure external to the pipe by an amount smaller than a backflow threshold and to allow backflow of air or water into the drip emitter when a pressure internal to the drip emitter is below a pressure external to the pipe by an amount larger than the backflow threshold.

8. The method for producing the drip emitter of claim 3 wherein said coupling the fluid retainment valve comprises coupling a non-drain fluid retainment valve with the drip emitter wherein said fluid retainment valve is configured to allow no flow of air or water through the drip emitter when a pressure internal to the drip emitter is below a threshold.

9. The method for producing the drip emitter of claim 3 wherein said coupling the fluid retainment valve comprises coupling a ventable non-drain fluid retainment valve with the drip emitter wherein said fluid retainment valve is configured to allow no flow of air or water through the drip emitter when a pressure internal to the drip emitter is below a first threshold and to allow backflow of air or water when the pressure internal to the drip emitter is below a second threshold which is lower than the first threshold.

10. The method for producing the drip emitter of claim 3 wherein said coupling the fluid retainment valve comprises providing flaps coupled with the fluid retainment valve that point under no pressure in a direction of normal water flow or point under no pressure in against a direction of normal water flow.

11. The method for producing the drip emitter of claim 3 wherein said coupling the fluid retainment valve comprises providing flaps coupled with the fluid retainment valve that alternately open and close under normal operation due to a Bernoulli effect to provide restricted water flow.

12. The method for producing the drip emitter of claim 1 wherein said forming the emitter body comprises forming a cylindrical arc of less than or equal to 360 degrees.

13. The method for producing the drip emitter of claim 1, further comprising:
   forming a mechanical engagement between said first material and said second material wherein said mechanical engagement comprises at least one interlocking element formed into said first material and corresponding at least one interlocking element formed into said second material.

14. The method for producing the drip emitter of claim 1 further comprising:
   cross-linking said second material to increase elasticity of said second material after injection but before inserting said drip emitter into a pipe.

15. A method for producing a drip emitter comprising:
   injecting a first material into an injection mold in a first injection and forming an emitter body with a stiff injection molded surface, wherein said emitter body comprises
      an inner portion comprising an inner surface and said stiff injection molded surface;
      an outer portion configured to contact an enclosing pipe wherein said outer portion comprises an outer surface;
      a first end;
      a second end;
      an inlet that comprises a filter or a fluid retainment valve place holder;
      a labyrinth coupled with the outer surface;
      a compensating chamber formed within an inner portion of said drip emitter;
      a compensating surface formed inside said compensating chamber;
      a pool coupled with the outer surface wherein the pool is configured to hold fluid when the emitter body is enclosed in said enclosing pipe;
      a fluid flow path leading from said inner portion to said outer portion of said drip emitter wherein said drip emitter is configured to allow said fluid to flow from the inlet, through the labyrinth, through the compensating chamber and to the pool through the fluid flow path;
   injecting a second material into said injection mold in a second injection and forming a compensating membrane wherein said second material comprises an elastomeric material to effect regulation of the drip emitter and wherein said compensating membrane is configured to
      compensate for pressure or flow of water by compensating against said stiff injection molded surface of said emitter body, wherein said compensating occurs entirely within said compensating chamber in said inner portion and entirely surrounded and enclosed by said first material and said second material; and,
      deform under positive pressure toward said compensating surface within said compensating chamber within said inner portion of said drip emitter;
   forming a hole in said drip emitter comprising a pressure chamber exit using a bypass shutoff injection mold wherein said hole extends from said inner surface to said outer surface; and,
   coupling a fluid retainment valve with said drip emitter.

16. The method for producing the drip emitter of claim 15 wherein said coupling the fluid retainment valve comprises forming a fluid retainment valve during said injecting said second material, or injecting a third material into said injection mold and forming said fluid retainment valve.

17. The method for producing the drip emitter of claim 15 wherein said coupling said fluid retainment valve comprises coupling
   a ventable fluid retainment valve, or
   an anti-siphon fluid retainment valve, or
   a non-drain fluid retainment valve, or
   a valve comprising flaps,
with said drip emitter.

18. The method for producing the drip emitter of claim 15 further comprising:
   cross-linking said second material to increase elasticity of said second material after injection but before inserting said drip emitter into a pipe.

19. The method for producing the drip emitter of claim 15 wherein said forming the emitter body comprises forming a cylindrical arc of less than or equal to 360 degrees.

20. The method for producing the drip emitter of claim 15, further comprising:
   forming a mechanical engagement between said first material and said second material wherein said mechanical engagement comprises at least one interlocking element formed into said first material and corresponding at least one interlocking element formed into said second material.

* * * * *